April 12, 1966  G. T. RANDOL  3,245,502
AUTOMATIC-CLUTCH POWER TRANSMISSION
AND CONTROL MEANS THEREFOR
Filed Dec. 26, 1962  15 Sheets-Sheet 5
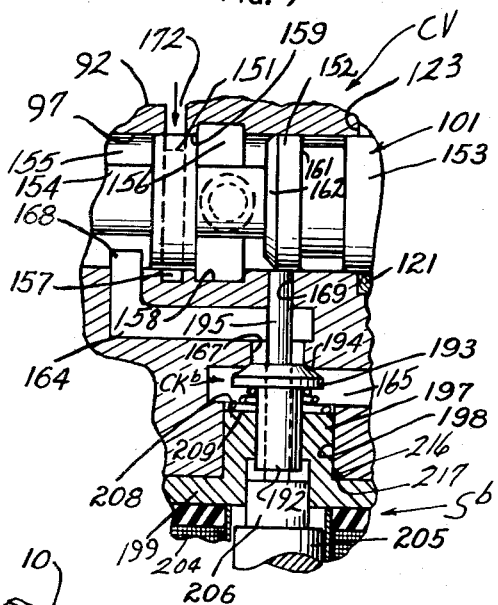
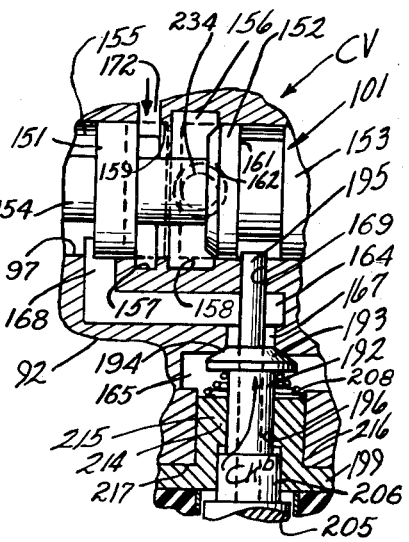
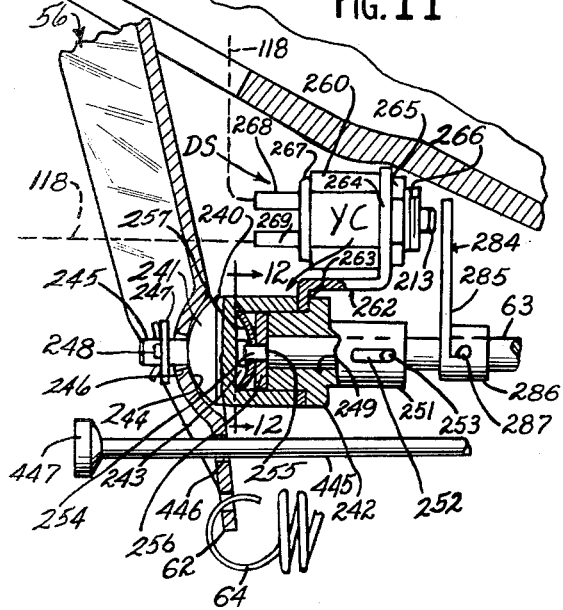
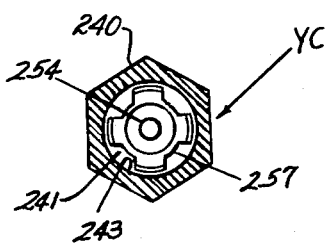
Inventor

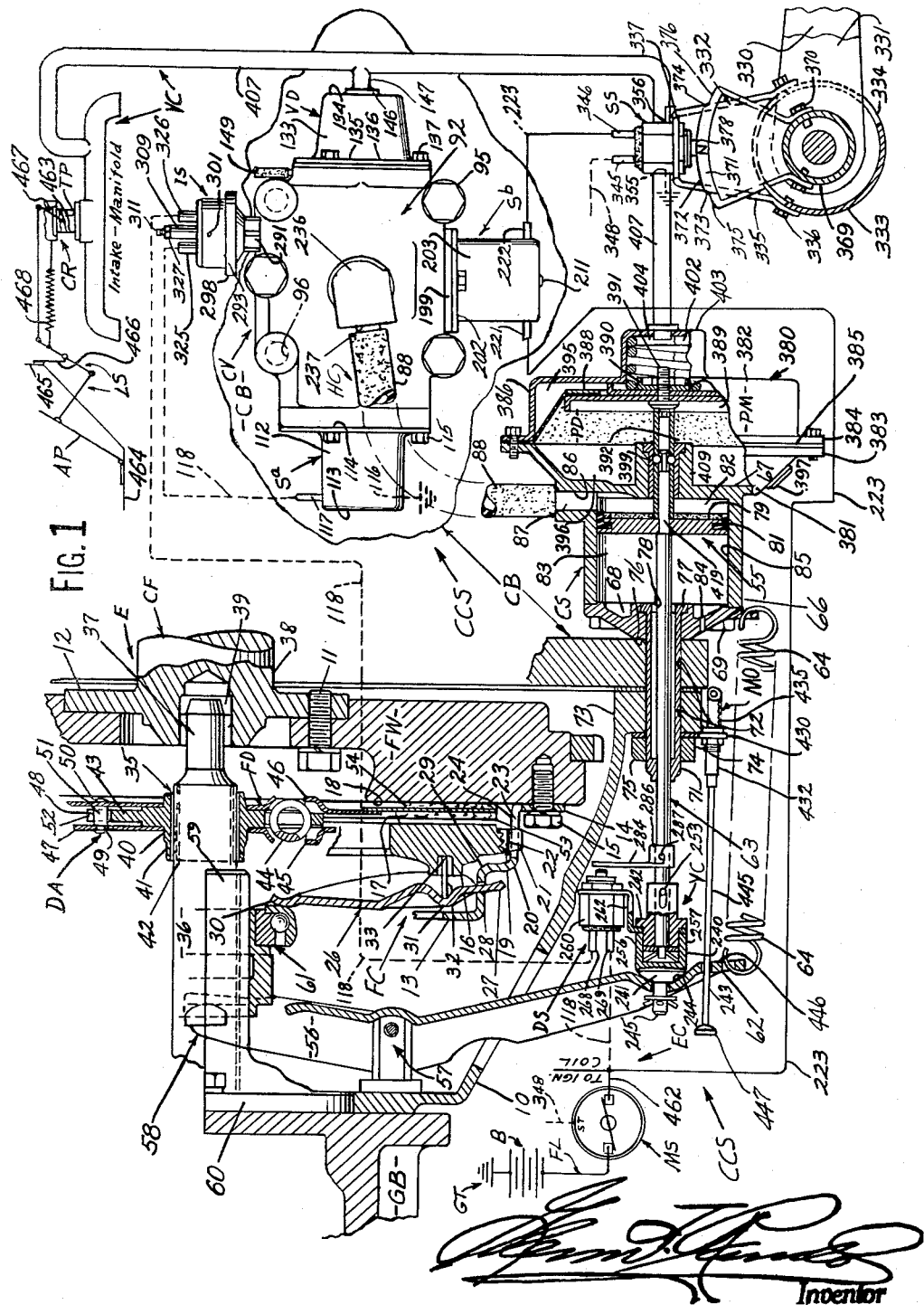

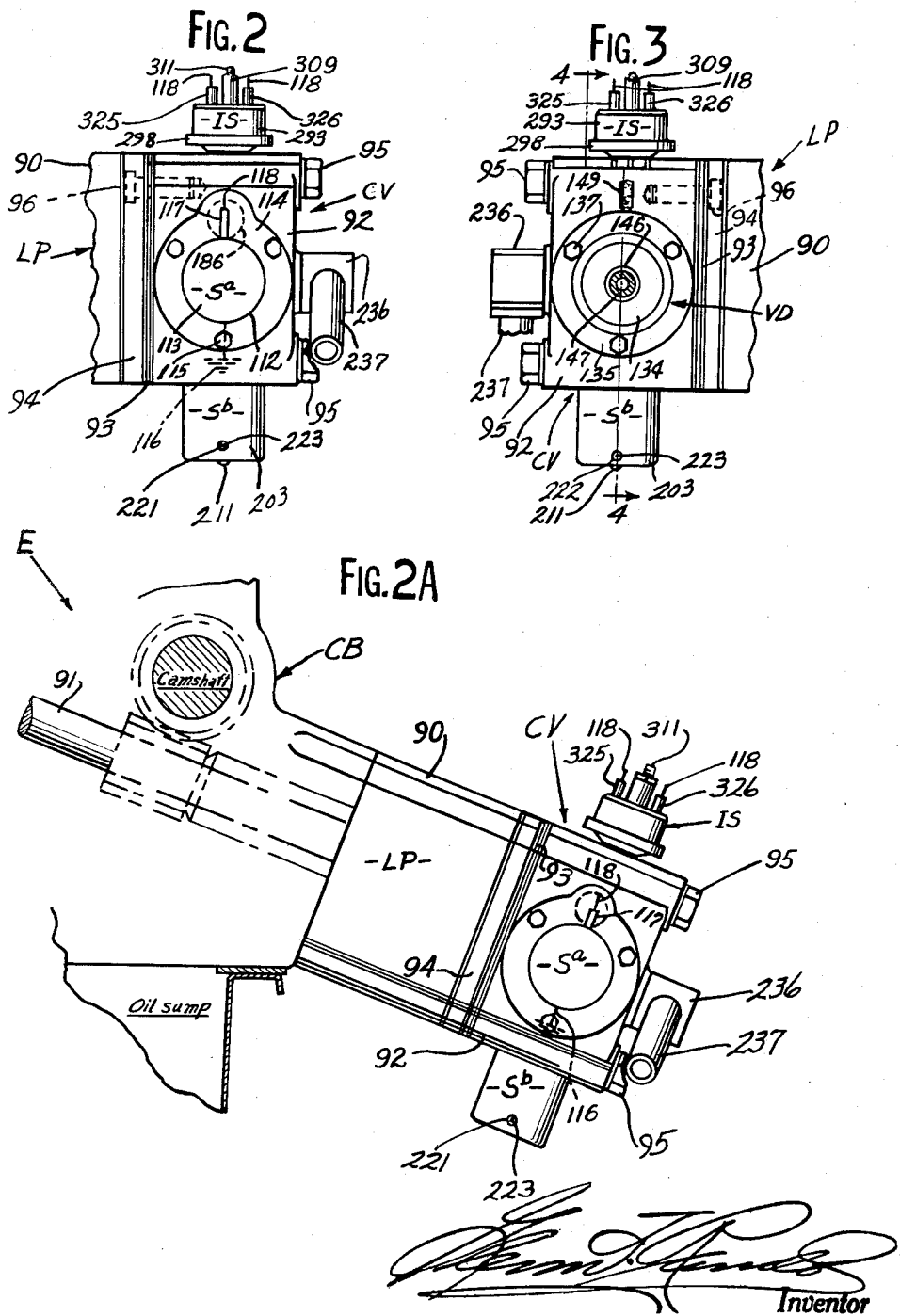

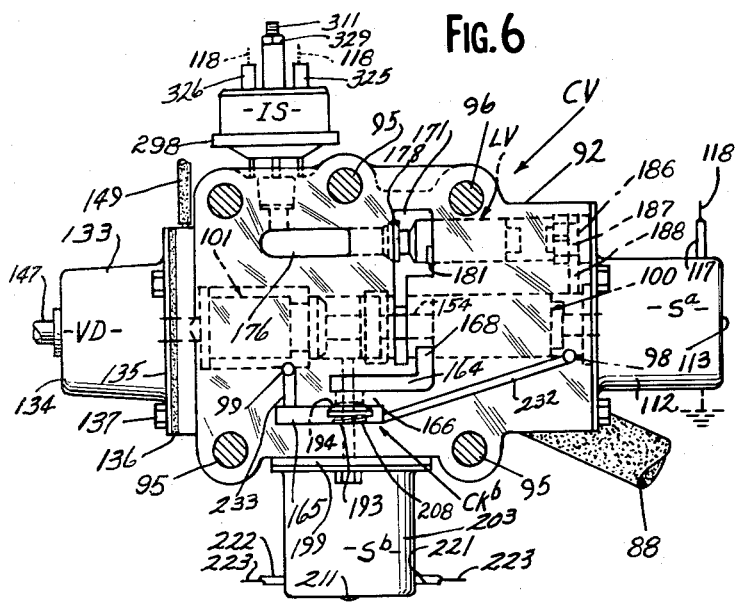
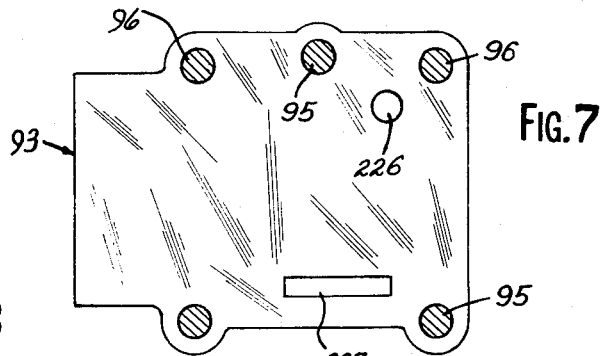
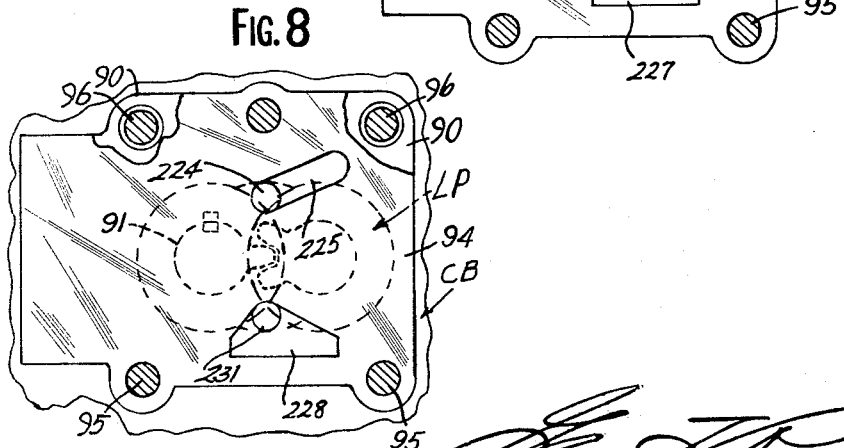

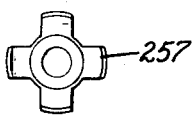
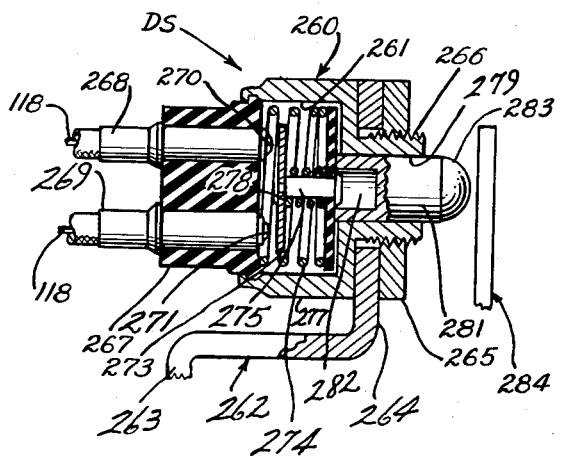
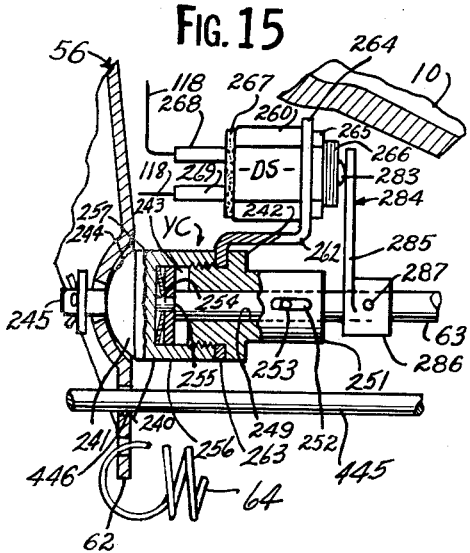
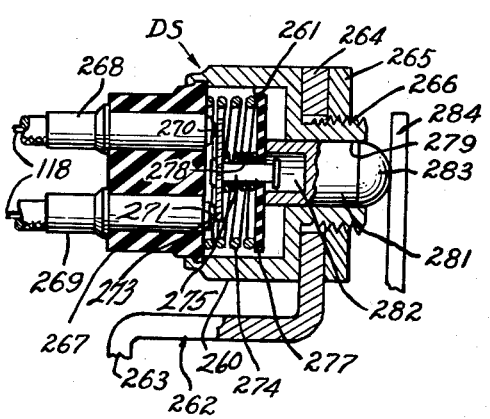

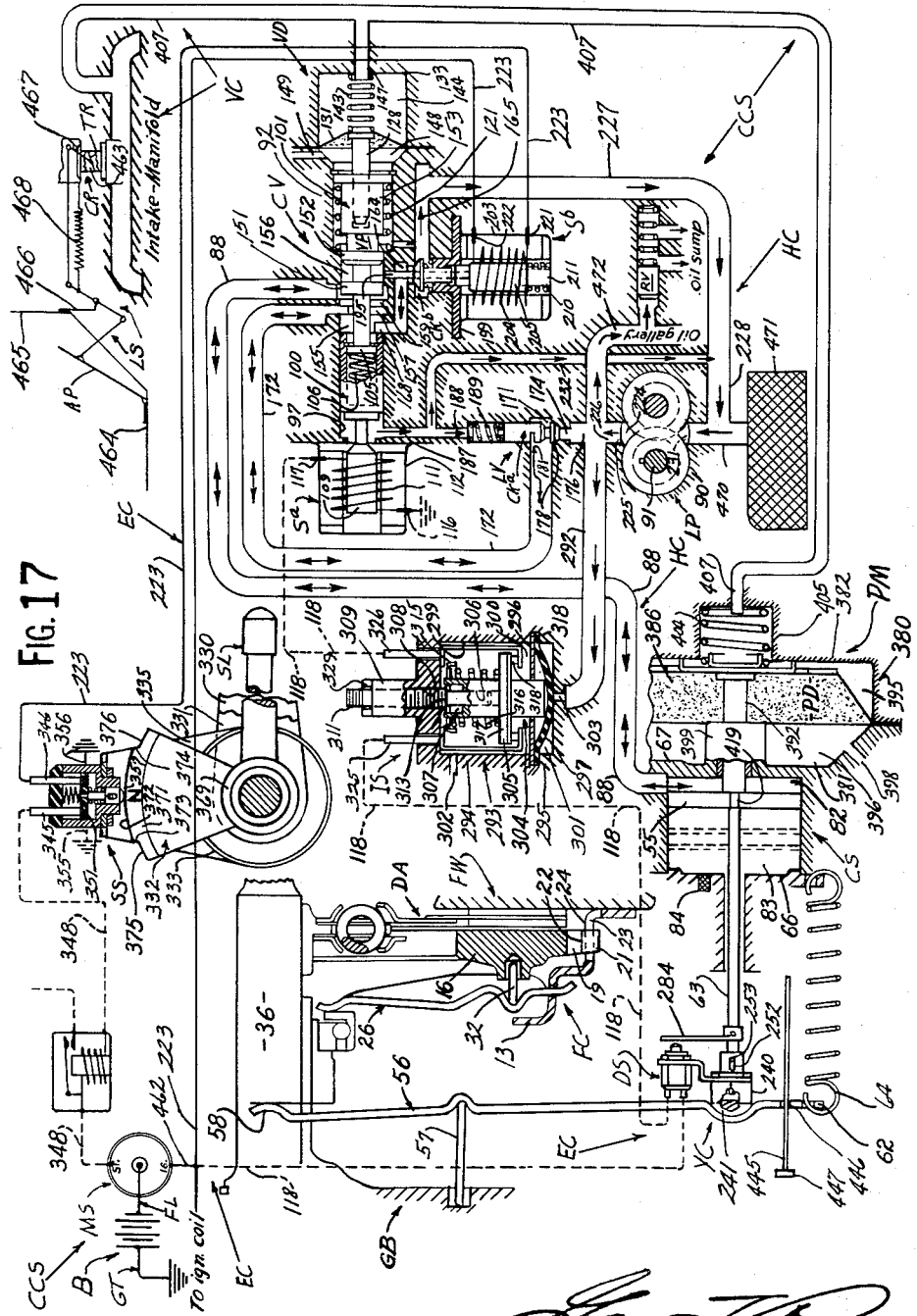

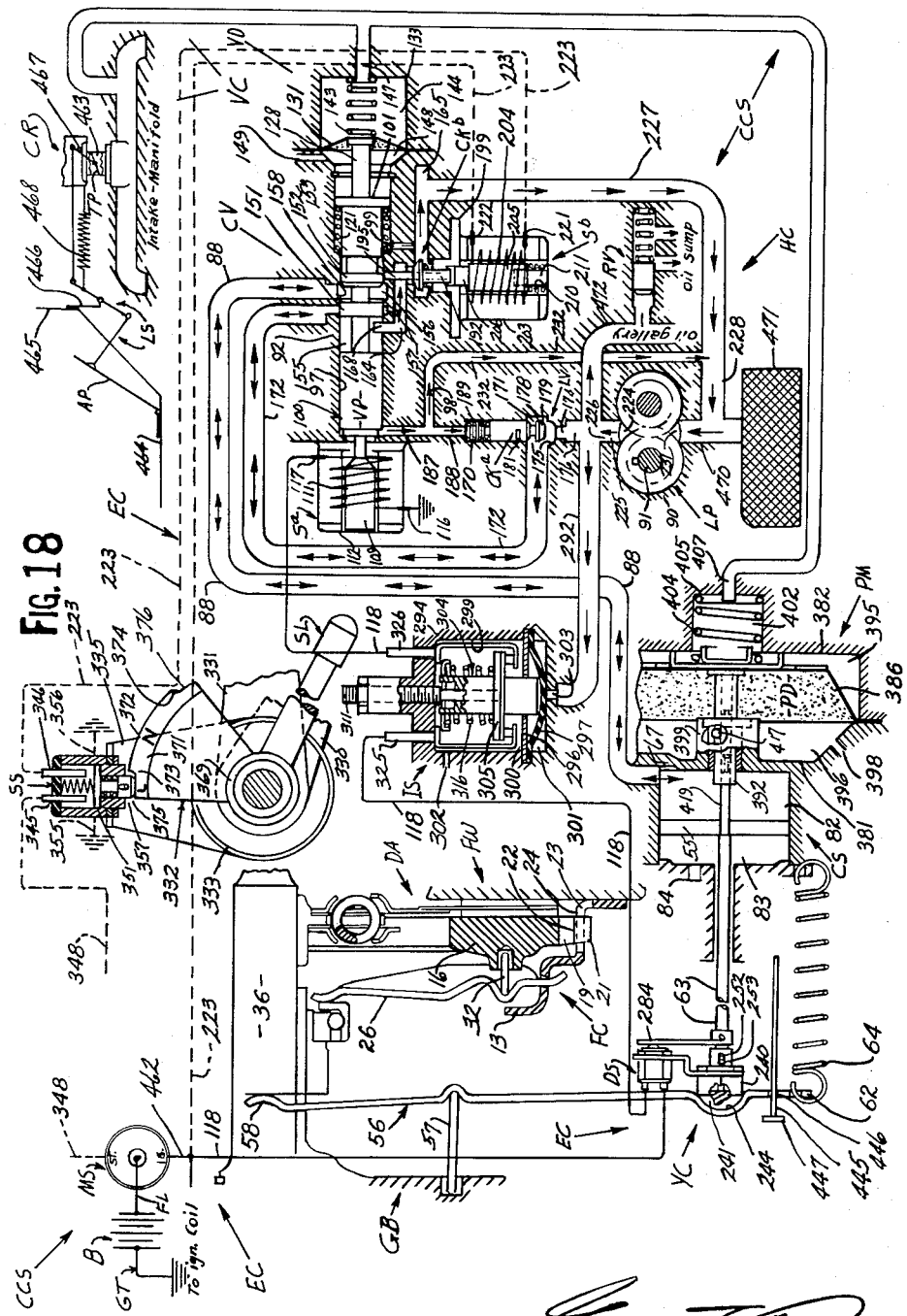

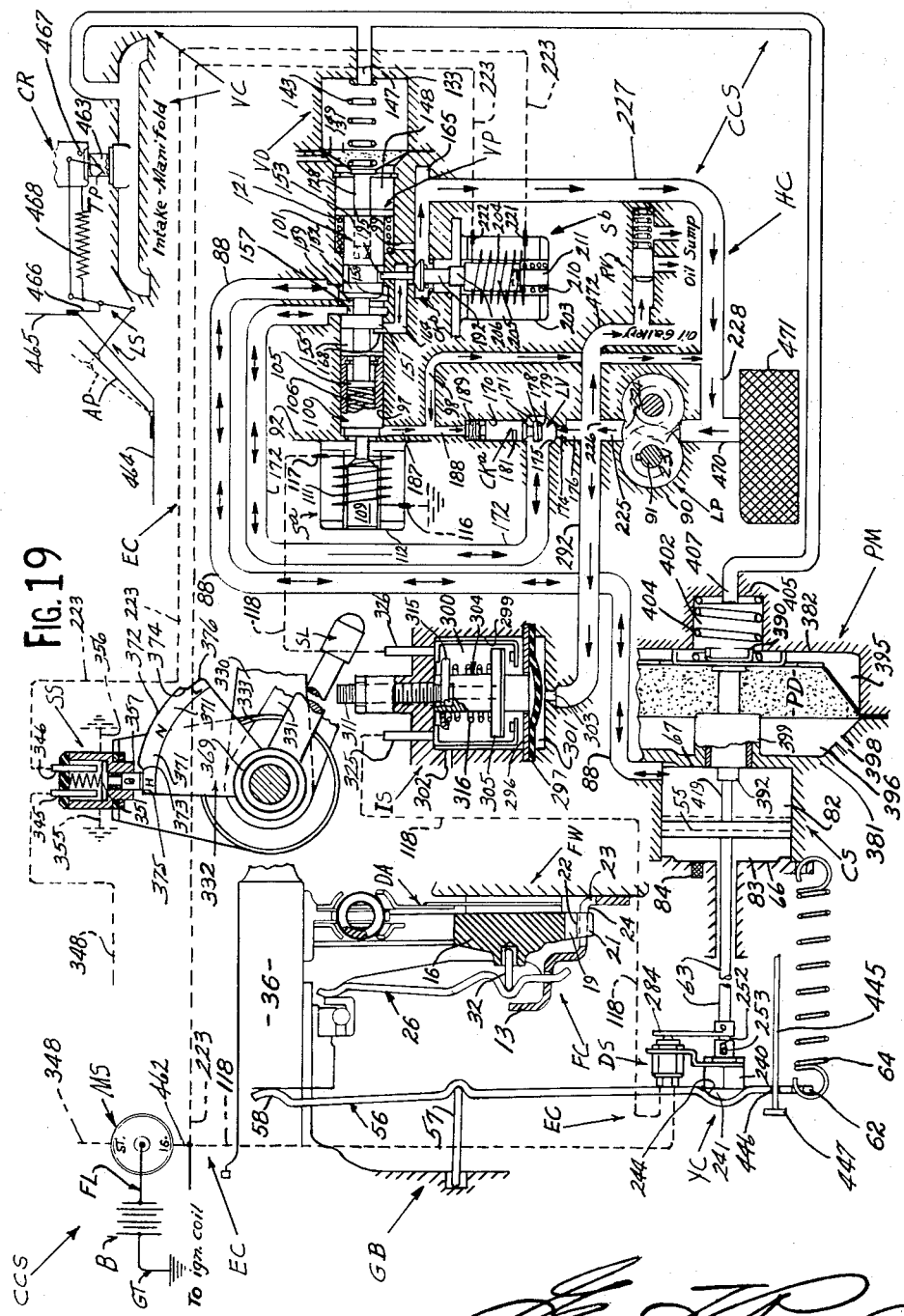

April 12, 1966　　　G. T. RANDOL　　　3,245,502
AUTOMATIC-CLUTCH POWER TRANSMISSION
AND CONTROL MEANS THEREFOR
Filed Dec. 26, 1962　　　15 Sheets-Sheet 10
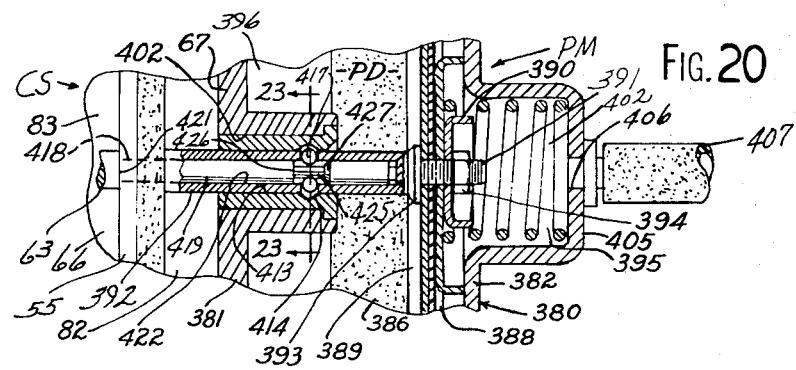
FIG. 20
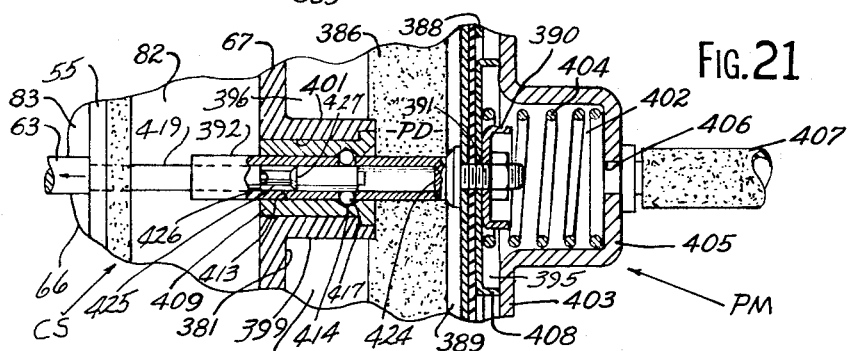
FIG. 21
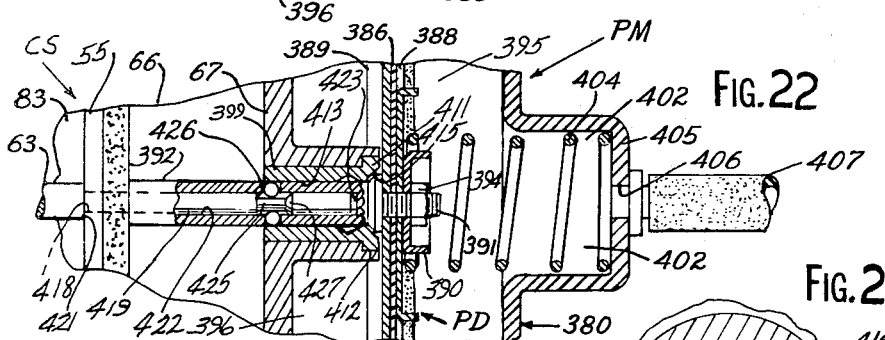
FIG. 22
FIG. 23
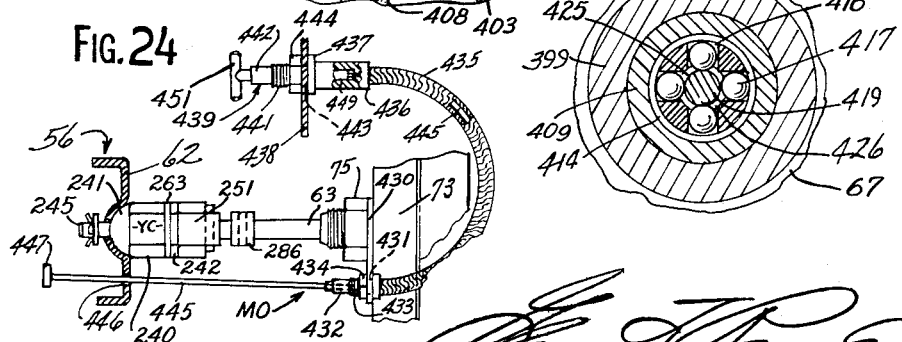
FIG. 24
*Inventor*

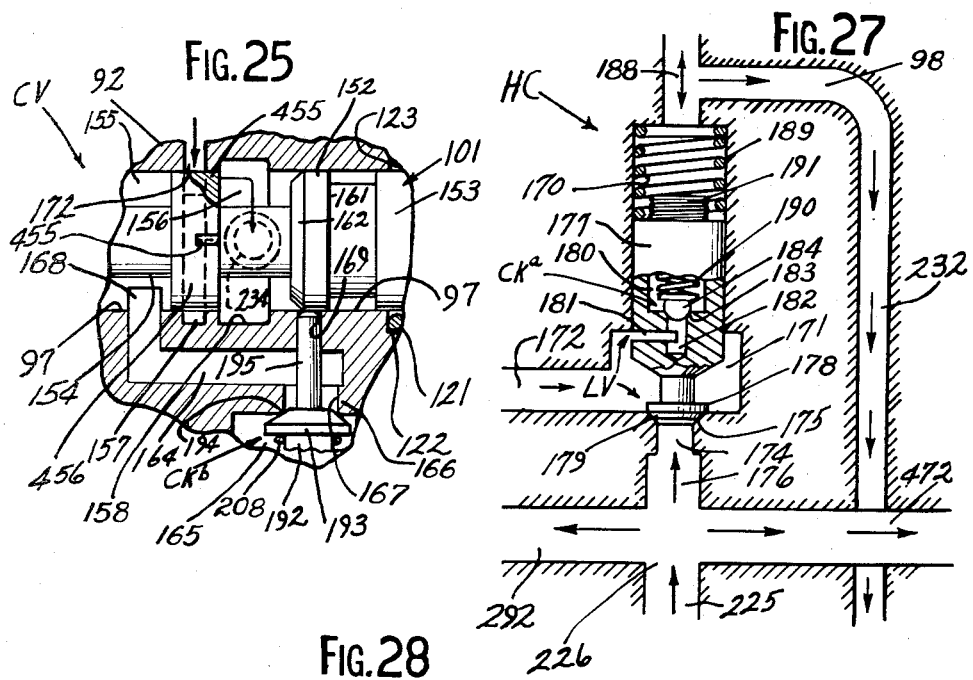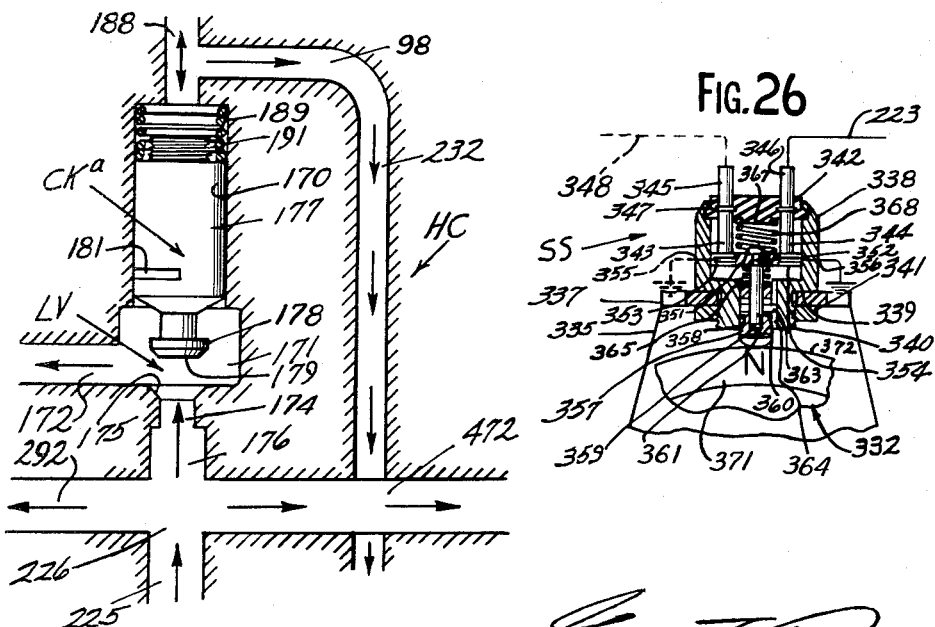

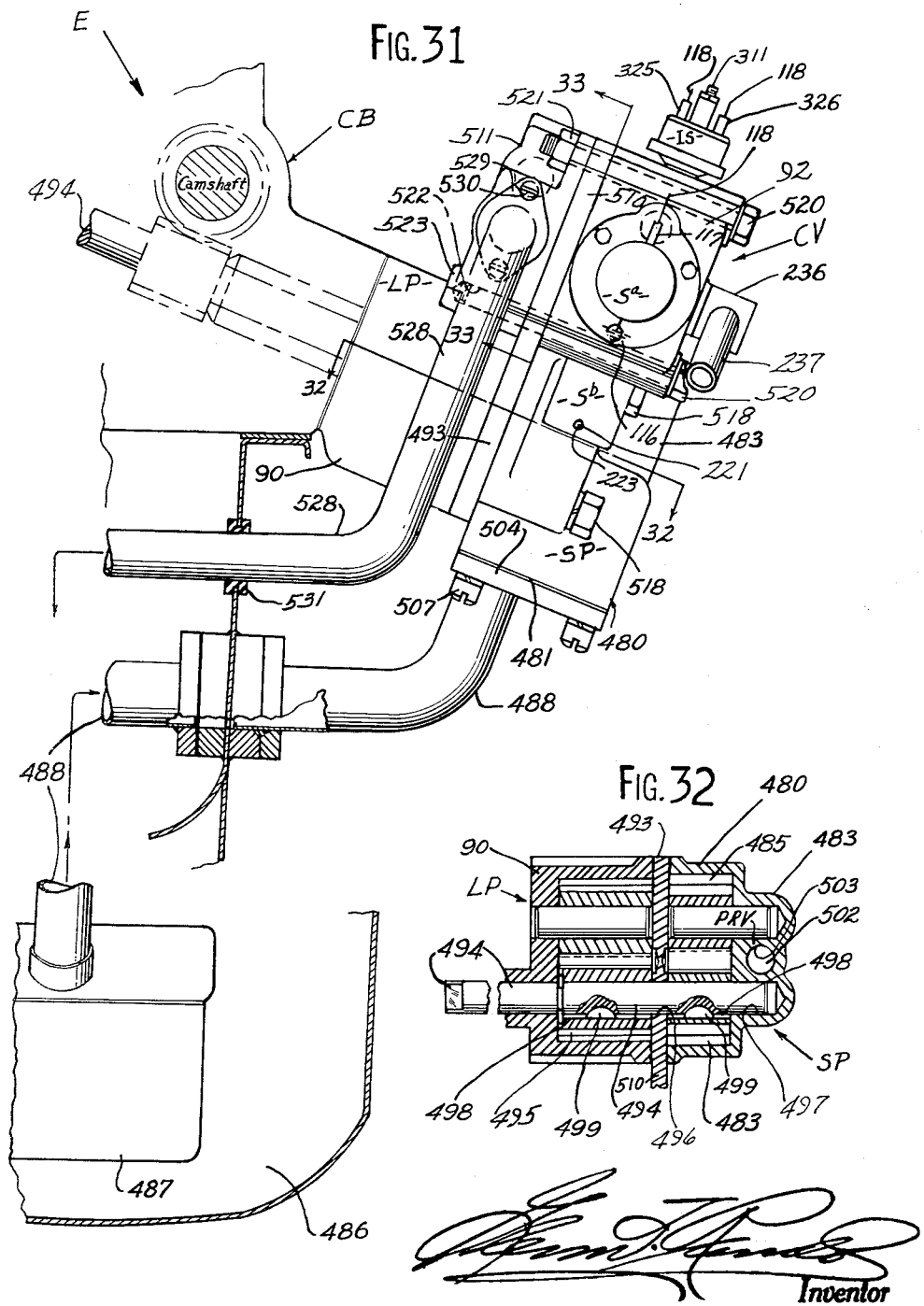

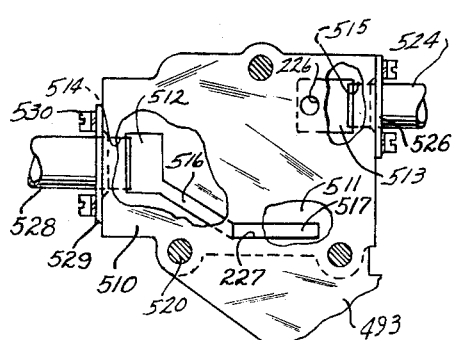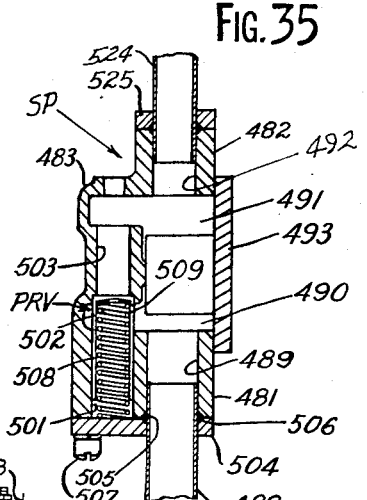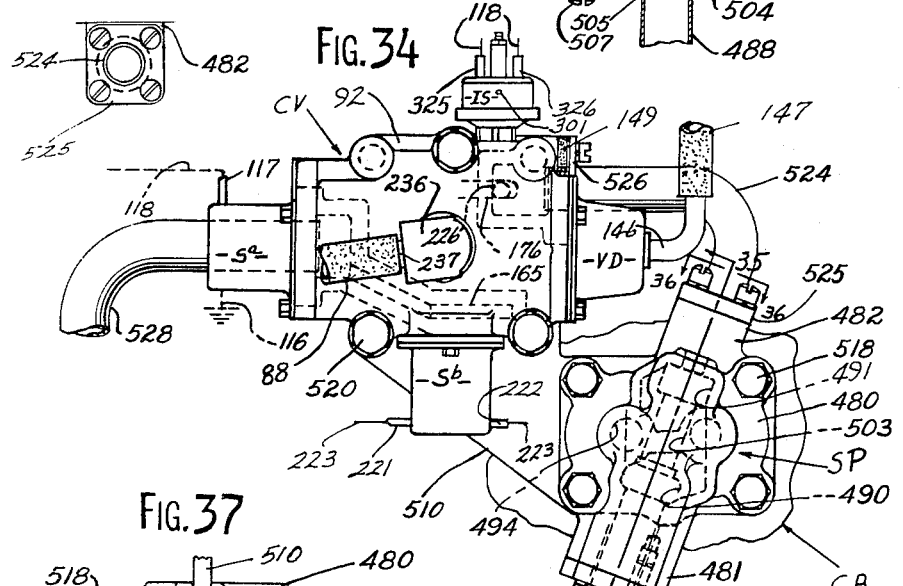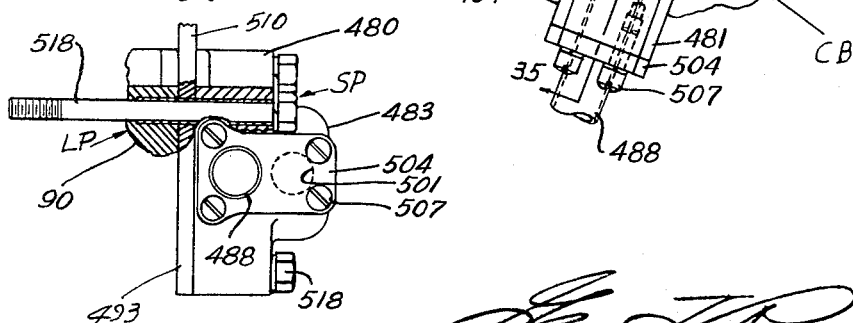

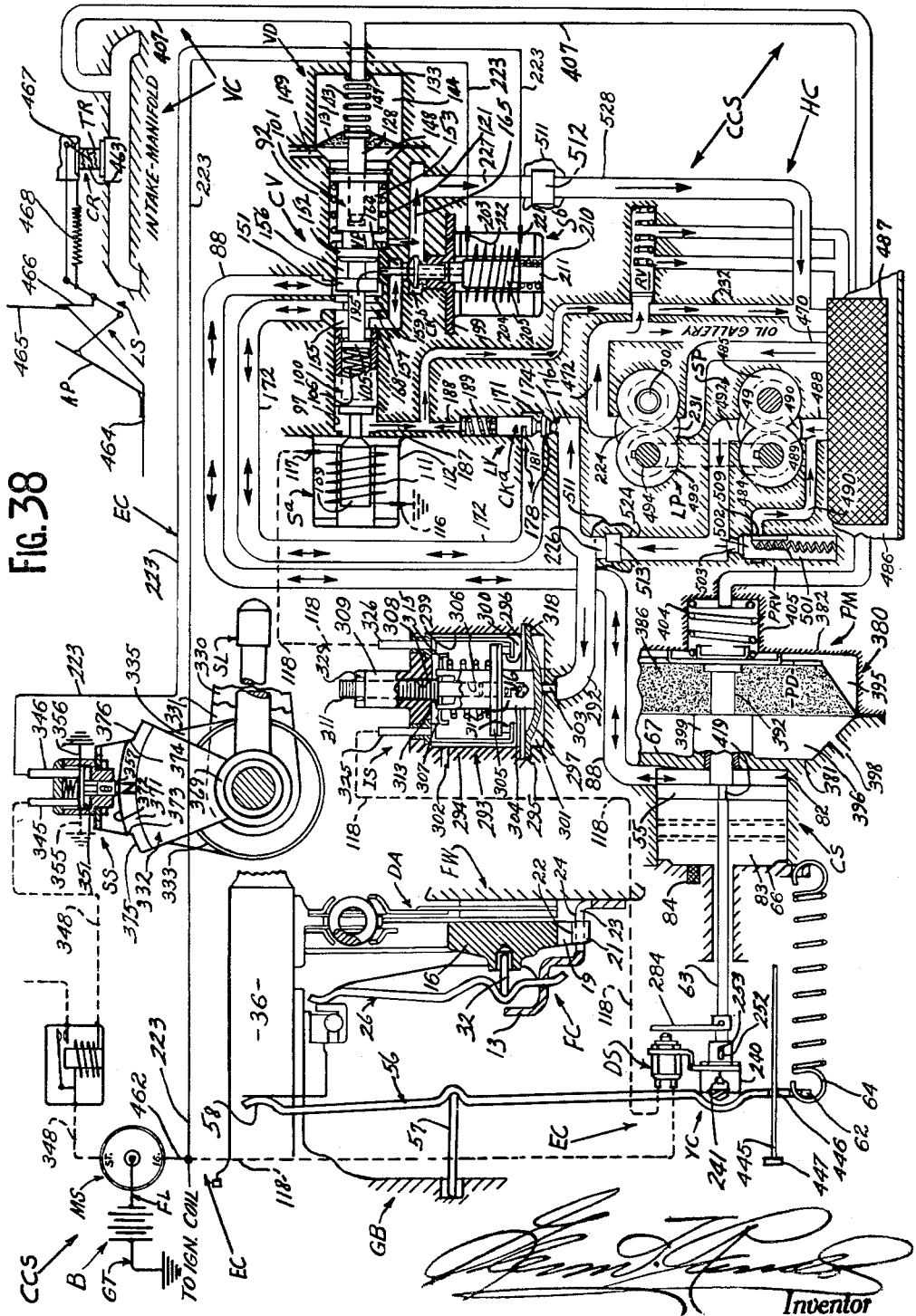

United States Patent Office 3,245,502
Patented Apr. 12, 1966

3,245,502
AUTOMATIC-CLUTCH POWER TRANSMISSION
AND CONTROL MEANS THEREFOR
Glenn T. Randol, 3 E. 2nd Ave., Loch Lynn,
Mountain Lake Park, Md.
Filed Dec. 26, 1962, Ser. No. 247,391
62 Claims. (Cl. 192—.075)

My invention relates generally to power transmissions primarily intended for use on automobiles and the like, although the stated field of utility is not thus restricted. More, particularly, my invention is concerned with that type of transmission which includes a master friction clutch operably interposed in the drive line between the engine and a manual change-speed gearbox, said clutch being engageable to transmit drive-torque via said gearbox to start and propel the vehicle, and disengageable to interrupt such drive-torque to accommodate stopping the vehicle while the engine is running, and to facilitate speed-changing operations involved in normal driving-control of the vehicle.

Workers in the art have attempted for many years to produce a completely reliable power-operated friction clutch in operative association with preferably a three-speed forward and a reverse drive manually-shiftable gearbox, that would eliminate physical exertion on the part of the driver by hand or foot or both to disconnect the engine from the drive line as for towing a disabled vehicle and accommodate vehicle stops without interrupting engine operation, and thereby eliminating coordination of clutch disengagement and re-engagement with manual gear-shifting operations for smooth transition from one effective speed-drive to another or neutral. Low cost, simplicity and reliability coupled with a source of power for operating the clutch producible as an inherent part of engine operation as distinguished from auxiliary (accessory) power-producing units such as vacuum, compressed-air or hydraulic pump units, especially a clutch of the general character disclosed in Patent No. 2,624,432 granted to me January 6, 1953 which the present invention seeks to improve, continue to be the optimum objectives motivating numerous workers to devise various power-controlled systems of clutch control which require minimal change, if any, in the structure comprising the conventional spring-engageable clutch, that is, a pressure differential actuated system utilizing, for example, vacuum (negative) pressure produced as a function of engine operation, or compressed-air generated to serve as a fluid actuating medium for clutch control has been found satisfactory for effecting clutch disengagement, but equally unsatisfactory as a means for controlling clutch friction members into smooth engagement, for the principal reason that air is inherently elastic (compressible) which characteristic prohibits exactness in follow-up control between an operator-operated member such as the accelerator pedal, and the movable pressure-applying member of the clutch through the intermediary of an interposed control valve to induce such engagement of the clutch members under influence of servo-actuation alone, or by spring-engaging means under control of such servo-actuation, depending, of course, on whether the clutch utilizes fluid- or spring-pressure means to effect its engaging-action. To illustrate where vacuum produces the required pressure differential, the accelerator pedal may be uniformly depressed to adjust the control valve controllable to regulate the power-piston of the clutch-servo connected to move the clutch pressure member, so as to smoothly feed in the clutch members by introducing air at atmospheric pressure into the servo control chamber against the servo-piston, but despite such smooth application of physical pressure on the accelerator pedal, the engaging-action of the clutch members cannot be perfectly correlated with accelerator pedal position under supervision of the vehicle operator, due to asynchronous movement of the clutch members toward engaging contact as a result of the resilient (spongy) characteristic of the fluid medium (air) present in the servo control chamber which condition tends to induce over-engagement of the clutch members thereby removing some of the necessary control of clutch engagement from the operator. This lack of correlative exactness between the positions of the accelerator mechanism and the clutch members during the critical initial engaging phase to start the vehicle results in clutch engagement leading operator position of control with consequent possible overloading of the engine to the point of stalling the vehicle. It is thus seen that use of negative or super-atmospheric pressure has not proven suitable as a medium through which clutch members can be smoothly engaged due to the inherent elastic characteristic of air.

Furthermore, while the lubricating oil for the engine is satisfactory for activating a clutch-servo to effect clutch disengagement in response to engine speed, a serious disadvantage arises from the use of spring-disengaging means for such a hydraulically-engageable clutch, the purpose of using such spring-disengaging means being to effect automatic disconnection of the engine from the change-speed gearbox and drive line when the car is brought to a momentary stop as at a traffic light without interrupting idling operation of the engine, or to prevent locking the shift-lever in a parked gear position when the vehicle is under coasting load impressed on the drive line against engine-compression braking as would be the condition were the clutch spring-engageable as conventionally practiced, and the vehicle brakes "off" to free the same to roll sufficiently to bind the meshing gears in which the vehicle is parked, thus preventing neutralizing of the parking gear to free the engine for starting by the engine-starter. Thus, a hazardous situation is created with any vehicle equipped with an automatic clutch of the type which is normally disengaged when the car is parked and the engine stopped thus negating use of engine-compression braking with the transmission "in-gear" while the car is standing unless separate operator means are provided to effect clutch re-engagement under such circumstances which would unduly complicate the clutch control mehanism with the ever present possibility of operator inadvertence to re-engage the clutch upon leaving the vehicle freeing it to roll driverless out of control from a parked position on a gradient. Moreover, unless such an auxiliary re-engaging means are present in the clutch control system, it would be impossible to push-start the engine.

Therefore, the primary objective of the present invention seeks to provide novel means for overcoming the above stated objections and disadvantages resulting from use of air-control; from inability to park "in-gear" under engine compression braking, and for producing a simplified and positive means for detecting initial clutch plate-contact and automatically controlling relative engaging movements of the clutch members through this critical stage of clutch operation to prevent overloading the engine with consequent possibility of stalling it, by either arresting or retarding such relative engaging movements automatically to precondition smooth firm engagement under operator-supervision.

An object related to the primary object above is to provide a non-compressible fluid medium such as the engine lubricating oil for actuating a clutch-servo interposed in a hydraulic circuit served by the engine-driven pump conventionally utilized to pressure lubricate the working parts of the engine, and thereby providing positive clutch control responsive to variation in engine operation, said clutch-servo being adapted to actuate the clutch in two stages to first effect partial (slipping) engagement automatically followed by firm engagement under operator-supervision for normal vehicular driving.

Another object related to the primary object above is to provide novel automatic clutch re-engagement effective upon stopping the engine, as when parking, to enable use of engine-compression braking to stabilize the vehicle in its parked position by leaving the change-speed transmission "in-gear" as conventionally practiced by drivers of vehicles equipped with a foot-controlled master clutch, thus providing a normally engaged clutch when the vehicle is parked notwithstanding such clutch is engageable by hydraulic means during normal operation of the vehicle.

Another object related to the primary object above is to provide clutch plate-contact detecting means of simplified construction and operation responsive to a predetermined thrust imparted by said clutch-servo during its clutch-engaging action for arresting servo-actuation of the clutch members in initial contact defining partial (slipping) engagement thereof, and, in a broader patent sense, to produce a clutch of the type under consideration having a servo-actuator controllable to establish the clutch in initial "slipping" engagement as a function of initial thrust-actuation by said clutch-servo, to precondition firm engagement of the clutch under additional servo-actuation at the will of the operator.

Another object related to the primary object above is the provision of vacuum-modulated means responsive to vacuum efficiency generated within the engine intake-manifold as a function of engine operation for overruling the arrested status of servo-actuation of the clutch to enable smooth firm engagement of the clutch members according to engine-acceleration.

A more specific object of my invention is to utilize said clutch-contact detector means in the form of a spring-loaded thrust-transmitting connection interposed in the piston-rod of the clutch-servo, and having an included detector switch which, when closed, in response to relative movement within said connection therefore the piston-rod induced by a predetermined thrust from said clutch-servo, activates a solenoid-controlled valve piston in the main control valve unit, to interrupt clutch-engaging movements by said clutch-servo, and thereby establishing the clutch members in first stage partial (slipping) engagement defined by the thrust-transmitting capacity of said spring loaded connection substantially in normal pre-loaded status. Another included component adapted to act on said valve piston in the same direction as the solenoid, is the vacuum-modulated means in the form of a vacuum-diaphragm unit interposed in a vacuum line leading from the engine intake-manifold and provided with spring-action opposing the pressure differential therein said unit functioning to render its spring-action effective according to vacuum reading in the intake-manifold therefore according to torque output of the engine, to overrule the aforesaid solenoid positioning of said valve piston and protract the same to a different position wherein second stage firm engagement of the clutch is effectuated in response to further servo-activation of the clutch as a function of engine acceleration.

A further more specific object is the novel utilization of vacuum generated within the engine intake-manifold to produce the pressure differential to energize a motor incorporated in the aforesaid automatic clutch re-engaging means having an included work-performing spring and connected plunger normally ineffective on the clutch throw-out lever during normal hydraulic-spring operation of the clutch into engaged and disengaged relation, respectively, while the engine is running, said work-spring being effective via said work-plunger upon stopping the engine (clutch at rest) thus negating vacuum production, to act on said throw-out lever to re-engage the clutch automatically in opposition to normal spring disengagement thereof.

An object related to the object immediately preceding is the provision of novel manually-operable means adapted to overrule the effectiveness of said work-spring at will to enable normal spring-disengaging of the clutch, said manual means including novel mechanical interlocking means operably incorporated between said work-plunger and the clutch servo-piston, to lock the work-spring in fully energized position under influence of said energized motor despite subsequent de-energization of said motor induced by lowering of vacuum efficiency in the intake-manifold in response to opening the engine throttle to increase engine speed above idle speed, so that normal hydraulic-spring control of the clutch is operative during engine operation.

Therefore, more broadly, another object is the provision of a normally hydraulic-engageable clutch which is convertible automatically to function as a spring-engageable clutch while the engine is stopped so that engine-compression braking can be effective to stabilize the vehicle when parked "in-gear" or for "push-starting" the engine.

A still further more specific object of my invention is the interposition in the drive line of an automotive vehicle and the like, of a spring-disengageable friction clutch operable into engaged condition by hydraulic means, and wherein said spring dis-engagement is responsive automatically to initial movement of the manual shift-lever for the gearbox to relieve hydraulic pressure on the clutch during speed-changing operations, or the relieving of such hydraulic pressure as a function of reducing engine speed therefore pump output pressure to a predetermined value or lower to accommodate stopping the vehicle without interrupting engine idling operation with the gearbox "in-gear," said clutch including control means responsive to the aforesaid shift-lever movements in the conventional H-pattern, or to reduction of hydraulic pressure produced by the lubricating pump upon completion of a selected change in the effective drive ratio of the associated change-speed gearbox.

An object related more broadly to the object next above, is the novel utilization of the conventional engine-driven lubricating pump or a separate pump mounted, for example, for drive on the conventional lubricating pump to serve as means for pressurizing the actuating fluid for the clutch-servo, with either one or both pumps receiving fluid from a common source such as the lubricating oil contained in the oil sump of the engine crankcase.

Therefore, another salient feature of my invention resides in the novel utilization of the conventional engine-driven oil pump for supplying the actuating fluid to control the clutch-servo, or optionally to provide a separate pump mounted directly on the oil pump as a unit for servo-actuation of the clutch independently of the latter pump, and wherein the servo-actuating pump is provided with a spring-loaded relief valve to enable selective establishment of different ranges of operating pressures independently of those producible by said oil pump for lubrication purposes only, thus providing different locations for installing the clutch-servo irrespective of the leverage advantage dictated by such locations, that is to say, locating the clutch-servo concentrically with respect to the clutch within its housing to avoid excessive outside plumbing imposes leverage limitations on the clutch-actuating levers, while if the clutch-servo is mounted on the exterior of the clutch housing greater leverage advantage is available thus requiring a relatively smaller servo unit with corresponding less operating pressure required than in the case of the concentric arrangement. Outside mounting of the clutch-servo enables installations of my automatic clutch in which the oil pump alone is capable of actuating the clutch-servo and at the same time supplying adequate pressure lubrication to the working parts of the engine.

An object related to the object next above is the novel utilization of the oil sump in the engine crankcase to serve as a common source of fluid supply to both pumps, and to operate the same from a common drive shaft geared to a rotatable element such as the camshaft of the engine.

Another important object of my invention resides in the provision of a novel electro-vacuum hydraulic control circuit system for the aforesaid hydraulic clutch-servo, said circuits of said system including the aforesaid main control valve of unique and novel construction and operation due to its body being processed with a longitudinal bore in which a spring-loaded composite valve piston slidably operates from normal position of pressure-control to a plurality of higher pressure-controlling positions under influence of spring means normally effective to establish the valve piston in normal position, and sequentially inducing energization of said solenoid by closure of said detector switch, and de-energization of said vacuum-diaphragm unit (motor) to release its power-spring to act on said valve piston which reads torque output in terms of vacuum efficiency, to overrule said detector switch positioning of said valve piston and thereby controlling said higher pressure positions, said valve piston comprising a pair of spool-type elements telescopically connected at their confronting inner ends by means of a pair of cooperating abutment-engaging portions, respectively, biased to normal abutting relation by an interposed compressed spring normally effective to yieldably stabilize said valve elements to move as a unit. Movement of said valve piston to normal position being effected by said spring means reacting between a portion of the valve body and said valve piston, respectively, when said diaphragm unit is energized to effect maximum energization of said power-spring, with valve piston movement to its higher pressure positions of fluid control being effected by said power-spring as a function of de-energization of said diaphragm unit in that order to first halt activation of the clutch-servo upon partial (slipping) engagement being effected thereby, and then by inducing further servo-actuation of the clutch into firm engagement as a function of further de-energization of the diaphragm unit, respectively. The armature of the aforesaid solenoid being connected to one of said valve elements to move both of them as a unit in normal spring loaded relation against said spring means to initiate said higher pressure controlling positions to first establish the clutch members in said partial (slipping) engagement, followed by simultaneous lowering of vacuum efficiency in the diaphragm unit as a function of adjusting the carburetor throttle-plate to accelerate the engine above idle speed, and thereby progressively releasing the power-spring to correspondingly act through the diaphragm-plunger on the other valve element to move the same against said spring means and the spring load obtaining between said valve elements, relatively to the one valve element to induce firm engagement of the clutch under servo-actuation.

An object related to the object next above is the novel provision in said control valve of an annular control land spaced from an annular fluid-retaining bearing land on the other valve element, said control land being adapted to cooperate with an annular fluid channel indented in the said longitudinal bore, and which communicates via conduit means with the working chamber in the clutch-servo to control the servo-piston connected to the movable pressure-plate of the clutch by a rockable throw-out lever intermediately pivoted on the clutch housing, the inner end portion of said lever being adapted to act through a thrust-applying ball bearing on the inner ends of a plurality of radially disposed pressure-plate operating levers pivotally mounted on the clutch cover to operably engage the clutch when the clutch-servo is energized. Relative positioning of said control land with respect to said fluid channel defines the three operating positions aforesaid of the main control valve corresponding to full and partial disengagement, and firm engagement, respectively, of the clutch.

An object importantly related to the two objects next above is the provision of novel solenoid-controlled two-stage check-valve means including interlock means to maintain the main valve piston in its final operating positions of fluid control for normal driving of the vehicle above a predetermined minimal speed, and to selectively establish two levels of pressure within the valve body at approximately 2 and 8 p.s.i., respectively, said check-valve means including a poppet element adapted to cooperate with a ported seat defining the valve body terminus of the suction line to the pump, said poppet element being biased toward its seat by means of a pair of springs of different normally preloaded tensions, with the heavier spring being controlled by the solenoid armature in such manner that when the solenoid is energized the biasing effect of said spring is removed from the poppet element thus leaving the lighter spring effective to establish the minimum (non-activating) pressure in the valve body at 2 p.s.i. approximately, but when the solenoid is deenergized, the heavier spring is released to act jointly with the lighter spring to more firmly hold the poppet element on its seat thus raising the pressure on the oil in the valve body to approximately 8 p.s.i with sufficient capability of actuating the servo-piston to move the clutch pressure-plate into frictional engagement with the clutch driven disc assembly to partially apply the clutch in slipping engagement, and thereby transmit torque to the ground wheels of the vehicle to impart no more than "creeping" movement thereto, if any movement at all, when the brakes are "off."

An object importantly related to the object next above, is the provision of novel valve means for establishing a minimal line pressure of 8–10 p.s.i. in the oil gallery of the engine to insure adequate lubrication of the working parts thereof before any oil is diverted for servo-clutch operation in response to said valve means operating at substantially idle speed of the engine at which said minimal pressure is established notwithstanding the element of the main control valve is positioned in either normal or interlocked position whereat the clutch is engageable under pressure flow from the lubricating pump to the clutch-servo through said valve means when in said operating positions above the minimal pressure requirements for the said engine oil gallery.

Another salient feature of my invention related more specifically to the aforesaid yieldable thrust-transmitting device which includes the said detector switch, is the yielding characteristic of said device to operate said detector switch to closed-contact condition which completes the circuit including in series the solenoid connected to operate the one valve element, and an interrupter switch normally closed and responsive to change in the pressure level of the oil within the valve body to dispose said control land in overlapping relationship with respect to the said fluid channel thus trapping the oil under 8 p.s.i. between the said channel and servo-piston to arrest the latter and connected clutch pressure member 16 in partial (slipping) engagement, whereupon increasing engine speed produces a corresponding increase of pressure on the engine oil to open the interrupter switch to deenergize its included electrical circuit and simultaneously lowering the vacuum reading in the vacuum-diaphragm unit aforesaid to release the diaphragm-plunger under power-spring actuation to engage and move the other valve element and included control land out of overlapping relationship with its cooperating fluid channel and thereby placing the pressure output line of the pump in direct communication with the servo-piston to effect firm engaging movements of the clutch members for vehicular drive, said movement of the other valve element and control land relative to the one valve element connected to its actuating solenoid being accommodated by yielding of the spring load within the telescopic connection of the confronting ends of said valve elements, and said pressure level of 8 p.s.i. being establishable by movement of the shift-lever from "N" to "L" position for starting the vehicle which opens the shift-lever switch and thereby de-energizes the solenoid which controls the two-stage check-valve means, to render both stages effective on the poppet element. Accordingly, it is seen that the shift-lever switch is normally closed when the gearbox is in "neutral" to maintain the check-valve solenoid energized so that only the lighter spring is effective on the poppet element to establish minimal residual pressure of around 2 p.s.i. to enable the clutch release spring to withdraw the pressure member of the clutch to fully disengage the same while the vehicle or engine is stopped.

The aforementioned novel electro-vacuum-hydraulic control system for the hydraulic clutch-servo, and included main control valve therefor as well as the secondary controls involved, have been combined to improve and simplify the structure and operation of power-controlled clutches of the type under consideration, such combination resulting in various novel and patentable arrangements in the structure comprising said valve and controls as well as the interaction thereof, and in features of construction and operation of the cooperating elements and more efficient cooperation of the various elements, in effecting the above noted important advance in clutch control as will hereinafter become more apparent.

In a still more specific sense, my invention is so constructed and organized that it can be readily applied to the exterior of the engine block on the pump side thereof between the tappet cover and crankcase, as a replacement accessory, and therefore lends itself to a wide range of installations without altering or otherwise changing the conventional automotive power plant comprising the engine, clutch and transmission structure, since engine oil serves as the motive fluid for clutch operation, and for lubricating the working parts of the engine as well.

Other objects and advantages of my invention will become apparent upon referring to the following detailed description taken in connection with the accompanying drawings wherein like reference characters designate identical parts and assemblies, and unidirectional arrowed lines applied to the oil circuits indicate the direction of oil flow therethrough under the given operating conditions, and two-directional arrowed lines indicate a stabilized status of the oil resident in such circuits in the several views.

The invention consists of the novel constructions, arrangements and devices as hereinafter described and claimed for achieving the above-stated objects and such other objects as will appear from the following description of preferred embodiments of the invention, illustrated with reference to the accompanying drawings, in which:

FIGURE 1 is a fragmentary illustration partly schematic of the conventional internal-combustion engine for powering a motor vehicle, and incorporating a hydraulic servo-engageable master clutch and associated electro-vacuum-hydraulic control system therefor embodying my invention, said clutch being shown fully disengaged, and the control system including the main control valve for the clutch-servo in normal relative positions, the shift-lever switch closed, the interrupter switch closed, the clutch plate-contact detector switch open, the ignition switch closed and the engine operating at idle speed;

FIGURE 2 is an end elevation from the driver's viewpoint of the main control valve unit per se;

FIGURE 2A is an end elevation similar to FIGURE 2 but showing the pump associated with the main control valve assembly mounted as a unit on the side of the engine block;

FIGURE 3 is a front end elevation of the main control valve unit per se;

FIGURE 6 is a view taken along the line 6—6 of FIGURE 5 showing details of the plate engaging side of the control valve unit;

FIGURE 7 is a view taken along the line 7—7 of FIGURE 5 showing details of the ported valve plate;

FIGURE 8 is a view taken along the line 8—8 of FIGURE 5 showing details of the valve adapter plate with the engine-driven pump shown in dashed line background;

FIGURE 9 is a fragmentary portion of FIGURE 4 showing a relatively adjusted position of the main valve piston corresponding to arrested condition of the clutch friction members in partial (slipping) engagement;

FIGURE 10 is another fragmentary portion of FIGURE 4 similar to FIGURE 9 but showing the main valve piston in a still differently adjusted position corresponding to firm engagement of the clutch friction members for normal vehicular drive;

FIGURE 11 is a fragmentary portion of FIGURE 1 taken on an enlarged scale to clarify the details of the yieldable thrust-transmitting detector switch mechanism operatively incorporated between the clutch pressure member and servo-piston;

FIGURE 12 is a transverse section taken along the line 12—12 of FIGURE 11 to show particulars of the thrust-transmitting spring and associated cooperating abutment-engaging portions in normally spaced relation corresponding to full clutch disengagement;

FIGURE 13 illustrates the novel thrust-transmitting spring per se;

FIGURE 14 is a longitudinal-vertical section of the clutch plate-contact detector switch in open disposition corresponding to FIGURE 11;

FIGURE 15 is a view similar to FIGURE 11 but showing the parts in relatively adjusted positions corresponding to partial or full clutch engagement;

FIGURE 16 is a view similar to FIGURE 14 showing the detector switch in closed position corresponding to relatively adjusted positions of the parts depicted in FIGURE 15;

Figure 4:
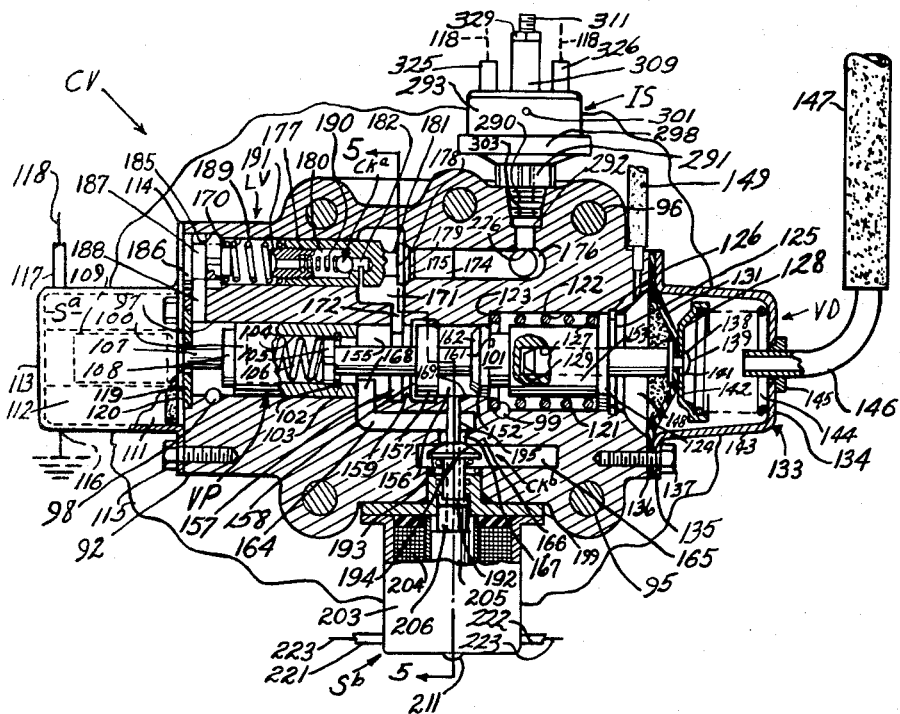
FIGURE 4 is a vertical-longitudinal section with portions in elevation of the main control valve unit, said section being taken on an enlarged scale along the line 4—4 of FIGURE 3.
Figure 29:
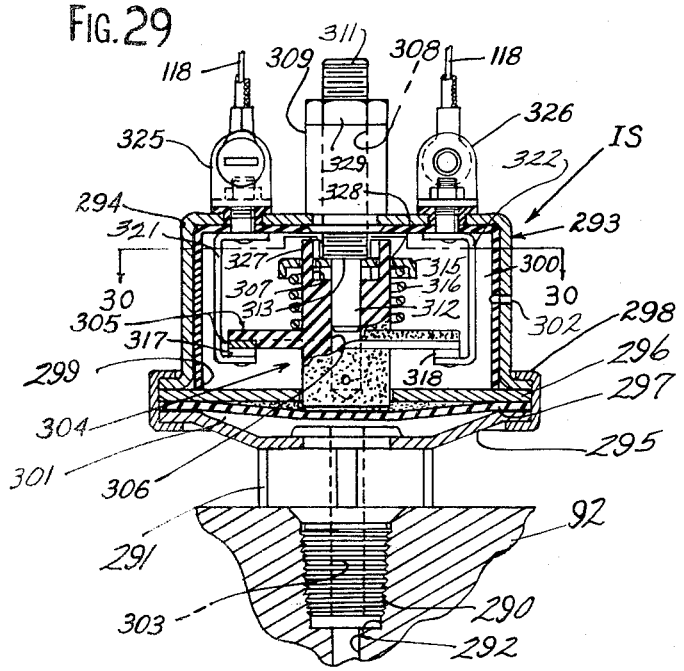
Figure 30:
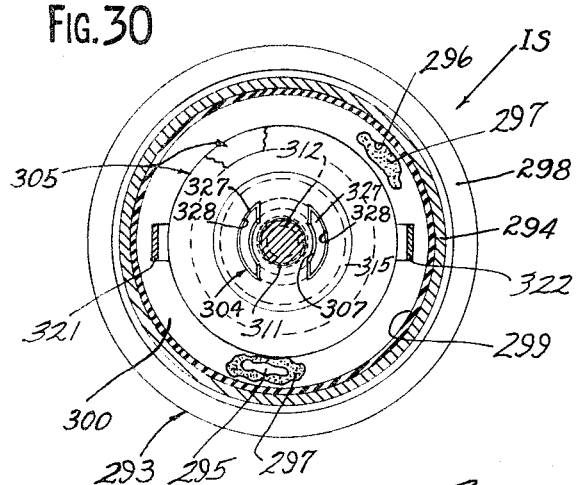

FIGURE 17 is a schematic illustration of the servo-actuated clutch and associated oil and electric circuits and interposed components (devices) for controlling said servo, the relative disposition of said control devices corresponding to neutral at engine idling speed, the clutch fully disengaged, the interrupter switch closed, clutch plate-contact detector switch open, the shift-lever switch closed thus energizing the solenoid-controlled two-stage check-valve to render first stage operation effective, and the vacuum-modulated diaphragm unit under high vacuum energization in fully retracted position, with the energized electric circuits depicted by solid lines and those de-energized by broken lines;

FIGURE 18 is another schematic illustration similar to FIGURE 17 but showing the change-speed transmission "in-gear" at engine idling speed, the clutch in partial (slipping) engagement, the interrupter switch closed, the clutch plate-contact detector switch closed, the shift-lever switch open thus de-energizing the solenoid-controlled check-valve for both stages of its operation to be effective jointly, and the vacuum-modulated diaphragm unit under high vacuum energization in fully retracted position;

FIGURE 19 is another schematic representation similar to FIGURE 17 but showing the vehicle operating under road load at approximately 30 m.p.h., the clutch firmly engaged, the clutch plate-contact detector switch closed, the shift-lever switch open thus de-energizing the solenoid-controlled check-valve for both stages of its operation to continue effective jointly, the interrupter switch open, and the vacuum-modulated diaphragm unit under low vacuum energization to enable the diaphragm power-spring actuated plunger to act on the main valve piston to effect third stage positioning of the control land relatively to its associated fluid channel for conveying pump output pressure directly to said clutch-servo;

FIGURES 20, 21 and 22 are longitudinal sections taken on an enlarged scale from FIGURE 1 depicting the three operating stages of the novel vacuum-controlled spring-engaging means for said clutch, and wherein FIGURE 20 shows the relative disposition of the parts corresponding to FIGURES 1 and 17; FIGURE 21 corresponds to FIGURE 18; and FIGURE 22 depicts the spring-engaging means effective to engage the clutch upon stopping the engine to enable parking "in-gear" against engine-compression braking;

FIGURE 23 is a transverse section taken along the line 23—23 of FIGURE 20 showing details of the mechanical interlock operably incorporated between the servo-piston and spring-engaging means;

FIGURE 24 is a side elevation of a portion of the clutch housing on which a manually-operated push-pull mechanism is mounted to actuate said spring-engaging means in the direction of its vacuum energization, to disengage the clutch to free the engine for starting when coasting load is impressed on the drive line by roll of the vehicle when parked "in-gear";

FIGURE 25 illustrates a modification of the main control valve land whereby its cooperating fluid channel communicating with the clutch-servo is restricted to induce relative retardation of the engaging movements of the clutch members upon partial (slipping) engagement becoming effective;

FIGURE 26 is a sectional view through the shift-lever controlled switch taken on an enlarged scale from FIGURE 1 to clarify the details of construction;

FIGURES 27 and 28 are fragmentary enlargements of FIGURES 17 and 19, respectively, to clarify structural details of the minimum pressure lubrication valve and included pressure relief valve for the clutch-servo for "bleed-off" of excess oil to enable spring disengagement of the clutch, automatically, upon bringing the vehicle to a stop with the gearbox "in-gear" despite the main control valve element being mechanically locked in the position of FIGURES 19 and 28 corresponding to firm engagement of the clutch;

FIGURE 29 is an enlarged structural depiction in vertical-longitudinal section of the oil pressure-spring operated interrupter switch in closed disposition as shown in FIGURE 17;

FIGURE 30 is a transverse section taken along the line 30—30 of FIGURE 29 to clarify the segment-and-slot connection between the plunger-type actuator and axially adjustable spring seat;

FIGURE 31 illustrates an optional dual-pump and control valve assembly wherein one pump provides engine lubrication and the other pump supplies actuating fluid via the control valve for servo-actuation of the clutch;

FIGURE 32 is a longitudinal section taken along the line 32—32 of FIGURE 31 showing the pair of constantly meshing gears comprising the fluid working elements of each pump, and the common drive shaft for operating both pumps;

FIGURE 33 is a transverse section taken along the line 33—33 of FIGURE 31 showing details of the chambered conduit mounting plate for conveying oil via the ported support plate to and from the control valve body;

FIGURE 34 is a front elevation of the dual-pump and control valve assembly;

FIGURE 35 is a vertical section taken along the line 35—35 of FIGURE 34 showing details of the output and intake chambers and the spring-loaded pressure relief valve associated with said chambers;

FIGURE 36 is a view taken from the line 36—36 of FIGURE 35 showing the detachable conduit plate for connecting one end thereof to the pump output chamber;

FIGURE 37 is a view partly in section of the bolt arrangement for mounting the dual-pumps and control valve as a unit on the side of the engine cylinder block as shown in FIGURE 31; and FIGURE 38 is a schematic representation of the modified form of the invention shown in FIGURE 31, and wherein the servo-actuated clutch and associated oil and electric circuits and included components (devices) for controlling said servo are depicted in relative operating positions corresponding to FIGURE 17.

Referring now to the drawing, and particularly to FIGURE 1 thereof, there is disclosed a portion of an automotive internal-combustion engine E indicated by fragmentary portions of its crankshaft CF, flywheel FW, cylinder block CB, intake-manifold and associated carbureting system including the conventional carburetor throttle-plate and accelerator control therefor depicted schematically, in operative association with novel power-operated clutch and controlling means embodying my invention and which form the subject-matter of the present application. The flywheel incorporates a hydraulically-engageable friction clutch generally designated FC of substantially conventional construction and operation adapted to connect the engine to the conventional manually-shiftable transmission (gearbox) fragmentarily indicated at GB, and through which the ground wheels of the vehicle are driven at different driving ratios as is well understood in the art.

THE HYDRAULIC-ENGAGEABLE FRICTION CLUTCH

As best shown in FIGURES 1–19 inclusive, the engine-driven friction engaging device herein disclosed in the form of a fluid pressure engageable clutch FC is, operatively incorporated on the flywheel FW, and is enclosed by a a housing 10 which also encloses the flywheel, the latter being co-rotatable with the crankshaft CF by means of bolts 11 which secure the rear flanged end 12 of the crankshaft to said flywheel. The rear face of the flywheel has mounted thereon a centrally apertured cup-shaped backing or cover plate 13 having an annular outstanding flange 14 defining its forward open end contiguous to said face, said flange being secured to the flywheel face by means of cap screws 15 or otherwise, said plate having mounted thereon a movable pressure member (plate) 16 characterized by an annular friction face 17 on the side confronting a complemental friction face 18 in the rear face aforesaid of the flywheel. The periphery of said pressure plate 16 is defined by a plurality of radially projecting lugs 19 which have a normal width base 20 at the periphery of said plate, and an outer terminating narrower portion 21 to provide opposed shoulders 22 therebetween. The narrow portions of these lugs project through elongated longitudinal openings (slots) 23 formed in the cylindrical wall 24 of the cover plate 13 so that the shoulders 22 are disposed contiguously to the confronting marginal portions on opposite sides of said slots 23 as shown in FIGURE 1, to radially stabilize the pressure plate 16 in coaxial relationship to the axis of the clutch assembly, and also to lock said pressure plate to the cover plate for co-rotation and accommodate relative axial movement therebetween for operation of the pressure plate to engage and disengage the clutch FC as is understood. The pressure plate 16 is actuatable by a plurality of radially disposed clutch-operating levers 26 (usually three in number in circumferentially spaced relation) and which have their outer end portions 27 pivotally mounted in transverse slots 28 respectively, provided in a radially offset portion 29 of the cylindrical wall 24 of the cover plate 13, and, intermediate the aforesaid pivotal connection and inner free end portions 30, said levers being pivotally connected at 31 as by means of struts 32 to the pressure plate 16 at 33 whereby pressure applied to the free inner ends of said levers rotates them clockwise as viewed in FIGURE 1, on their outer pivoted ends to move the pressure plate 16 toward the flywheel friction surface 18 to engage the clutch as is understood.

A primary clutch driven disc assembly generally designated DA is slidably splined at 35 to the clutch output (driven) shaft 36 for co-rotation therewith, said splined formation being disposed adjacent the forward reduced shaft extension 37 which is piloted in a preferably roller-type bearing 38 nested in a complemental concavity 39 formed in the flanged end of said crankshaft best shown in FIGURE 1. This disc assembly is conventional in all respects and comprises a central hub 40 internally splined at 41 to engage complemental external splines 42 defining the aforesaid splined formation on said output shaft 36, and thereby relative axial floating movement therebetween is provided without interrupting co-rotational movement thereof, said hub being characterized by an annular outstanding flange 43. A friction disc FD is mounted on said hub to one side of said flange by means of a plurality of coil-type cushioning springs 44 (usually six in number) which are nested, respectively, in a corresponding number of normally registering rectangular openings 45 provided in radially offset relation to the axis of said output shaft 36, in a portion 46 of the disc, in said flange and a balance ring 47 mounted on the opposite side of the hub flange. The clutch disc and balance ring are further mounted as a unit on said flanged hub 40 by means of a plurality of rivets 48, opposite ends of the latter being reduced to extend through aligned holes 49, 50 in the balance ring and disc, with their normal body portions 51 normally occupying the middle portion of oversize slots 52, respectively, processed in the peripheral marginal portion of said flange 43, whereby the oversize relationship of the slots with respect to the rivet bodies provides opposite relative rotational movement of limited amount between the flanged hub and connected clutch disc assembly for the cushioning springs to function to absorb load and road shocks transmitted through the drive line to the clutch assembly FC thus contributing to smooth engagement to the clutch.

The opposing outer peripheral marginal portions on the clutch friction disc FD are provided with annular friction facings 53, 54, respectively. These facings are disposed between said friction working surfaces 17, 18 on the pressure plate and flywheel, respectively, to impinge the disc assembly between the presure plate and flywheel under pressure-plate actuation by the servo-piston 55 of a hydraulic clutch-servo designated CS best demonstrated in FIGURES 1, 17, 18 and 19, whereby the flywheel and pressure plate are frictionally locked to the clutch disc assembly to rotate as a unit for the transmission of engine drive-torque to the associated gearbox GB and drive line connected dirigible wheels of the vehicle.

A throw-out yoke (lever) 56 is pivotally mounted intermediately on the clutch housing by means of an interconnecting strut 57, the inner end portion of said lever being provided with a pair of spaced shoes 58 which straddle-mount the forward tubular extension 59 of a bearing and oil retaining flange 60 for supporting the rear end portion of the clutch output shaft 36 and through which said shaft passes into the transmission box as shown in FIGURE 1. The aforesaid shoes are engageable with a thrust bearing 61 slidably carried by the forward end portion of said extension 59 as shown, and the forward opposite side of said thrust bearing is adapted to act simultaneously on the inner free end portions 30 of the clutch-operating levers 26 and thereby actuate the pressure plate 16 toward the engine flywheel to clamp the friction faces on the disc assembly therebetween under servo-actuation of the outer free end 62 of said clutch yoke 56, to firmly engage the clutch FC for normal vehicular drive as is understood. The outer end of the clutch yoke is connected to the servo-piston 55 by means of a piston-rod 63, and an expansion coil spring 64 is adapted to react between the outer end of said clutch yoke and a fixed portion on the clutch-servo or adjacent clutch housing to oppose servo-actuation of said clutch FC into engaged condition, and therefore said spring serves, upon minimal non-activating pressure present in the clutch-servo, to retract the clutch yoke 56 and connected servo-piston and rod to normal positions wherein the clutch FC is fully disengaged as shown in FIGURES 1 and 17.

THE HYDRAULIC CLUTCH-SERVO

The clutch-servo CS is conventional in construction and operation, and comprises the aforesaid pitson 55 reciprocable in a cylinder 66 closed at one end by an integrated wall 67, and the open end thereof being closed by a fluid-tight detachable cover (plate) 68 secured to the cylinder by cap screws 69 or otherwise. The outer central portion of the cover 68 is provided with a cylindrical tubular extension 71 which slidably supports the piston-rod 63 as shown, and also serves as the means for mounting the servo unit on the side of the automobile engine by projecting through coaxial longitudinal holes 72 processed in a flanged portion 73 of the clutch housing and cylinder block CB best demonstrated in FIGURE 1. The rear free end portion of said extension is externally threaded at 74 for reception of a lock-nut 75 to draw the marginal portion 76 of the servo cover into firm engagement with the engine block flange as shown, thus rigidly mounting the clutch-servo CS on the engine block in operative position to cooperate with the free end of the clutch throw-out lever 56 to operate the clutch FC as is understood. The aforesaid extension 71 may be integral with the cover 68 or separate as shown with a forward annular flange 77 nested in a complemental recess 78 formed in the inner side of said cover and defining the inner open end of said tubular extension. The piston 55 is suitably attached to the forward end of the piston-rod 63 for reciprocable movement within the servo-cylinder 66, as a unit. The periphery of the servo-piston is defined by an annular channel 79 which carries a lip-type pressure seal 81 exposed to the variable working chamber 82 between said piston and end wall 67, and the opposite side of said piston defines with the inner side of the detachable cover 68, a constant (atmospheric) pressure chamber 83 continuously vented to the atmosphere via vent hole 84 in said cover, and with which a filter device may be associated to prevent dust, etc. from entering the interior of said servo-cylinder 66 with possible damage to the working surfaces between said piston and inner finished surface 85 of said cylinder. A passage 86 is provided through an outstanding boss integral with the end wall 67, said passage terminating exteriorly of the cylinder in a rigid tubular fitting 87 which receives one end of a flexible conduit 88 for conducting pressure flow into the working-chamber 82 of the clutch-servo CS.

THE MAIN CONTROL VALVE FOR THE CLUTCH-SERVO

The main control valve unit for the hydraulic clutch-servo is of novel construction and operation and generally designated CV. It is preferably mounted on the pump side of the engine block so that a single conduit can serve to interconnect the pressure output side of the valve with the working-chamber 82 of the clutch-servo CS as shown in FIGURE 1. This control valve unit serves as the outer cover assembly for the pump housing 90, the latter being integral with the outer lower intermediate portion of the cylinder block CB adjacent the open side of the crankcase thus providing an accessible and compact pump-fed control valve assembly for the clutch-servo CS as well as enabling the engine-driven lubricating pump LP to serve the additional function of supplying engine oil under controlled pressure to actuate the clutch-servo CS from the oil contained in the sump of the crankcase which serves as a common source of fluid supply for both lubricating and clutch-actuating purposes. The pump housing contains the conventional pair of constantly meshing gears driven from the camshaft of the engine by means of a gear-connected drive shaft 91 best shown in FIGURES 2A and 8.

The main control valve CV essentially includes a valve body 92, valve plate 93 and adapter plate 94 assembled in stacked relation in that order on the pump housing 90 with their mating faces oiltight under pressure of three cap screws 95 passing through aligned holes into threaded engagement with holes in said pump base integrally projecting at an angle from the lower middle of the upper half of the crankcase as shown in FIGURE 2A. To facilitate assembly and inspection, and insure fluid-tight seal between these valve components, the valve body and valve and adapter plates are first combined in a subassembly as by a pair of cap screws 96 threaded into aligned holes in the valve body to serve as dowels as shown in FIGURES 1, 2, 2A, 3, 4 and 6, then this subassembly is mounted as a unit on the pump housing by the cap screws 95 to produce a unitary pump and control valve assembly for the clutch-servo CS.

The valve body is processed with a coextensive longitudinal bore 97 open at both ends and having cross drainage passages at 98 and 99, and in which a spring-loaded composite valve element disclosed herein as a piston VP slidably operates in fluid-tight tolerance, from normal position wherein fluid pressure modulation effective in said clutch-servo CS ranges from a non-activating pressure for spring-disengagement of the clutch FC to a more intensified pressure to activate said clutch-servo CS to effect partial (slipping) engagement of the clutch FC, to a pressure interrupting position wherein servo-actuation is suspended to stabilize the clutch FC in partial engagement, and through a range of fluid pressure controlling positions effective to additionally activate the clutch-servo CS to effect firm engagement of the clutch FC under operator-supervision, said normal position serving for low pressure operations of said clutch-servo while said range positions provide for high pressure operations of the clutch-servo graduated in accordance with the effectiveness of the fluid pressure in said clutch-servo to enable the operator to "inch" the friction engaging members of said clutch into smooth firm engagement. Accordingly, said pressure controlling positions define three stages of clutch engaging operations from disengaged to partially engaged to firmly engaged condition, respectively.

The valve piston VP comprises a left and right spool-type element 100, 101, respectively, telescopically connected at their inner ends by a psring-loaded connection SC comprising a split retaining ring 102 mounted in an annular groove 103 embedded adjacently the open end of a blind axial bore 104 in the left valve element 100, and an annular flange 105 defining the confronting end of the right valve element 101 best depicted by FIGURE 4. The split ring and flange produce a pair of cooperating abutment-engaging portions biased into normal abutting relation by a normally compressed spring 106 operably disposed in said axial bore to react between the closed end thereof and said flange to establish the normal axial relationship of said valve elements as shown in FIGURE 4 to initially move as a unit from normal position of the said valve piston VP to said first-named fluid-pressure controlling position wherein servo-actuation of the clutch FC is interrupted thus establishing the latter in partial (slipping) engagement to serve as a preconditioning operation to insure smooth firm engagement under additional servo-actuation for normal vehicular drive, in response to a series of movements of the right valve element 101 relative to the left valve element 100 accommodated by yielding of the spring 106, and thereby producing said plurality of fluid-pressure controlling positions.

The left valve element 100 is further provided with a reduced cylindrical extension 107 integral at one end with the reduced diameter closed end 108 of the axial bore 104, and which is detachably connected as by threads to the movable armature 109 of a solenoid generally designated $S^a$ which includes a sleeve-type winding 111 contained in an insulated cup-shaped housing (casing) 112 closed at its outer end by an integrated wall 113, and mounted by means of its open outwardly flanged end 114 on the left end face of said valve body in coaxial relationship to the axis of said valve piston VP, with cap screws 115 projecting through a like-number in flange 114 into registering threaded holes formed in the end of said valve body as shown in FIGURES 1, 2, 2A, 4 and 6. One end of the winding 111 is grounded at 116, and the other end passes through an insulated opening in the casing for connection to a terminal 117 fixed on the casing and connected to a conductor 118.

A centrally apertured stop washer 119 is nested in a complemental recess 120 defining the left open end of the longitudinal bore 97, contiguously to the end of the solenoid winding flush with the open end of said casing (see FIGURE 4). The extension 107 passes through the aperture in said stop washer which serves to seal off the solenoid winding from said bore 97, and also acts as a stop to define the fully retracted position of both valve elements when initially moved as a unit by solenoid $S^a$ to establish the clutch members in partial (slipping) condition as shown in FIGURE 18 in which position of the left valve element, the reduced end 108 abuts said stop washer. Accordingly, when the winding of solenoid $S^a$ is energized, its armature 109 is retracted from normal protracted position shown in FIGURES 4 and 17 to fully retracted operating position shown in FIGURE 18 to move both valve elements as a unit to induce the aforesaid partial engagement of the clutch FC in response to halting initial servo-actuation upon the latter effecting such partial clutch engagement. Such initial movement of the two valve elements 100, 101 as a unit is opposed by a normally compressed valve return spring 121 incorporated in a counterbore 122 terminating the right end portion of the aforesaid longitudinal bore 97, to react between an internal annular shoulder 123 defining the juncture of said bores 97, 122 and an outstanding annular flange 124 of substantially the same diameter as said counterbore, said flange defining the extreme right end of the right valve element 101, and adapted to abut a split retaining ring 125 mounted in an annular groove 126 embedded adjacent the outer end of said counterbore 122 to serve as stop means for said valve piston VP when fully retracted under influence of its return spring 121 which normal setting of said valve piston cannot be effected by said spring until solenoid $S^a$ has been de-energized as demonstrated in FIGURE 4.

The right end portion of the right valve element 101 is processed with a blind axial bore 127 which receives an actuating plunger 128 with its free end normally spaced at 129 from the bottom of said last-mentioned bore, said plunger being connected for movement by a flexible diaphragm 131 contained in a cylindrical cup-shaped casing 133 comprising a vacuum-modulated diaphragm unit (motor) generally designated VD. The motor cylinder 133 is closed at its outer end by an integrated wall 134, and the open end thereof contiguous to the right end face of the valve body 92, is defined by an annular outstanding flange 135. The peripheral marginal portion 136 of said flexible diaphragm 131 is clamped between said casing flange and confronting face portion on the right end of the valve body in airtight sealed relation as by means of cap screws 137 projecting through a like-number of holes in said casing flange into threaded engagement with a like-number of holes in the valve body, to thereby mount the diaphragm motor VD on the right end of said valve body in coaxial operating relationship with respect to said valve piston VP as shown in FIGURE 4. The diaphragm-actuated plunger 128 is annularly flanged at its right end from which a reduced extension 138 projects through a central hole 139 in the diaphragm and a coaxial hole 141 in a cup-shaped backing plate 142 to connect the plunger for actuation by said diaphragm as by peaning the exposed end of the reduced extension against the marginal portion of the hole in the backing plate as shown in FIGURE 4. This backing plate is cylindrically flanged at its periphery to provide a spring seat for a normally compressed power-spring 143 operably positioned within a vacuum chamber 144 disposed between the diaphragm and outer end wall 134 of the motor casing 133 as shown, said power-spring being additionally energizable compressed upon full retraction of said diaphragm to normal position under pressure differential actuation induced by high vacuum effective in the engine intake-manifold therefore chamber 144. Release of this power-spring to protract said plunger 128 into engagement with the bottom of the blind axial bore 127 and thereby moving the right valve element 101 as a function of progressively lowering of vacuum efficiency in the intake-manifold as a function of actuating the throttle-plate TP in an engine-accelerating direction. Accordingly, as the throttle is opened, vacuum efficiency is proportionally lowered which correspondingly releases the power-spring 143 for movement of the right valve element 101 in opposition to reaction from springs 106, 121, thus positioning said right valve element in fluid-pressure controlling positions as shown in FIGURES 10 and 19 to additionally energize the clutch-servo CS to control firm engagement of the clutch FC. It is important to note here that the operating strength of the power-spring 143 is greater than the combined reactions from springs 106, 121, therefore the power-spring has the capability of overcoming these two latter springs in effecting relative movement of the right valve element 101 with respect to the left valve element 100 following initial unitary movement thereof. The end wall 134 of the motor cylinder 133 is provided with a central hole 145 through which one end of a rigid tubular fitting 146 projects in airtight fixed relation, and the outer free end of this fitting receives one end of a flexible conduit 147 communicating with the interior of the intake-manifold of the engine as shown in FIGURES 1 and 17. The plunger side of the diaphragm 131 is normally spaced from a tapered-wall concavity 148 defining the outer extreme end portion of said counterbore 122 to provide therebetween a constant (atmospheric) pressure chamber continuously vented, for example, to the inside of the engine tappet cover (not shown) by means of conduit 149 as shown in FIGURES 1, 3 and 4.

It is thus seen that when high vacuum exists in the engine intake-manifold as a consequence of idling operation of the engine, that the diaphragm and connected plunger 128 are retracted in opposition to the power-spring 143 to the positions shown in FIGURE 4 to additionally energize compressing this spring, but upon opening the engine throttle TP to increase engine speed therefore its torque output, vacuum generated in the intake-manifold is lowered in efficiency with consequent release of the power-spring 143 to progressively protract the diaphragm plunger and thereby move the right valve element 101 of the valve piston VP relatively to the left valve element 100 to the position of FIGURE 19 wherein the clutch FC is regulatable into firm engagement as will appear.

The right valve element 101 is additionally processed with a pair of annular outstanding control lands 151, 152 and an elongated fluid-retaining bearing land 153 defining the right end portion thereof and which is normally encircled by the spring 121 therefore normally disposed in circular alignment with said counterbore 122. These three lands are longitudinally spaced in coaxial relationship by means of two reduced diameter portions therebetween as shown in FIGURE 4. One of the reduced portions 154 projects rearwardly from the control land 151 and terminates in the aforesaid annular flange 105 which serves as one of said abutting portions comprising the telescopic connection between said valve elements 100, 101. The aforesaid longitudinal spacing of the three lands divides the valve bore 97 into two fluid chambers 155, 156 with chamber 155 having an indented annular channel 157 defining the right side thereof, and chamber 156 having a fluid channel 158 indented intermediately thereof to define an internal working land 159 separating said channels 157, 158 in the normally retracted disposition of the valve piston VP as shown in FIGURE 4.

Control land 151 selectively cooperates with fluid channels 157, 158 in such manner that pressure output from the pump LP is received through fluid channel 157 as modulated pressure when the main valve piston VP is in normal fully retracted position as shown in FIGURE 4, and conveyed via channel 158 into the servo-working chamber 82 at two selective modulating pressures, one enabling full clutch disengagement and the other effecting partial engagement thereof. Thus, when the main control valve CV is in normal position of fluid control, either full clutch disengagement or partial engagement thereof is selectively available, while movement of the control land 151 to the position of FIGURES 9 and 18 is effective to isolate channels 157, 158 therefore pump output pressure from said servo-working chamber, and thereby stabilizes the clutch FC in partial (slipping) engagement. Upon such movement of the control land, pressure output from the pump LP is placed in direct communication with said servo-working chamber via interconnected channels 157, 158 to additionally energize the clutch-servo CS to firmly engage the clutch FC as shown in FIGURES 10 and 19 in accordance with engine acceleration.

Opposite sides of the control land 152 are formed as an annular vertical face 161 and an angular (tapered) camming face 162, respectively, and which are centrally connected to lands 151 and 153, respectively, by means of said reduced portions as shown in FIGURE 4. The control land 152 is adapted to stabilize the valve element 101 of the valve piston VP in the position of FIGURES 10 and 19 despite reaction from spring 121 in cooperation with normalization of spring 106 being effective to bias said valve elements into normal relationship and both of them as a unit toward normally retracted position as shown in FIGURE 4.

A pair of parallelly spaced chambers 164, 165 are formed horizontally in the valve body 92 in overlapping relation in the intermediate portion of the valve bore 97 and subjacently to the valve bore 97. These two chambers are separated by a horizontal wall 166, and a port 167 through said wall interconnects said chambers. The upper chamber 164 communicates via cross passage 168 with the bore chamber 155, and the opposite (right) end of chamber 164 is interconnected with bore chamber 156 by a vertical bore 169 for an important purpose to appear.

Parallelly disposed above the valve bore 97 is a shorter longitudinal bore 170 in the valve body, and which extends from the left end of said valve body into a rectangular chamber 171 in continuous communication with fluid channel 157 via passage 172. The right wall 173 of chamber 171 is ported at 174 as by drilling which port terminates on the chamber side in an annular valve seat 175, with the right end of said port opening into an elongated chamber 176 adapted to receive working fluid from the pump LP. Slidably mounted in the bore 170 is a cup-shaped valve piston 177 having a forward reduced extension which terminates in a poppet-type valve head 178 characterized by an annular tapered face 179 complemental to and cooperating with the aforesaid seat 175 to produce a minimum pressure lubrication control valve generally designated LV best shown in FIGURES 4, 27 and 28. The closed end of a cylindrical chamber 180 in this valve piston incorporates a ball-type pressure relief check-valve CK[a] adapted to control a transversely disposed restrictive flow control orifice (slot)

181 which normally communicates with chamber 171 and intersects a reduced diameter blind axial bore 182 defining the closed end of said chamber 180. The open end of the latter bore terminates in an annular seat 183 complemental to a portion of the curvature, less than half the diameter, of the check-valve ball 184 to control fluid flow from chamber 171 via slot 181, bore 182 into chamber 180. The left portion of bore 170 terminates in a counterbore 185 which receives a closure plug 186 processed with longitudinal surface channels intersected by an external annular channel 187 communicating with a vertical drainage passage 188 opening into the left end of the valve bore 97 as shown in FIGURE 4.

Projecting forwardly from the plug 186 is a reduced-extension coaxial with said cup-shaped piston 177 and serving as a guide for one end of a normally compressed spring 189 adapted to react between the right face of said plug and said cup-shaped piston to bias the poppet head 178 of the latter into seated engagement with its seat 175 whereby minimum lubricating pressure defined by the installed tension of spring 189 is maintained in the engine oil gallery for the working parts of the engine during relatively low to idling speeds of the engine best shown in FIGURES 4 and 27, before any oil is diverted for servo-actuation of the clutch FC, such low operating speeds of the engine without this lubricating pressure control valve, would tend to starve the oil gallery since the pump LP must also supply sufficient working fluid to energize the clutch-servo CS at such low speeds of the engine to effect partial engagement of the clutch FC. Upon higher speeds of the engine being attained to firmly engage the clutch FC, the lubricating control valve LV moves off its seat to admit a larger volume of fluid into chamber 171 for servo-actuation of the clutch FC as is understood.

A normally compressed helical spring 190 is adapted to react between said check-valve ball and an apertured plug 191 which closes the open end of said chamber 180 in the valve piston 177 by threaded engagement therewith, said spring being installed under such tension as to yieldably maintain the ball seated to establish the residual line pressure at approximately 2 p.s.i., and in the valve body as well.

Interposition of the restrictive check-valve CK$^a$ in the lubrication valve LV, serves the important function of bleeding off oil trapped in the conduit 88 and working chamber 82 when the main control valve is positioned as shown in FIGURES 10 and 19, into the drainage passage 188 between the bores 97, 170 to insure full clutch disengagement of the clutch FC upon bringing the car to a full stop with the engine idling. Such trapping of the oil results from possible closure (seating) of the lubrication valve LV at low vehicular speeds above that defined by substantial idling speed of the engine. The lubrication valve LV determines the pressure on the oil that is first directed into the oil gallery before any oil can be diverted for servo-actuation of the clutch, therefore the spring setting of this valve maintains a minimal lubricating pressure of approximately 8–10 p.s.i. sufficient to prevent full clutch disengagement under influence of spring 64. Thus, the restrictive flow control slot 181 is placed in communication with the chamber 171 when the lubrication control valve LV seats so that the servo-piston 55 under influence of spring 64 can return to full clutch-disengaged position as shown in FIGURES 1 and 17 notwithstanding the main valve piston VP is mechanically locked in position of FIGURES 10 and 19, such disengaging action of the clutch FC being accommodated by spring-expulsion of excess oil from the servo-working chamber 82 and conduit 88 through said "bleed-off" slot 181 via the check-valve CK$^a$, the latter being adapted to establish the aforementioned minimal residual pressure of approximately 2 p.s.i. in the valve body and associated hydraulic circuits.

Figure 5:
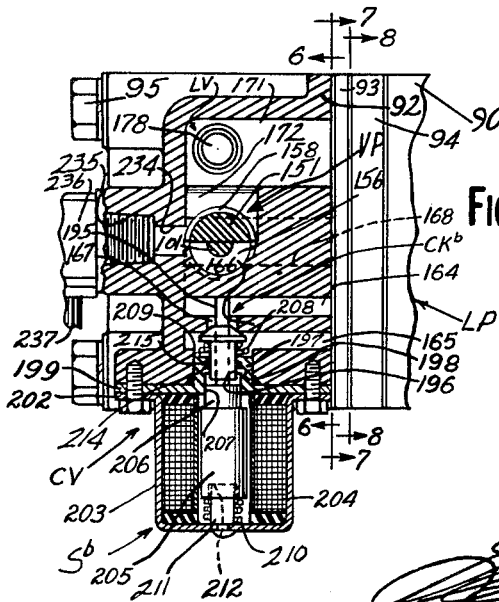
FIGURE 5 is a transverse section taken along the line 5—5 of FIGURE 4.

A novel two-stage check-valve controllable by solenoid S$^b$ is shown at CK$^b$. This check-valve assembly is mounted intermediately of the bottom side of the valve body 92 in axial alignment with the aforementioned bore 169 as shown in FIGURES 4 and 5. The dual-functioning check-valve CK$^b$ comprises an axially bored valve stem 192 provided at its upper end with a poppet-type head 193 having an annular tapered face adapted to cooperate with a complemental seat 194 defining the lower end of said bore 169, and normally disposed in seated relation therewith as shown in FIGURES 4, 5 and 17. An elongated interlocking element (pin) 195 controllable by solenoid S$^b$ slidably projects through the axial bore in the valve stem 192 best shown in FIGURES 4 and 5, and thence through the aforementioned bore 169 which opens into the chamber 156 of the valve bore 97. The upper end of said interlocking pin 195 is adapted to cooperate with the annular face 161 on the conrtol land 152 to prevent the right valve element 101 moving under influence of springs 106, 121 from retracting from fluid-controlling positions of FIGURE 10 back to normal position of FIGURE 4 during normal highway operation of the vehicle or when releasing the accelerator momentarily for a braking operation which induces high manifold vacuum causing retraction of the diaphragm 131 against its power-spring 143 to the position of FIGURES 4 and 17 wherein the valve element 101 is freed for such spring-movement, were the interlocking pin not present to block such fortuitous action of the control valve piston VP. Accordingly, the interlocking pin 195 and control land 152 cooperate when the right valve element 101 is positioned for firm clutch engagement control, to prevent "shuttle-action" of the clutch FC between firm and partial engaging relation when the accelerator pedal AP is released and then depressed during normal driving of the vehicle, thus averting slipping transferral of torque from the engine to the ground wheels with consequent loss of engine-compression braking as well as positive drive of the vehicle when operating in its normal range after getting underway to maximum speed for economy of operation.

The valve stem 192 is slidably supported in an axial bore 196 formed in a cylindrical boss 197 upstanding through a bore 198 which interconnects the lower chamber 165 with the bottom side of the valve body 92 as shown in FIGURES 4 and 5. The lower end of this boss is circularly flanged at 199, said flange being disposed contiguously to the confronting face on the bottom side of the valve body as shown. This circular flange is fitted oiltight against the valve body by means of a plurality of cap screws, as shown, which engage threaded holes after projecting through aligned holes in an annular outstanding flange 202 defining the open end of a cup-shaped housing (casing) 203 containing the sleeve-type winding 204 comprising the solenoid S$^b$, and in which the armature 205 is reciprocable in response to energization and de-energization of said winding to actuate the interlocking pin 195, thus controlling the two staging operations of the check-valve CK$^b$ to produce the aforementioned selective modulating pressures from the pump LP to control clutch disengagement and partial engagement thereof. The upper reduced end portion 206 of said armature 205 is connected by a pressfit of the lower end of said pin into a blind axial bore or otherwise, to move as a unit, said reduced end being movable in a counterbore 207 defining the lower end portion of said bore 196, with the extremity of said portion 206 being normally spaced as shown in FIGURES 4 and 5, from the lower end of the valve stem 192 of the poppet head 193 to enable the latter to move from its cooperating seat in opposition to a preferably conical compressed spring 208 having its lower larger end seated in a circular recess 209 provided by offsetting the upper end of the boss 197 downwardly from the bottom of the lower chamber 165 as shown, and the upper smaller end of this spring being adapted to encircle the stem 192 adjacent the underside of the poppet head 193, said conical spring being installed under sufficient tension to maintain the aforesaid residual line pressure at substantially 2 p.s.i. within the valve body and associated oil circuits, in cooperation with the aforementioned check-valve CK$^a$, to prevent fluid cavitation therein with consequent delayed fluid-activation of the servo-piston 55. Another heavier compressed spring 210 is installed under a predetermined tension between the lower end of the armature 205 and confronting face portion on the end wall of the solenoid housing 203. A spring-guide-pin 211 fixed at its lower end to the housing wall, projects into a blind axial hole 212 in the lower end portion of the solenoid armature 205. The bottom of this hole normally engages the upper end of the guide-pin when the armature is fully retracted under magnetic energization of the winding 204 to dispose the reduced end of the armature normally spaced from the lower end of the valve stem 192 as shown in FIGURES 4, 5 and 17. Under these conditions the second stage operation of the check-valve CK$^b$ under joint influence of springs 208, 210 is ineffective, but upon de-energization of the winding 204 as shown in FIGURE 18, this latter spring being released to protract the armature 205 upwardly into engagemnet with the lower end of the valve extension 192 and thereby combining the force of spring 210 with that of the lighter conical spring 208, to react jointly to more firmly hold the valve seated thus raising the pressure within the valve body 92 to approximately 8 p.s.i. against the clutch servo-piston 55 to activate the latter to effect partial engagement of the clutch FC as shown in FIGURE 18. Accordingly, when solenoid S$^b$ is energized as shown in FIGURES 1, 4, 5 and 17, its armature 205 is retracted out of engagement with the lower end of the check-valve stem 192 so that only the lighter conical spring 208 remains effective thereon, but when the solenoid S$^b$ is deenergized as shown in FIGURES 18 and 19, the armature-controlled spring 210 is released to cooperate with the upper lighter spring 208 to thus increasing biasing pressure against check-valve CK$^b$ to releasably hold it on its seat and thereby raising pressure within the valve body to about 8 p.s.i. to initially activate the clutch-servo CS to partially engage the clutch FC as shown in FIGURE 18. An O-ring seal 214 is provided in an internal groove 215 formed in the intermediate portion of the bore 196 to prevent seepage from the lower horizontal chamber 165 past the valve stem 192, and the circular intersection of the boss 197 and circular flange 199 is likewise sealed by means of an O-ring 216 confined in a tapered groove 217 in cross section, defining the intersection of the bore 198 and bottom side of the valve body 92. The inner and outer ends of the winding 204 pass through insulated openings, respectively, in the solenoid housing 203 as shown in FIGURES 2, 2A, 3 and 4, for connection via outer terminals 221, 222, respectively, in series with a conductor 223 as shown in FIGURES 1, 4 and 17.

When solenoid S$^b$ is energized, the interlocking pin 195 is withdrawn to the position of FIGURE 4 out of the path of the control land 152, and wherein first stage spring-action of the check-valve CK$^b$ is effective to establish the minimal line pressure of 2 p.s.i., but upon de-energization of the solenoid S$^b$, the interlocking pin 195 is released for upward movement by spring 210 as well as the armature 205 to dispose the upper end of pin 195 in the path of the control land 152 and thereby increasing pressure against the check-valve CK$^b$ to modulate (increase) pressure on the oil above the minimal residual pressure value. However, upon initial movement of the left and right valve elements 100, 101 as a unit under energization of solenoid S$^a$ to the position of FIGURE 9, the camming face 162 on the land 152 forces the interlock pin 195 downwardly against the biasing action of spring 210 along with the armature 205 to the position of FIGURES 4 and 17 as though solenoid S$^b$ were energized to effect such movement, and thereby holds these elements momentarily in such retracted positions by the upper end of the interlock pin engaging the circular peripheral face of the land 152, whereupon further depression of the accelerator pedal AP brings the vacuum-modulated unit VD into action to release its power-spring 143 to push the valve element 101 relatively to the valve element 100 to the position of FIGURE 10 which releases the interlock pin 195 and connected armature 205 to move upwardly under influence of spring 210 to dispose the upper end of the interlock pin in the path of movement of the vertical face 161 of the control land 152 thus blocking displacement of the right valve element 101 from firm clutch-engaging position of control and also enabling spring 210 to cooperate with the lighter conical spring 208 to activate second stage operation of the check-valve CK$^b$ to raise the pressure within the valve body to approximately 8 p.s.i. for servo-activation of the clutch members into partial slipping relation as shown in FIGURE 18.

Output pressure from the pump LP is conveyed into the valve body 92 via output port 224, surface channel 225 in the adapter plate 94 (see FIGURE 8), and port 226 in the valve plate 93 (see FIGURE 7), and thence into the elongated chamber 176 embodied in the valve body 92. Modulated pressure flow within the valve body 92 is conveyed by the upper horizontal chamber 164, port 167, past the poppet head 193 to the lower horizontal chamber 165 (see FIGURE 4) through elongated opening 227 in the valve plate thence to a triangular-shaped cavity 228 in the adapter plate into the intake suction port 231 in the pump housing 90 as shown in FIGURE 8. An optional return for the oil may be provided by a separate drainage line leading from the chamber 165 and which would communicate directly with the oil sump in the engine crankcase rather than the aforesaid suction port 231.

Seepage past the minimum pressure lubrication control valve piston 177 and main valve piston VP, is conveyed to the intake port 231 of the pump LP, or optionally via a separate drainage line communicating directly with the oil sump, by the drainage surface channels in the plug 186, annular channel 187 and vertical passage 188 into the valve bore 97, thence into passages 98, 99 and connected surface channels 232, 233, respectively, the latter channel emptying into the lower suction chamber 165 as shown in FIGURE 4. Excess oil released from the servo-working chamber 82 by the check-valve CK$^a$ is conveyed into the chamber 180 of the lubrication valve piston 177, thence through the aperture in the plug 191 via said surface channels in the aforesaid plug 186 to the annular intersecting channel 187 and the vertical passage 188 into the valve bore 97, from which such excessive oil passes through the passages 98, 232 into the suction line 231, or optionally into a separate drainage line communicating directly with the oil sump, for recirculation by said pump as is understood.

The aforesaid fluid channel 158 communicates with the exterior of the valve body 92 via passage 234, the outer end of which terminates in an internally threaded portion 235 adapted to receive the externally threaded portion of a rigid L-shaped tubular fitting 236 having a tubular portion 237 projecting into the upper end of the aforesaid conduit 88 in the oil circuit between the clutch-servo CS and control valve CV best demonstrated in FIGURES 1 and 5.

THE YIELDABLE THRUST-TRANSMITTING MECHANISM AND INCLUDED CLUTCH PLATE-CONTACT DETECTOR SWITCH

The novel yieldable thrust-transmitting mechanism (connection) generally designated YC is operatively interposed in the servo piston-rod 63 between the outer free end 62 of the clutch yoke 56 and the servo-piston 55 best demonstrated in FIGURES 1 and 11. In a broader patent sense, this novel connection may be said to interconnect the clutch-servo CS with the movable pressure plate 16 of the clutch FC. The piston-rod terminates in an enlarged hollow (chambered) head 240 closed at its rear end by an integrated wall 241 formed exteriorly dome-shape, and a longitudinally spaced closure plug 242 having a flanged hex-configuration threadedly engaging its open end to close the same as shown. The end wall of the cylindrical chamber 243 has an exterior hexagonal configuration (see FIGURE 12). The dome-shaped end is adapted to engage a complemental socket 244 formed in the vertical segment of the clutch throw-out lever 56 adjacent its outer free end 62. A central extension 245 projects rearwardly from the dome-end through an aperture 246 in the bottom of the central portion of said socket, the outer free end of said extension carries a retaining washer 247 spaced from the outer side of the marginal portion of said aperture, and is stabilized in this position by means of a cotter pin 248 to prevent fortuitous disengagement between the head 240 and throw-out lever. The threaded plug is processed with a longitudinal bore 249 which passes through a forward extension 251 provided with a pair of diametrically opposed horizontal slots 252 through which opposite ends of a cross pin 253 pressfitted through a cross bore in the push-rod, project, said cross pin serving when engaged with the forward ends of said slots to establish the normal relative movement of the piston-rod with respect to the head 240 as shown in FIGURE 11.

The free end of the piston-rod 63 slidably projects through the bore 249 into chamber 243. That portion 254 of the free end of the piston-rod normally extending into the chamber 243 is reduced in diameter to provide an annular shoulder at 255 normally lying flush with the inner face of said threaded plug which relative position of the shoulder is controlled by the cross pin 253 in abutting relation with the forward (right) ends of said pair of slots. A thrust-washer 256 is mounted on said reduced portion 254 contiguously to said shoulder and the inner face of the threaded plug, and a centrally apertured normally tensioned star-shaped flat spring 257 (see FIGURE 13), is operatively positioned within said chamber 243 on said reduced portion 254 in juxtaposed relation to said thrust-washer, to react between the rear (left) end wall 241 and the thrust-washer to bias the latter and said piston-rod as a unit into normal relative disposition with respect to the head 240 as shown in FIGURES 1 and 11 wherein the extreme end of the reduced extension 254 is predeterminately spaced from the inner face of the end wall 241 to produce what may be termed a pair of abutment-engaging elements as shown. This space enables limited relative movement of the piston-rod and thrust-washer as a unit with respect to the head 240 therefore the clutch throw-out lever, upon actuation of the latter by said clutch-servo CS to establish the clutch friction members in slipping contact as shown in FIGURE 18. The installed tension of spring 257 defines substantially the major portion of thrust transmittable by the servo-piston 55 through the piston-rod 63 and connected clutch yoke 56 to effect partial slipping contact, thus limiting initial clutch-actuation by the clutch-servo CS to partially engage the clutch as will appear. Upon such partial engagement becoming effective, further servo-actuation modulates such slipping engagement of the clutch members in accordance with the thrust-transmitting capability of the spring 257 at normal tension plus increasing build-up of tension as a function of said relative movement between the servo-piston 55 and clutch FC as shown in FIGURES 11 and 15 respectively, to operate a control device disclosed herein as a clutch-contact detector switch generally designated DS from open to closed position for sensing initial contact of said clutch friction members as depicted by FIGURES 14 and 16, respectively.

Upon such relative movement being taken up as shown in FIGURE 15, the end of the piston-rod extension 254 engages the inner face of the end wall 241 of the head 240 to enable the servo-piston 55 to apply thrust directly against the throw-out lever 56 via its push-rod 63 to firmly engage the clutch friction members. Under this condition, the detector switch DS will remain closed until disengagement of the clutch FC occurs as when stopping the vehicle or when effecting a speed-change in the gearbox GB as is understood.

The FIGURE 14 longitudinal-vertical section of the detector switch DS discloses its structure as comprising a hexagonal hollow switch body 260 open at one end and closed at the other to provide a cylindrical chamber 261 therein, the body being supported on a generally S-shaped bracket 262 disposed in horizontal position, by clamping its depending leg 263 between the flanged hex-portion of the threaded plug 242 and confronting open end of the enlarged push-rod head 240 which cooperates with the outer end 62 of the clutch-yoke 56 as shown in FIGURE 1, and by clamping the upstanding leg 264 of said bracket between the outer side of the closed end of the switch body and a jam-nut 265 engaging an externally threaded extension 266 integral with the closed end of said switch body as shown. The open end of the switch body is closed by means of a circular insulative block 267 as shown, and which carries a pair of spaced terminals 268, 269 projecting fixedly therethrough and terminating at their inner end in contacts 270, 271, respectively, and the outer ends being connected in series with the aforementioned conductor 118. A contact plate 273 is movably disposed within said chamber 261, and functions to bridge said contacts 270, 271 thus completing an electrical connection between said contacts, said contact plate being normally urged out of engagement with said contacts 270, 271 by a normally compressed spring 274 disposed within the switch body. The normal status of the aforesaid springs 275, 274 defines the degree of thrust transmittable by the clutch-servo CS to effect initial slipping engagement of the clutch friction members and, upon said clutch-servo transmitting additional thrust these two springs yield for relative movement of said abutment-engaging elements 241, 254 into engaging relationship and closure of the detector switch DS, respectively, and thereby modulating the aforesaid initial engagement with corresponding increase in the torque-transmitting efficiency of said clutch friction members preliminary to the latter being operated into engagement for co-rotation by said clutch-servo acting directly through said engaged abutment elements without interrupting the closed status of said detector switch. The contact plate 273 is connected to the left end of a stem 275 axially disposed within said chamber 261. This stem terminates at its right end in an annular outstanding flange 276 which defines the normal position of an insulative washer-like disc 277 as shown. The contact plate 273, stem 275 and disc 277 move as a unit under influence of a normally compressed spring 278 which encircles said stem between said plate and disc to establish normal relative axial relation therebetween as shown in FIGURE 14. The insulative disc 277 is larger in diameter than contact plate 273 so that return spring 274 can freely encircle the contacts 270, 271 and contact plate 273. This latter spring reacts on the disc 277 in a direction urging it away from the contacts 270, 271 to unbridge (disconnect) the same as shown in FIGURE 14. The effect of spring 274, therefore, is to tend to bias the stem and connected contact plate 273 axially away from the contacts 270, 271, to open the electric circuit 118 controllable by said contacts.

An axial bore 279 is provided through the threaded extension 266 and communicates with the chamber 261. A switch operating plunger 281 slidably projects through said bore, and which is processed with a blind axial bore 282 in its inner end portion for reception of the right rivet head on the stem so that this end of the plunger can act directly on the disc 277 when urged inwardly against spring 274 to move the contact plate 273 through the agency of the interposed spring 278 under normal bias, into bridging relation with the contacts 270, 271. This interposed spring also performs an additional function after the contacts have been bridged by yielding of accommodating slight additional movement of the disc relative to the contact plate and connected stem 275 to prevent fortuitous unbridging of said contacts from vehicle vibrations and therefore maintaining closed circuit control by the detector switch DS as shown in FIGURE 16.

The outer end 283 of the plunger is preferably dome-shaped for engagement by an actuating element 284 normally spaced at its inner end from the dome-end of the plunger wherein the detector switch DS is open as shown in FIGURE 14, to force the plunger 281 inwardly of the switch body and thereby effecting closed contact position of the contact plate 273 as shown in FIGURE 16.

The outer end 285 of this actuating element terminates in a tubular hub 286 through which the normal diameter of the servo piston-rod 63 passes, and is fixed thereon to move as a unit therewith by means of a cross pin 287 pressfitted through aligned holes in the hub and piston-rod as shown. Accordingly, when the piston-rod is moved from normal position leftward by the servo-piston 55, the actuating element 284 moves as a unit therewith to engage the dome-end of the plunger 281 to effect operation of the detector switch DS from open to closed positions depicted by FIGURES 14 and 16, respectively.

THE OIL-PRESSURE OPERATED INTERRUPTER SWITCH

The interrupter switch general designated IS is shown in FIGURES 4 and 29 mounted on the top side of the main control valve body 92 by means of an axially bored externally threaded extension 290 depending from a rectangular base 291. This threaded extension engages a complementally threaded passage 292 which intersects the aforementioned elongated chamber 176 in the said valve body, whereby working-pressure produced by the pump LP on the engine lubricating oil is effective to actuate the switch to open position against its spring-action which may be varied to establish different pressures therefore speeds of the engine at which such opening occurs. The construction and operation of this switch is generally conventional, however, certain aspects of the actuating mechanism thereof are believed novel and patentable, therefore the combination as disclosed will be structurally described for a clear understanding of the function and purpose of this switch in the present invention.

As shown in FIGURES 17, 29 and 30, the switch body 293 comprises two dish-type metallic shells 294, 295, with their open ends annularly flanged outwardly for reception therebetween the peripheral marginal portion of a circular plate 296 which is centrally apertured as shown in FIGURE 29, and of a flexible diaphragm 297 preferably metallic or fabricated from rubber coated fabric. The central portion of the lower shell 295 is fast on said base 291. A metallic band 298 is spun-installed over the aforesaid mating flanges and marginal portions of the plate and diaphragm, to connect these parts in an oiltight unitary assembly whereby the diaphragm is provided with sufficient space to flex between the plate which serves as a means for limiting upward movement of the diaphragm, and the lower end of the chamber 299 defining the assembled interior of both shells. The diaphragm divides the chamber 299 into an upper constant (atmospheric) chamber 300, and a lower pressure-working chamber 301 with the upper chamber constantly vented to atmosphere via opening 302. The lower chamber receives working fluid via axial bore 303, and passage 292 and elongated chamber 176 in the main valve body 92. Thus, the diaphragm 297 is in continuous communication with pressure flow from the pump LP, and varies in movement in accordance with change in pressure on the fluid in chamber 301. Projecting from the central upper side of the diaphragm through the aperture in plate 296, is a switch actuating-plunger assembly 304, fabricated from non-conductive material such as nylon, and having an intermediately disposed annularly flanged conductive contact member 305 movable in chamber 300, and a blind axial bore 306 which opens into a counterbore 307 defining the upper end portion of said assembly. A threaded bore 308 coextensive with a cylindrical extension 309 which upstands centrally from the exterior of the end wall of the upper shell 294 and which receives a complementally threaded elongated pin 311 which has a reduced diameter smooth portion 312 defining the major portion projecting into the axial bore 306 to serve as a pilot for the switch actuating-plunger assembly.

The juncture of the smooth and threaded portions on the pin 311 provides an annular shoulder 313 against which the margin of a central aperture in a cup-shaped spring seat 315 bears so that the axial position of said spring seat can be varied by manually turning the pin 311, in opposition to a normally compressed spring 316 operatively disposed to encircle that portion of the plunger assembly which extends above the contact member 305 as shown, thus this spring reacts between the spring seat and upper confronting face on the contact member to bias the latter downwardly into contact with a pair of contacts 317, 318 mounted on confronting flexible inturned legs, respectively, of a pair of extensions 321, 322, respectively, depending from the inner side of the end wall of the upper shell as shown. The upper ends of these extensions are inturned toward each other for connection to terminals 325, 326, respectively, as shown, said terminals being suitably insulated from the metallic end wall as shown, and project to the exterior thereof. These two terminals are connected in series to the aforementioned conductor 118 as shown in FIGURES 1 and 17.

The upper end portion of the plunger assembly defined by the counterbore 307 is cross-slotted to form a pair of opposed arcuate segments 327 which projects through complemental arcuate cutouts (openings) 328, respectively, through the bottom (upper) end wall of the spring seat member 315 (see FIGURES 29 and 30), in normally spaced relation with respect to the inner face of the insulative portion contiguous to the end wall of the upper shell 294 as shown in FIGURE 29, such normal spacing defining the normally retracted position of the plunger assembly 304 and included contact member 305 under influence of spring 316 to bridge the contacts 317, 318, thus closing the circuit controlled thereby. When the switch IS is open as shown in FIGURE 19, the upper ends of the segments 327 abut the inner face of the insulative lining of the chamber 300 to define the limit of protractive movement of the plunger assembly 304 under influence of increasing pressure on said diaphragm, to disconnect (unbridge) said contacts 317, 318 therefore interrupting the circuit controlled thereby as shown in FIGURE 19.

It is thus seen that the segment-and-cutout arrangement provides for axial movement of the plunger assembly 304 independently of the spring seat member 315, and for the latter to have axial adjustment relative to said plunger assembly to establish the desired tension on spring 316 at which the working pressure on the diaphragm is effective to open the switch IS. Thus, the pin 311 is rotatable to axially release or force the spring seat 315 for upward movement to lessen tension on said spring, or downwardly to increase tension on said spring to obtain the desired pressure opening of switch IS without interfering with the established movement of the plunger assembly to close and open said switch contacts. Since operation of this switch is dependent on change in pressure on the engine oil, switch IS may be termed a "speed-sensitive device" which functions in response to change in engine speed therefore of the vehicle, particularly when speed of the latter is translated as a function of driving in direct (high) speed drive.

A lock-nut 329 is provided for the exposed threaded portion of the pin 311 which is adapted to stabilize the pin in its adjusted position as is understood.

The proper pressure setting for switch IS should be such that it remains closed until firm engagement of the clutch FC is substantially effective which means that the engine would be operating above idle speed, but when vehicle speed drops to substantially idle speed of the engine when the car is operating in high speed drive, then this switch should close to condition in part subsequent energization of the conductor 118 upon closure of the detector switch DS, to initiate another clutch operating cycle of partial engagement to firm engagement.

MANUAL SHIFTING MECHANISM AND ASSOCIATED SWITCH

The transmission shifting mechanism disclosed fragmentarily in FIGURES 1, 17, 18 and 19, is essentially the same as that disclosed in U.S. Patent Re. 23,691 granted to me July 28, 1953 wherein the steering column mounted shift-lever is operative through the conventional H-pattern of shifting movements to control the conventional three-speed forward and a reverse drive gearbox GB and a switch device actuated in synchronism with such shifting movements.

In my patented structure, the rockable and axially movable tubular shift shaft controlled by the shift-lever and the switch actuated thereby are mounted on the exterior of the steering column, while in the present application, substantially the same structure is mounted coaxially within the steering column for operation by the shift-lever SL, with the two selectively movable arms 330, 331 and switch-actuating plate 332 radially extending from the steering column 333 at substantially right angles to the axis thereof with said arms projecting through a suitable cutout shown at 334 in FIGURE 1. Shifting arm 330 is linked to the operating arm (not shown) rockable on the side of the gearbox case to control low and reverse speed drives and the other arm 331 is similarly connected to another operating arm (not shown) rockable on the gearbox case for second (intermediate) and high (direct) speed drives.

The shift-lever controlled switch (see FIGURE 26) generally designated SS is mounted on the steering column by means of an upstanding bracket 335 rigidly attached at its lower end adjacent the upper end of said cutout by means of cap screws 336 or otherwise, and the upper end of this bracket is formed with an outturned segment 337 parallelly spaced from and above the steering column, said switch being mounted atop this segment, the construction and operation of which is believed novel. As shown in FIGURE 26 this switch comprises: a hexagonal switch body 338 cylindrically chambered, and closed at its bottom end by a wall 339 having a reduced cylindrical extension 340 externally threaded and which projects through a hole in said segment 337 to mount the switch by means of a lock-nut 341, and the open end is closed by a molded insulative cap 342, as shown, in spaced relation to the closed end wall to produce said chamber therebetween. A pair of diametrically spaced fixed contact elements 343,344 projects from the interior of the chamber through and beyond the exterior of the cap 342 to provide exterior terminals 345, 346, respectively. Each of the contact elements is formed with an intermediate annular bead 347 embedded in the body proper of the insulative cap to axially stabilize the contact elements on said cap.

Terminal 345 is connected to the solenoid circuit 348 adapted to control the switch for energizing the engine-starter, and the other terminal 346 is connected to the aforementioned conductor 223 as shown in FIGURE 17.

A movable annular contact disc 351 preferably fabricated from molded insulative material such as hard rubber, is operably disposed in the switch chamber between the inner contact ends of the aforesaid contact elements and the confronting face of the body end wall 339 best demonstrated in FIGURE 26, said contact disc being processed with a central hole 352 and a pair of diametrically opposed conductive segments 353, 354 which defines a portion of the peripheral marginal portion of said contact disc, and which slidably engages the inner face of said chamber to provide a grounded connection at 355 for the starter solenoid winding, and a grounded connection at 356 for the conductor 223 whereby upward movement of the contact disc to dispose said conductive segments in engagement with their respective contact elements, serves to complete the starter circuit 348 in part, closure of the starter switch being required to complete this latter circuit, and completion of the circuit 223 to induce energization of the solenoid $S^b$ when the shift-lever SL is being moved toward neutral or while so positioned as shown in FIGURE 26. Thus, the engine-starter cannot be operated unless the shift-lever is in "N" position as shown in FIGURES 1 and 17.

Movement of the contact disc 351 is effected by a plunger 357 slidably disposed in an axial bore 358 coextensive with said extension 340. This plunger is processed with a blind axial bore 359 intersected by a pair of elongated slots 360 through the wall of the latter bore and in diametrically opposed relation. Projecting into the blind bore 359 is the lower end portion of a control stem 361 for the contact disc. The upper reduced end of the stem projects through the central hole 352, and is secured to the disc as by peaning (riveting) to produce a unitary assembly thereof as shown in FIGURE 26. Thus, the stem and contact disc are connected to move as a unit. The lower end portion of the control stem is provided with a cross pin 363, opposite ends of which pass through said slots 360 with the right end of the pin extended to engage a vertical surface channel 364 indented in the axial bore 358 as shown in FIGURE 26. Coaction of the pin and slots 363, 360, respectively serves to establish the relative movement of the plunger with respect to the stem therefore the connected contact disc, and the portion of the pin that projects into the vertical slot (channel) 364 maintains the plunger, stem and connected disc in correct rectilinear movement to prevent disalignment between the conductive segments 353, 354 and their respective contact elements 343, 344.

A normally compressed spring 365 encircles the upper exposed portion of the stem 361 to react between the upper end of the plunger and confronting face on the underside of the contact disc to position the slots in the plunger with their upper ends in abutting relationship to the cross pin, thus restoring relative operating movement of the plunger with respect to the contact disc to provide slight overtravel of the plunger under actuation by said switch-actuating plate 332, with respect to the contact disc to insure maintenance of closed-contact condition of the switch SS despite road vibrations present in the steering system of the vehicle. The aforesaid overtravel being accommodated by spring 365 during upward movement of the plunger from operating position shown in FIGURE 18 wherein the switch SS is open, to normal operating position shown in FIGURE 17 wherein the switch SS is closed. In normal relative disposition of the plunger and contact disc, the cross pin is positioned toward the lower ends of the slots 360, and when in operating relative disposition as shown in FIGURES 18, 19, the cross pin is positioned in engagement with the upper ends of the slots 360 to condition the plunger for another contact-closing movement.

The central inner face of the cap 342 is formed with a circular embossment 367 to serve as a guide for the upper end of another normally compressed spring 368 adapted to react between said cap and upper surface of the contact disc to urge the latter downwardly into open-contact position as shown in FIGURES 18, 19, such movement of the contact disc, however, cannot be effected by this spring until spring 365 has restored relative operating movement between the plunger and stem aforesaid as shown in FIGURES 18 and 19.

The switch-actuating plate 332 is connected for co-rotation with the shift-actuating shaft 369 by means of cap screws 370 or otherwise. This actuating plate is sector-shaped and arcuately flanged at 371 to provide an intermediate arcuate working portion 272 terminating its opposite ends with circumferentially spaced camming ramps 373, 374 which merge with short terminating arcuate portions 375, 376, respectively, on a shorter radius than the intermediate arcuate portion 372, and concentric to the latter. The flange 371 is of sufficient length plus the terminating shorter arcuate portions, to accommodate axial movement of the actuating plate 332 as a unit with the shift-shaft 369 to dispose the shift-lever SL in its upper and lower planes of rotative movements without becoming disengaged from the switch-actuating plunger 357 slidable in the extension bore 358 aforesaid. This plunger acts through spring 365 under normal reaction to move the contact disc 351 into engagement with the inner end of the contact elements 343, 344 to close circuit 348 in part and to condition circuit 223 for completion upon closure of the detector switch DS, the en-engine-starter solenoid circuit 348 being completed upon closure of the starter switch as is understood, such movement of the contact disc being responsive to initial rotation of the actuating plate 332 therefore the shift-lever SL to and from an active gear position such as low and high speed drives depicted by the indicia "L" and "H" in FIGURES 18 and 19, respectively. Rotation of the switch-actuating plate 332 engages the ramps 373, 374 selectively with the dome-end 378 of the plunger 357 to force the latter upwardly and spring-connected contact disc 351 as a unit to bridge (connect) the conductive segments 353, 354 with their respective contact elements 343, 344 to close circuits 348, 223 in part. Ramp 373 being adapted to control the switch SS to open position when the shift-lever is moved from either low or high active gear position, while the ramp 74 is effective to open the switch SS upon initial movement of the shift-lever SL from either second (intermediate) or reverse active gear position. Upon rotating the switch-actuating plate 332 to a selected active gear position, such as low speed depicted in FIGURE 18, the dome-end 378 of the plunger 357 is released by the adjacent camming ramp to free the plunger and connected contact disc 351 for downward movement under joint action of springs 365, 368 defined by the dome-end of the plunger 357 in engagement with the short arcuate portion leading from the bottom of the adjacent ramp. Accordingly, coaction of the camming ramps and dome-end of the plunger is effective to raise and accommodate spring-lowering of the plunger and its connected contact disc 351 to close and open, respectively, the switch SS.

In the case where the active speed-drive in the gearbox GB is under coasting load resulting from "roll" of the vehicle with the clutch FC engaged and brakes "off," which condition would tend to lock the gearbox "in-gear" thus prohibiting sufficient initial movement of the shift-lever SL unless an undue amount of lost-motion is present in the interconnecting linkage between the shifting arms and gearbox operating arms (not shown), to effect closure of the switch SS for automatic disengagement to interrupt the torque impressed on the active speed-drive. Under these conditions, a yieldable force-transmitting connection would be incorporated in the linkage between the shifting arms and gearbox operating arms (not shown) which would provide for limited relative force-transmitting movement of the shift-lever and locked operating arm to accommodate actuation of the switch SS. Such shift-lever connection is disclosed in FIGURE 15 of U.S. Patent Re. 24,049 granted to me August 9, 1955, and reference may be had to this patent for a detailed consideration of the construction and operation of this connection.

THE AUTOMATIC CLUTCH-ENGAGING DEVICE
WITH VACUUM-SPRING OVERRULING MEANS

Reference is now made to FIGURES 1, 20, 21, 22, 23 and 24 which illustrate the automatic clutch-engaging device in operative association with the clutch-servo CS, and means for overruling this device. The function of this device is to enable automatic re-engagement of the clutch while at rest to render engine-compression braking effective to stabilize the vehicle when parked "in-gear."

This novel clutch-engaging device is disclosed herein as a pressure differential operated motor generally designated PM and which utilizes manifold vacuum for producing such pressure differential to energize a work-performing spring releasable to re-engage the cluth FC by acting through the servo piston-rod 63.

As shown in FIGURE 1, the clutch-engaging motor PM comprises: a cylinder 380 formed by two cup-shaped casings (shells) 381, 382 joined at their open ends by cap screws projecting through integral outturned flanges 383, 384, respectively. The casing 381 is an integral continuation of the end wall 67 of the clutch-servo cylinder 66 and form therewith a bell-shaped concavity thus serving as the means for mounting the motor PM in operating position to effect clutch engagement through the servo piston-rod 63. The aforesaid flanges are adapted to clamp the peripheral marginal portion 385 of a flexible diaphragm 386 therebetween under sealing pressure by a plurality of said last-named cap screws projecting through aligned holes in the margin of the diaphragm and flanges as shown in FIGURE 1. The central portion of the diaphragm is provided with fore and aft backing plates 388, 389, respectively, contiguous thereto, and centrally mounted on the forward plate is a cup-shaped spring seat member 390 with the two plates, diaphragm and member 390 provided with aligned coaxial holes best shown in FIGURE 20 and through which the reduced threaded end portion 391 of a tubular work-performing member 392 passes to clamp these parts in airtight assembled relation between the flange 393 and a lock-nut 394 tightly engaging the portion 391, to produce the movable power-diaphragm assembly generally designated PD.

The power-diaphragm divides the interior of the cylinder 380 into a variable pressure working chamber 395 and a constant pressure/atmospheric chamber 396 (bell-shaped concavity), the latter chamber being vented to the atmosphere via a filter plug 397 associated with an opening 398 passing through the wall of the casing 381. A cenral cylindrical extension 399 projects integrally from the right side of the end wall 67 therefore the casing 381, and is provided with a coextensive axial bore 401 which interconnects the chamber 396 with the working chamber 82 of the clutch-servo CS. A central outwardly extruded reduced cup-shaped concavity 402 is formed out of the end wall 403 of the casing 382, for reception of a normally compressed power-spring 404 which reacts between the end wall 405 of this concavity and the backing plate 388 with the adjacent end of the power-spring maintained in working alignment by means of the spring seat member 390. The central portion of the concave end wall 405 is apertured at 406 for a rigid tubular fitting to which is connected one end of a flexible conduit 407 leading to the engine intake-manifold whereby operation of the engine reduces pressure within the manifold and communicates the same via said conduit as negative (vacuum) pressure to the chamber 395 of the motor PM to create a pressure differential across the power-diaphragm to retract the same to the position shown in FIGURES 1 and 20, and thereby additionally energizing the power-spring 404 to maximum intensity. The forward backing plate 388 is processed with a plurality of forwardly extruded lugs 408 which serve to engage the inner side of the end wall 403 adjacent the open end of said concavity 402 to establish the fully retracted (energized) position of the power-diaphragm PD as is understood.

The axial bore 401 in the extension 389 is provided with a pressfitted sleeve liner 409 flanged at its right end 411 to nest in a complemental recess 412 terminating the right end of the said bore. The bore 413 of this liner is provided with an internal annular interlocking groove 414 best demonstrated in FIGURES 20 and 23, and a tapered recess 415 defines the forward end of the bore 413. The work member 392 is provided with a plurality (preferably four in number) of circumferentially spaced holes 416 through the wall thereof and normally in circular alignment with the aforesaid groove as shown in FIGURE 20. These holes each receives a radially movable detent element (ball) 417 normally disposed flush with the outer diameter of the work member. The rear end of the work member is adapted to abut the servo-piston 55 when the latter is fully retracted by its return spring 64 to the position of full clutch-disengagement shown in FIGURES 1 and 20. Projecting through a hole 418 in the servo-piston 55, is a reduced extension 419 of the push-rod 63 which is formed by diminishing the normal diameter thereof to provide a shoulder at 421 against which the servo-piston works to protract the piston-rod against the outer end of the clutch throw-out lever 56 to actuate the friction clutch FC into engaging relation. This extension telescopically projects into a blind axial bore 422 provided in the tubular work member to dispose its reduced diameter end 423 into abutment with the closed end 424 of the bore 422. A reduced diameter portion 425 is provided intermediate the extension 419 in alignment with the aforesaid detent balls 417, said portion 425 defining longitudinally spaced annular shoulders 426, 427 with the latter (right) shoulder formed at an angle (tapered) to provide camming action on the detent balls 417 to force them radially outwardly into the interlocking groove 414 upon energization of the clutch servo-piston 55 to engage the clutch FC which moves the extension 419 with the servo-piston as a unit, thus locking the power-diaphragm PD in fully retracted position notwithstanding the vacuum efficiency is lowered during engine acceleration tending to release the power-diaphragm PD therefore the power-spring 404 to act on the servo-piston 55.

Accordingly, it is seen by referring to FIGURE 21, that the servo-piston 55 under hydraulic energization has moved to the left from its normal position shown in FIGURES 1 and 20, to effect engagement of the clutch FC and carrying along with it the extension 419 without interrupting the interlocked status of the balls 417 and tubular work member and connected power-diaphragm PD in fully retracted position to maintain the power-spring 404 fully energized for subsequent release to automatically re-engage the clutch by acting through the servo piston-rod 63 and connected clutch yoke 56 when the engine is stopped intentionally after parking the car or by fortuitous stalling.

This novel automatic clutch re-engaging mechanism for the clutch FC enables the car to be parked at will "in-gear" without hazarding accidental movement of the car from a parked position, for example, such movement influenced by the gradient on which the car is parked due to failure to apply the parking brake.

Under certain conditions the "roll" of the car while "in-gear" under engine-compression braking, and my automatic re-engaging means effective, would impress sufficient coasting load drive on the drive line and speed-drive of the gearbox GB in which the car is parked, to lock the shift-lever SL in such active drive position and thereby prevent manual return of the shift-lever to neutral to free the engine for starting. To overcome this problem, I have devised novel manual overruling means in the form of a Bowden wire push-pull assembly generally designated MO mounted on the throw-out lever side of the clutch housing, and which is illustrated in FIGURES 1 and 24. This overruling means comprise: a lateral bracket 430 mounted at its inner end between the lock-nut 75 and flange 73 of the clutch housing 10 as shown in FIGURE 1, said lock-nut being adapted to also mount the clutch-servo CS as a unit on the clutch housing as shown. The outer end of this bracket is provided with a hole 431 for reception of the lower end of a flanged nipple 432 having a threaded portion 433 for engagement by a lock-nut 434 to rigidly mount the nipple on the bracket as shown in these two figures. The flanged end of the nipple receives the lower end of a hollow flexible cable 435, and the upper end of this cable is provided with a rigid tubular fitting 436 processed with an annular outstanding flange 437 contiguous to the vehicle dash panel 438, and a reduced diameter extension 439 having a threaded portion 441 adjacent said flange. A smooth portion 442 terminating said extension, projects through a hole 443 in the dash panel to mount the fitting in operating position as by means of a lock-nut 444 engaging the extension threaded portion. A flexible wire 445 passes through a hole 446 in the outer end of the clutch throw-out lever 56 and terminates on the opposite (rear) side of the lever in a head 447 as shown. This wire slidably passes through a bore in the nipple, and hollow of the flexible cable, thence through a longitudinal bore 449 coextensive with the fitting to connect to a manually-operated handle 451 conveniently located on the driver side of the dash panel as shown.

In operation, with the car parked "in-gear" under engine-compression braking provided by automatic clutch-engagement above-described while the clutch is at rest, and coasting load drive impressed on the gearbox GB, to release the engine under such conditions for starting, the driver merely has to pull on the handle 451 which brings the head 447 of the wire into engagement with the outer end 62 of the throw-out lever 56 and thereby retracts the throw-out lever, servo-piston 55 and power-diaphragm PD in opposition to reaction from the clutch release spring 64, and the power-spring 404 from the position shown in FIGURE 22, to such position as will sufficiently negate the torque effective on the active gear in which the car is parked so that the shift-lever SL can be returned to neutral to enable starting the engine, whereupon normal control of the clutch FC is restored to the engine-driven pump LP and clutch-disengaging spring 64 which protracts the handle 451 and connected head 447 automatically to normal position shown in FIGURE 24 wherein the head 447 is spaced rearwardly of the clutch yoke 56 out of interference with normal servo-actuation of said yoke.

MODIFIED MAIN CONTROL VALVE

This modification is shown in FIGURE 25 in which the right valve element 101 is modified by incorporating a plurality of longitudinal slots 455 in the control land 456 which corresponds to control land 151 of the main embodiment. These slots function to restrict the flow of oil into the fluid channel 158 therefore the servo-working chamber 82 when the valve piston VP is positioned as shown in FIGURE 25 corresponding to FIGURE 9 position of the control land in the main embodiment.

Accordingly, when the valve piston is moved under influence of solenoid $S^a$ to the position shown in overlapping relationship with respect to the channel 157, oil under pressure from the pump LP is directed through these metering slots 455 and channel 158 thence via conduit 88 into the servo-working chamber 82 to activate the servo-piston 55 to partially engage the clutch FC, but instead of sevro-actuation being halted upon establishing the clutch members in partially slipping condition as would be the case were the control valve assembly CV shown in FIGURES 1 and 4 employed, its rate is slowed by the metering slots 455 for smooth firm engagement to ensure under influence uninterrupted operator-supervision effected through the vacuum-modulated diaphragm unit VD. Thus, it is seen that final clutch engagement is checked by the restrictive slots 455 which slow the rate of clutch plate engagement under servo-actuation at the critical point of entering final firm engaging movements thereof for maximum torque-transmitting efficiency, without interrupting servo-actuation as in the case of the function of the control land 151 of the main embodiment, from FIGURES 17 through 19 to firmly engage the clutch FC for normal highway operation of the vehicle.

THE ELECTRIC, VACUUM AND OIL CIRCUIT CONTROL SYSTEM

Reference is now made to the circuit control system generally designated CCS depicted in FIGURES 1, 17, 18 and 19 with similar conditions of the circuits prevailing in FIGURES 1 and 17. The electric circuits are depicted by solid lines when energized, and by broken (dashed) lines when de-energized.

As shown in FIGURES 1 and 17, there is disclosed the circuit control system CCS and include control components previously described in detail for the clutch-servo CS therefore the friction clutch FC, and associated gearbox GB. Certain of the control components interposed in the various circuits are old therefore well known in their respective arts, while others are characterized by either being patented subject-matter granted to me, or possessing patentable features of construction and operation to produce novel and patentable interaction and features of construction with resulting more efficient cooperation of such components.

The electric circuit control system EC is shown de-energized in part and comprises: a source of electrical energy such as the symbolically illustrated storage battery B which has a grounded terminal GT and a feeder conductor (lead) FL connected to its other terminal as shown. A manually-operated master switch MS is interposed in the feeder line and disclosed herein as the ignition switch which is connected to the engine-starter circuit 348 as shown, and to a main conductor 462 having three branches comprising a conductor leading to the ignition coil (not shown), and the aforementioned conductor 118 in which the detector switch DS, interrupter switch IS and solenoid $S^a$ are interposed in series, and the aforementioned conductor 223 in which solenoid $S^b$ and shift-lever controlled switch SS are interposed in series. The starter circuit 348 is grounded at 355 when the switch SS is closed as shown in FIGURES 17 and 26, and similarly, the conductor 223 is grounded at 356 when this switch is closed so that the starter circuit can be energized to start the engine upon closing the starter switch, and the solenoid $S^b$ energized to render first stage control of its associated check-valve $CK^b$ effective in response to setting the shift-lever SL in neutral position as shown.

The vacuum circuit control system VC comprises: the engine intake-manifold, the aforementioned conduit 407 connected to the automatic clutch-engaging motor PM, and which intersects conduit 147 leading from the vacuum-modulated diaphragm unit VD. Vacuum production is controlled by the position of the throttle-plate TP which controls the flow of the carbureted mixture through the venturi 463 of the conventional carburetor CR mounted on the intake-manifold, all as schematically shown in FIGURES 1, 17, 18 and 19 including the conventional accelerator pedal AP pivotally mounted on the floorboard 464 in the driver's compartment of the vehicle, said pedal being connected by linkage and lever system LS mounted on the firewall 465 by a bracket 466 to the throttle-plate shaft to actuate the same to control the speed of the engine therefore its torque output. A stop element 467 projects from the body of the carburetor CR to define idle speed positions of the accelerator pedal and connected throttle plate TP as shown in FIGURES 1, 17 and 18. An expansion helical spring 468 is connected at opposite ends to the carburetor body and portion of the linkage system, respectively, to bias the accelerator pedal and connected throttle plate TP to idle speed position of control defined by said stop element.

The hydraulic circuit control system HC comprises: the engine-driven lubricating pump LP and included intake port 231 connected by suction line 470 to oil intake screen 471, and communicating with said triangular-shaped concavity 228 in the adapter plate 94 and rectangular opening 227 in the valve plate 93 which empties into the horizontal chamber 165, and the output port 224 communicating with the surface channel 225 in the adapter plate and port 226 through the valve plate, the latter opening into the elongated chamber 176 connected to control port (orifice) 174 past the minimum pressure lubrication valve LV into chamber 171 connected by passage 172 to the valve chamber 155 from which the oil flows via passage 168 into the upper horizontal chamber 164 for modulation by the check-valve $CK^b$ as above explained. Branch passage 292 which intersects the elongated chamber 176 is in continuous communication with the working chamber 229 of the interrupter switch IS, and a shunt line 472 leading from the output port 226 conveys oil to the oil gallery in the engine block CB (see FIGURE 17) for pressure distribution to the various working surfaces between the parts of the engine. A spring-loaded pressure regulator (relief) valve RV of conventional construction and operation is effective to establish maximum pressure in line 472 therefore at port 226 of approximately 55–60 p.s.i. with engine speed at approximately 2200 r.p.m.

The servo working chamber 82 of the clutch-servo CS is connected to the fluid-control channel 158 in the valve body 92 by means of the flexible conduit 88 as shown in FIGURE 1. Thus, the path of oil circulation by the pump LP is from the intake port 231 through the output port 224 into the valve body 92 via port 226, past the lubrication control valve LV, into valve chamber 155, upper horizontal chamber 164 through check-valve $CK^b$ into the lower horizontal chamber 165, rectangular opening 227 in the valve plate 93, triagular-shaped concavity 228 in the adapter plate 94 back into the intake port for recirculation under pressure to serve as the actuating medium for the clutch-servo CS and pressure lubricate the working parts of the engine E.

Oil which may seep past the valve pistons VP and 177 in the main valve body 92 is returned for recirculation by pump LP to the suction line 470, or optionally via a separate return (drainage) line, via drainage surface channels in the plug 186, annular channel 187 in this plug, thence through passage 188 into the valve bore 97 which communicates via cross passages 98, 99 connected into surface channels 232, 233, respectively, as shown in FIGURES 4, 6 and 17.

OPTIONAL DUAL-PUMP AND CONTROL VALVE ASSEMBLY

There is disclosed in FIGURE 31 an optional dual-pump and main control valve assembly wherein the conventional oil pump LP of the embodiment and in the present modification serves its normal function only of pressure lubricating the working parts of the engine E, and a separate pump mounted directly on the pump LP supplies the actuating fluid for the clutch-servo CS, and thereby enabling a wider range of actuating pressures for the clutch-servo than available from the lubrication pump LP alone due to the latter pump being set to produce maximum pressures 55–60 p.s.i. at engine speeds of approximately 2200 r.p.m. Furthermore, both pumps derive drive from a common drive shaft, thus enabling a unitary assembly thereof contributing to compactness and simplicity with the lubricating oil contained in the sump of the crankcase serving as a common source of fluid supply for both pumps.

The aforesaid servo-actuating pump is generally designated SP, and, as shown in FIGURES 32, 34, 35 and 37 its structure comprises: a pump housing 480 of generally rectangular configuration having a pair of integrated aligned annular bosses 481, 482 projecting from the bottom and top respectively thereof as shown in FIGURE 34, said housing being closed at its outer end by an integrated wall 483 and the inner end open as shown in FIGURE 32. A pair of drive and driven gears 484, 485 in constant meshing relation draws oil, when rotating, from the crankcase sump 486 through a screened intake filter 487, suction conduit 488 into an intake passage 489 provided coextensively with the boss 481, said passage continuously communicating with an intake chamber 490 within said housing as shown in FIGURES 34 and 35. On the opposite side of the rotating gears is a pressure output chamber 491 within said housing and which communicates with an output passage 492 coextensive with the boss 482.

A separator plate 493 is adapted to close the adjacent (confronting) open ends of the housings of both pumps best shown in FIGURES 31, 38 and thereby isolating operation of these two pumps so that each functions independently of the other, notwithstanding a common drive shaft 494 which is worm-geared to the camshaft of the engine as shown in FIGURE 31, is employed to operate both pumps simultaneously. This drive shaft passes through an integral extension projecting into the crankcase from the closed end of the pump housing 90, and the axially-bored drive gear 495 of pump LP, thence through a coaxial bearing hole 496 in the separator plate 493 and the axially-bored drive gear 484 of the pump SP into a coaxial blind hole 497 formed in the end wall 483 to serve as a pilot support for the free end of said drive shaft as shown in FIGURE 32. Each of the axial bores in the coaxial drive gears is processed with a keyway 498 engageable by a half-moon key 499 embedded in longitudinally spaced relation in the drive shaft to lock the drive gears of pumps LP and SP, respectively, to said drive shaft for co-rotation therewith.

Operatively embodied in the end wall 483 is a pressure regulator valve PRV (see FIGURES 35 and 38) similar to the regulator valve RV of the main embodiment (see FIGURE 17), and which comprises: an angular bore 501 in the boss 481 and parallelly disposed with respect to the intake passage 489 best shown in FIGURE 35, and in which a blind axially-bored piston-like valve element 502 slidably moves to control a passage 503 normally isolated from the intake chamber 490, said passage 503 being in constant communication with the output chamber 491 as shown in FIGURE 35. A compression sealing plate 504 through which the upper end of the suction line 488 passes into the intake passage 489 overlies the bottom open end of the bore 501 to close the same oiltight by means of an interposed gasket, as well as effecting seal around the suction line 488 by means of an annular pliant packing 505 fitted in a V-shaped internal recess 506 formed between the marginal portions around the suction line of the confronting faces on the lower boss 481 and said plate whereby cap screws 507 place the packing under radial deformation to effect such oiltight seal around the suction line (see FIGURE 35) and also impinge the gasket between said plate and boss end.

A compressed spring 508 is operatively positioned in the bore 501 to react between that portion of the plate 504 overlying the bottom end of said bore and the bottom of the blind bore in said piston-like valve element 502 to yieldably isolate passage 503 from the intake chamber 490 and thereby enabling rotational-drive of the pump SP to produce maximum pressure output in accordance with the installed tension of this spring which may be varied to provide different ranges of pressure operation on the oil by the latter pump. A radial port 509 through the wall of said piston-like element maintains communication between the interior thereof therefore bore 502 to prevent fluid-lock in said bore when the piston-like element is reciprocated in the bore 501 in response to pressure change in opposition to said spring 508. Downward movement of the piston-like element from the position of FIGURE 35 places the intake and output chambers in communication with each other via open passage 503 and thereby establishing maximum pressure output by said pump SP. Upon maximum pressure output of pump SP being attained, the spring 508 yields to accommodate downward movement of the piston-like element to place the output chamber in communication with the intake chamber via said passage 503, to permit sufficient oil escape from the output chamber of the pump into the suction line to stabilize maximum pressure output according to the setting of the regulator valve spring as is understood.

The separator plate 493 has a continuing lateral portion 510 of substantially rectangular configuration as shown in FIGURES 33 and 34. This lateral portion is offset upwardly in the same plane with the separator plate and serves the same purpose as the valve plate 93 in the main embodiment, therefore is processed with the port 226 and elongated opening 227 as shown in FIGURE 33, and will, therefore, be hereinafter referred to as the "valve plate" which has the additional function of serving to mount the main control valve CV on its front side as shown in FIGURES 31 and 34, superjacently to the pump SP so that minimal use of plumbing therebetween is required.

A valve adapter plate 511 is provided on the back (opposite) side of the valve plate 510 as shown in FIGURES 31 and 33. The adapter plate is provided with a pair of chambers 512, 513, best shown in FIGURES 33, 34, which communicate with the exterior of opposite ends of said adapter plate by means of passages 514, 515 respectively. Chamber 512 is in continuous communication with an angular channel 516 embedded in the face of said adapter plate and which opens into a horizontal channel 517 in registry with the elongated opening 227 in the valve plate 510 as shown in FIGURES 33 and 34. The chamber 513 is in continuous communication with the port 226 in the valve plate 510, whereby ingress and egress of oil with respect to the valve body is provided, it being noted that the port 226 is in continuius communication with the elongated chamber 176, and the elongated opening 227 with the lower horizontal chamber 165 in the valve body 92 as shown in the main embodiment (see FIGURE 4).

A plurality of elongated cap screws 518, as shown in FIGURES 31, 34 and 37, passes through aligned holes in the two pump housings 480, 90 and separator plate 493 therebetween, into engagement with threaded holes in the mounting base on the cylinder block CB as shown in FIGURE 37, to produce an oiltight unitary assembly of the two pumps.

As best shown in FIGURES 31, 33 and 34, the main control valve CV, valve plate 510 and adapter plate 511 are combined in a unitary assembly by means of at least three cap screws 520 which pass through aligned peripheral holes in the valve body 92, and plates 510, 511 as shown in FIGURE 31, with the upper intermediately disposed cap screw passing through the base flange of the adapter plate 511 for reception of a lock-nut 521 as shown in FIGURE 31, while the two lower longitudinally spaced cap screws are threaded into holes 522 formed in suitable embossments as indicated at 523 integral with said base of the adapter plate.

The output passage 492 in the pump, and chamber 513 in the adapter plate are interconencted by a conduit 524 as shown in FIGURES 33, 34, 35 and 38. The lower end of this conduit extends into the passage 492 and the upper horizontal portion thereof extends into the passage 515, and both ends thereof are connected in oil-tight sealed relation with their respective passages by means of compression sealing plates 525, 526 adapted to radially deform cooperating annular pliant packings fitted in complemented V-shaped recesses processed in the upper end of the boss 482 and end of the valve body 92, respectively, under pressure from cap screws as shown.

The upper end of a return (drainage) conduit 528 projects into passage 514 and is similarly connected oil-tight to the chamber 512 by means of a compression sealing plate 529 attached by cap screws 530 as shown in FIGURES 31 and 33. The lower end of this return conduit passes through a rubber grommet 531 fitted into an aperture in the sidewall of the crankcase as shown in FIGURE 31, and empties into the oil sump 487. This return conduit conveys the oil from the lower horizontal chamber 165 in the valve body 92 after it passes through the check-valve $CK^b$ in the same manner as previously described in connection with the suction conduit (line) 488, therefore requiring only one line through the crankcase wall. However, the preferred circulatory path for the oil is shown in FIGURES 31 and 38 wherein the working pressure from the pump SP, after actuating the clutch-servo CS, is returned through a free drainage line such as shown at 528.

While the construction and operation of both pumps LP and SP are substantially conventional, novel use of a common drive for both pumps in unitary assembly to enable production of higher ranges of pressure on the lubricating oil than normally available from the lubrication pump alone, the actuate the clutch-servo CS, is believed to constitute invention therefore patentable subject-matter.

Use of the lubricating pump LP for both pressure lubrication of the engine working parts, and for supplying the actuating oil for the clutch-servo CS, requires external installation of the clutch-servo CS shown in FIGURE 1 as distinguished from a servo unit concentrically disposed with respect to the clutch output shaft within the clutch housing, to accommodate the leverage advantage necessary to actuate the clutch members to pressure-engage them under servo-actuation without unduly oversizing the servo unit. That is to say, utilizing a relatively small servo unit as shown in FIGURE 1 such outside mounting thereof provides for the necessary leverage advantage through the clutch yoke 56, but if an installation requires a concentrically positioned servo unit with respect to the clutch output shaft therefore fully contained within the clutch housing, leverage advantage is necessarily limited to that provided by the clutch-operating levers 26 which are acted on directly by the annular piston of the concentric type of servo unit. Therefore, much higher actuating pressures are required for the latter installation which the lubrication pump alone cannot produce and at the same time supply the required pressures for proper lubrication of the working parts of the engine. Accordingly, by using a separate pump such as pump SP, the required pressure operating conditions can be met since the latter pump can be regulated independently of the lubrication pump LP without unduly complicating the hydraulic pressure system for the clutch-servo CS.

Thus, a much wider range of installations for the present invention even extending into the heavy-duty vehicles such as trucks and busses, is available with the use of separate pumps mounted as a unit and operating from a common drive shaft, due to limitations on pressure production of the lubrication pump LP which generally is set to operate at maximum 55–60 p.s.i. with the engine operating at approximately 2200 r.p.m.

This dual-pump construction provides the additional advantage of simplifying the main control valve CV by eliminating the minimum pressure lubrication control valve LV and included check-valve $CK^a$ since the servo-activating pump SP is not involved in any manner with the function of the lubrication pump LP. Thus, the elongated valve chamber 176 communicates directly with the rectangular valve chamber 171 from which the oil flows through the passage 172 into the valve bore 97 for distribution and control by the composite valve piston VP in the same manner as previously described in connection with the main embodiment.

In eliminating the lubrication valve LV from the control valve structure, the bore 170, closure plug 186 and associated drainage passages are no longer needed which further simplifies the main control valve CV to produce a low-cost and commercially practical unit.

OPERATIONAL SUMMARY

Although the manner in which my invention achieves its objectives should be manifest from the foregoing description augmented by an inspection of the drawing in conjunction therewith, a brief restatement is deemed apropos to insure a clear understanding of the novel co-action of the various components as follows:

Assuming the clutch FC is fully disengaged as demonstrated in FIGURES 1 and 17, under influence of its disengaging spring 64, and the engine operating at idle speed with the accelerator pedal AP fully released, to drive either the pump LP or optionally the separate pump SP shown in FIGURE 31, at minimal pressure producing speed, and the car standing in readiness to be started. Under these circumstances, engine oil is being delivered from the output (discharge) port 224 of the pump LP through the port 174 (control orifice) to shunt line 472 therefore the engine oil gallery under minimal pressure of about 8–10 p.s.i. established by the spring load on the minimum pressure lubrication valve LV in seated position as shown in FIGURES 4 and 17. Engine oil is also being delivered into the branch line 292 against the diaphragm 298 of the interrupter switch IS, but due to reaction from spring 316 on the opposite side of this diaphragm being set to yield at about 10–12 p.s.i. to open the switch IS, the minimal pressure for lubrication purposes is insufficient to activate said diaphragm to open the contacts of switch IS, therefore this later switch remains closed to complete in part the electric circuit 118. Flow of oil through port 174 results in pressure build-up in the valve body in accordance with engine r.p.m. A minimal residual line pressure is maintained in the servo working chamber 82, valve body 92, and interconnecting oil lines by means of the two spring-loaded check-valves $CK^a$ and $CK^b$ which are set to establish such residual pressure at approximately 2 p.s.i. when the transmission is in neutral condition as shown in FIGURES 1 and 17, wherein the solenoid $S^b$ is energized to render first stage control of the check-valve $CK^b$ effective in response to the shift-lever switch SS being always closed to complete the electric circuit 223 when the lever occupies "N" position. Also the servo-piston 55 is fully retracted by spring 64 to normal position to normalize the thrust-transmitting connection YC and thus opening the detector switch DS to interrupt the electric circuit 118 resulting in de-energization of solenoid $S^a$.

Therefore, prior to starting the vehicle, the various control components comprising the present invention are in their normal operating positions shown in FIGURES 1, 4 and 17 as follows:

(a) Clutch FC fully disengaged.
(b) Gearbox GB in neutral.
(c) Shift-lever controlled switch SS closed, lever in "N" position.
(d) Detector switch DS open.
(e) Thrust-transmitting connection YC normalized.
(f) Accelerator pedal released.
(g) Engine operating at idle speed.
(h) Interrupter switch IS closed.
(i) Solenoid $S^a$ de-energized.
(j) Solenoid $S^b$ energized to render first stage operation of check-valve $CK^b$ effective.
(k) Minimum pressure lubrication control valve LV seated to divert oil into the engine oil gallery at about 10 p.s.i.
(l) Check-valve $CK^a$ seated to cooperate with check-valve $CK^b$ to establish minimal residual pressure at approximately 2 p.s.i. in the servo-working chamber 82, valve body 92 and oil circuits associated therewith, and which are supplied with oil through port 174 upon seating of the minimum pressure lubrication valve LV.

Now, considering the three phases of operating a vehicle, namely: starting, driving and stopping which define a cycle of normal vehicular operation from a standing start and driving until a full stop, with the control components (a) through (1) in normal positions as indicated above, to start the vehicle the driver first moves the shift-lever SL to "L" position to activate low-speed drive in the gearbox GB as the starting gear, such selection of the starting gear (low speed) being made by lifting up on the shift-lever SL and then rotating the same clockwise in its upper plane of rotative movement from the driver's viewpoint to "L" position as shown in FIGURE 18 which disposes the shift arm 330 in the position shown corresponding to operation of the low-speed into engaged position with its mating gear (not shown) in the gearbox GB as is understood. This movement of the shift-lever from "N" to "L" position presents the switch-actuating plate 332 in alignment with the lower dome-end 378 of the switch-actuating plunger 357, thus releasing said plunger to move downwardly into engagement therewith under influence of springs 365, 368 to disengage the contact disc 351 therefore the conductive segments 353, 354 from their respective contact elements 343, 344 to interrupt circuits 348 and 223, respectively, as shown in FIGURE 18 wherein the starter circuit cannot be energized while the transmission GB is "in-gear," and the solenoid S$^b$ is de-energized to render second stage operation thereof effective against the check-valve CK$^b$ to induce pressure build-up on the circulating oil therefore slightly opening the minimum pressure lubrication control valve LV to admit higher pressure, that is, above the minimal residual (non-activating) pressure of about 2 p.s.i., at substantially 8 p.s.i. into chamber 171, channel 158 via conduit 88 into the servo-working chamber 82 to move the servo-piston 55 to the position of FIGURE 18 in opposition to spring 64 thereby actuating the clutch pressure plate 16 into frictional engagement with the friction faces 53, 54 on the clutch driven disc DA therefore into frictional contact with the flywheel FW to effect partial (slipping) engagement of the clutch FC, at which point additional movement of the servo-piston 55 is effective to close the detector switch DS as a function of relative movement within the piston-rod 63 defined by yielding of the thrust-transmitting connection YC from FIGURES 11, 17 position to the position of FIGURES 15, 18 whereat the extreme reduced end 254 of the push-rod 63 is abutting the rear end wall of the chamber within said connection YC, and the star-shaped spring 257 is at maximum tension as shown in FIGURE 15.

It is important to point out here that the thrust-transmitting capacity of the star-shaped spring 257 under normal tension is shown in FIGURE 11, and while yielding to thus increase its tension to the position defined by FIGURE 15 to operate the detector switch DS at initial pressure application from the servo-piston 55 against the clutch throw-out lever 56, can only effect partial (slipping) engagement of the clutch FC due to solenoid S$^a$ being energized as a result of closing the detector switch DS with the interrupter switch IS already closed to complete the electric circuit 118 as shown in solid lines in FIGURE 18. Energization of the solenoid S$^a$ moves the valve piston VP as a unit in the main control valve CV to the position shown in FIGURES 9, 18 to dispose the control land 151 in lapping relationship with respect to the fluid channel 157 which blocks pressure flow from the chamber passage 172 communicating with said control channel 157, therefore such pressure flow is interrupted to the servo chamber 82 to stabilize the servo-piston 55 in the position shown in FIGURE 18 wherein the clutch friction members are arrested (halted) in partial (slipping) engagement as defined by the amount of thrust transmittable by the servo-piston 55 via the thrust-transmitting connection YC operated to the position of FIGURE 15 corresponding to closed condition of the detector switch DS, against the clutch throw-out lever 56 which in turn actuates the clutch-operating levers 26 to force the pressure plate 16 into partial (slipping) relation with respect to the clutch driven disc assembly DA and engine flywheel as is understood.

Thus, the clutch FC is now operating in partial slipping-engagement as a function of moving the shift-lever SL from "N" to "L" position to activate the starting gear in the gearbox GB, and immediately following activation of the starting gear, the accelerator may even be slightly depressed to increase the r.p.m. of the engine to increase pressure flow from the oil pump LP, but irrespective of such initial acceleration of the engine, the detector switch DS automatically signals initial clutch-plate contact to hold the clutch FC in such slipping condition should the driver pause on the accelerator pedal AP, thus preventing possible stalling of the engine by overloading due to inadequate accelerator depression to provide the necessary torque to move the vehicle under prevailing load and road conditions; but if the driver deliberately moves the accelerator pedal to firmly lock-up the clutch FC, then accelerator actuation blends with such arresting function of the overlapping control land 151 and channel 157 to smoothly merge initial slipping contact of the clutch plates (members) with firm engagement thereof without any noticeable interruption or lurching reaction.

With the control land 151 and fluid channel 157 overlapped as shown in FIGURES 9, 18, the driver presses through on the acceleratior if he has paused at this point of engine acceleration, which further lowers vacuum efficiency in the intake-manifold therefore the vacuum in the vacuum chamber 144 of the vacuum-modulated diaphragm unit VD which releases the power-spring 143 as the modulating diaphragm 131 is released, to act against the right end of the valve piston VP in opposition to valve interconnecting and return springs 106, 121, respectively, to move the right valve element 101 relatively to the left valve element 100, such relative movement being accommodated by yielding of spring 106 between said valve elements, thus enabling the push of the diaphragm 131 under bias of the power-spring 143, to move the control land 151 out of lapping position with respect to channel 157 to a plurality of fluid-controlling positions depending on the amount of movement of the modulating diaphragm 131 by said power-spring 143 which reacts on the right valve element 101 to match engine output torque. Therefore, as manifold vacuum drops, the spring load on the right valve element 101 increases to displace the control land 151 from its channel overlapping position of FIGURE 9 to said plurality of fluid-controlling positions which vary the exposure of the fluid channel 157 to fluid channel 158 therefore the servo-working chamber 82, as shown in FIGURES 10, 19. That is to say, the driver has under his supervision the degree of communication between the fluid channels 157, 158 therefore the servo oil pressure producible by the pump LP to further energize the clutch-servo CS after the latter first being arrested in slipping engagement control of the clutch FC, to actuate the clutch members 16, DA and flywheel into firm engagement for normal vehicular driving as shown in FIGURE 19 corresponding substantially to 30 m.p.h. road speed, for example. Accordingly, the clutch FC may be varied in its degree of firm engagement to reduced torque-transmitting efficiency in slipping engagement as shown in FIGURE 18, thus incapable of transmitting sufficient torque to impart "creeping" movement to the vehicle with the foot-brake lightly applied, the gearbox GB "in-gear" and the engine running as are the conditions when momentarily stopping the vehicle as at a traffic light in the gear in which the vehicle approached such traffic light.

The maximum servo oil pressure which the pump LP is capable of delivering to the main contol valve CV is substantially the same pressure which the engine oil relief valve RV retains in the oil gallery with opening generally set to occur at 55–60 p.s.i. at approximately 2200 r.p.m. of the engine.

Upon the control land 151 being moved to initial position to partially expose the fluid channel 157 so that it can communicate oil flow to the channel 158, as shown in FIGURE 10, interlock pin 195 automatically moves under influence of the armature spring 210 into the path of the control land 152 as shown in this figure due to solenoid S$^b$ being de-energized. Also this mechanical interlocking operation of the right valve element 101 is accompanied by reactivation of the two stages of fluid pressure control by the check-valve CK$^b$ due to protraction of the armature 205 as a unit with the interlocking pin 195.

With the right valve element 101 in interlocked position as shown in FIGURES 10, 19, the driver can now vary the exposure of fluid channel 157 to channel 158 by accelerating the engine which correspondingly lowers the vacuum production within the intake-manifold therefore vacuum efficiency in the vacuum-modulated chamber 144, to correspondingly release the power-spring 143 to act via plunger 128 on the right valve element 101, and thereby moving the same relatively to the left valve element 100 to effect such additional exposure of the channel 157. Thus, additional exposure of the channel 157 is accompanied by increase in oil pressure from the pump LP, to further activate the servo-piston 55 to the position of FIGURE 19 whereat the clutch FG is locked in firm engagement for maximum torque-transmitting efficiency corresponding, for example, to 30 m.p.h. road speed of the vehicle.

Upon oil pressure reaching substantially 2 p.s.i. against the servo-piston 55 to effect partial (slipping) engagement of the clutch FC as shown in FIGURE 18, slight additional acceleration of the engine results in raising the pressure in the valve body 92 above the 8 p.s.i. thus causing the interrupter switch IS to open to break circuit 118 and thereby de-energizing solenoid S$^a$, but at this point, the vacuum-modulated power-spring 143 has been sufficiently released to push against the right valve element 101 to prevent displacement of the control land 151 out of overlapping relation with respect to the channel 157 under influence of return spring 121. Under these conditions, the vacuum-modulated power-spring 143 continues to push on the right valve element 101 according to accelerator position in an engine accelerating direction above idle speed control, and thus moves the right valve element relatively to the left valve element due to yielding of the spring connection 106 between said valve elements 100, 101.

Movement of the right valve element 101 under thrust from the vacuum-modulated power-spring 143 which is normally energized to overcome both springs 106, 121, positions the control land 151 to the left of the fluid channel 157 to place the servo oil pressure in direct communication via channel 158 and connected conduit 88, with the servo-working chamber 82 whereby servo-activation to firmly engage the clutch FC is dependent on increase in oil pressure producible by the pump LP as a function of increasing engine speed. Thus, after partial engagement of the clutch FC has been effected in the manner described above, firm engagement thereof for vehicular drive is effected in response to increasing engine speed therefore engine torque as a function of vacuum efficiency within the intake-manifold controlling the effectiveness of the power-spring 143.

Assuming the car is now underway at substantially 30 m.p.h. road speed or above, the driver may release the accelerator pedal AP to idle the engine which results in high vacuum within the intake-manifold communicating with the vacuum-modulated chamber 144 which in turn retracts the modulator-diaphragm 131 and thereby compresses the power-spring 143 to maximum tension and simultaneously retracts the plunger 128 out of engagement with the bottom of the blind bore 127 in the right valve element 101, but this latter valve element cannot return to normal position shown in FIGURES 4, 17, under joint action of the interconnecting and return springs 106, 121, respectively, due to the upper end portion of the interlocking pin 195 being disposed in the path of the control land 152 thus blocking right movement of said valve element 101. This novel interlocking arrangement of the valve piston VP prevents "shuttle" disengaging and re-engaging operations of the clutch FC during normal highway operation of the vehicle when the accelerator is momentarily released and depressed as for slowing the vehicle or use of engine-compression braking on downgrades in response to releasing the accelerator.

By interlocking the valve piston VP in the position of FIGURE 10 after starting the vehicle, firm clutch engagement in response to engine operation cannot be interrupted, but can be varied as to torque-transmitting efficiently which is dependent on the speed at which the engine is operating. For example, if the car is slowed down to 10 m.p.h., corresponding decrease in the oil pressure against the servo-piston 55 results in modulating firm engagement toward slipping engagement, and conversely increasing engine speed would be effective to restore the clutch FC to firm lock-up condition as shown in FIGURE 19 for resumption of normal vehicular driving without disturbing the main valve position as shown in FIGURE 10.

When bringing the car to a temporary stop as at a traffic light with the shift-lever SL in "H" position, for example, which gear position of the shift-lever renders the interlocking pin 195 effective to block return of the main valve piston VP to normal position as shown in FIGURE 4, disengagement of the clutch automatically by spring 64 occurs in response to reduction of engine speed to idle speed upon application of the foot-brake, and upon reduction of engine speed to where the servo oil pressure corresponds approximately to slightly less than the 8–10 p.s.i. required for the minimum pressure lubrication valve LV, this latter valve seats as shown in FIGURES 4, 17 and 27 which exposes the restrictive slot 181 to chamber 171 in the valve body 92 with the result that oil trapped in the servo-working chamber 82 and conduit 88 and the seated lubrication pressure control valve LV, is released through said restrictive slot via the check-valve CK$^a$ and apertured plug 191 to return via drainage surface channels on the plug 186, annular channel 187, passage 188 into bore 97, and thence through the cross drainage passage 98 to surface channel 232 into the suction line or directly into the oil sump by means of a separate drainage line as shown in FIGURE 31, for recirculation. This "bleeding-off" of such trapped oil enables the servo-piston 55 to return to normal full clutch disengaged position as shown in FIGURES 1 and 17 under influence of spring 64 notwithstanding the main valve piston VP is in its interlocked position of FIGURE 10, and, upon resetting the shift-lever SL in the selected starting gear such as "L" position as shown in FIGURE 18 to restart the vehicle when the traffic light changes to "go," the solenoid S$^b$ is re-energized thereby retracting the interlock pin 195 to the position of FIGURE 4 out of the path of the control land 152 to release the main valve piston VP to normalize under influence of springs 106, 121 as shown in FIGURE 4 for another vehicular starting cycle in the manner above described, such spring-biased normalizing of the main valve piston VP being accommodated by the fully retracted position of the modulating diaphragm 131 and connected plunger 128 under high vacuum energization produced by idle speed of the engine in the intake-manifold while the car was standing at such traffic light.

Upon restarting the vehicle in the manner above described, movement of the shift-lever from "N" to "L" position, for example, raises the servo oil pressure to approximately 8 p.s.i. and ensuing opening (unseating) of the lubrication pressure control valve LV, moves the restrictive slot 181 out of communication with the valve chamber 171 as shown in FIGURES 18, 28 which negates the function of the check-valve CK$^a$ to control the minimal residual pressure of approximately 2 p.s.i. in the servo oil circuits so that increasing pressure on the oil by the pump LP can be utilized to actuate the servo-piston 55 to partially and firmly engage the clutch FC.

Raising the oil pressure to the aforesaid 8 p.s.i. for partial clutch engagement is effected by opening the switch SS in response to setting the shift-lever SL in "L" position, or for that matter to any active gear position of the gearbox GB, to interrupt the electric circuit to the solenoid S$^b$ which releases its spring 210 to protract its armature 205 and connected interlock pin 195 to dispose the upper end portion of said pin to the left of the tapered face 162 on the control land 152, and the reduced upper end of the armature into abutting relation with the lower end of the valve stem 192 as shown in FIGURE 10 to combine the two staging springs 208, 210 to react jointly against the poppet valve head 193 to more firmly hold it on its seat for increasing pressure activation from the pump LP.

When the clutch FC is fully disengaged as shown in FIGURES 1 and 17, the minimum pressure lubrication valve LV is seated to establish approximately 8–10 p.s.i. in the oil gallery passage as the minimal pressure required for adequate pressure lubrication of the engine working parts. Such seated position of the lubrication pressure control valve exposes the restrictive slot 181 to chamber 171 for "bleed-off" of trapped fluid from the servo-working chamber 82 and connected conduit 88 to enable spring-disengagement of the clutch FC, such exposure of the slot 181 also places the check-valve CK$^a$ in communication with the oil circuit leading to said servo-working chamber 82, so that this check-valve can cooperate with check-valve CK$^b$ in first staging position of fluid control, to establish the approximate minimal residual pressure in the oil circuits and clutch-servo CS to prevent cavitation, thus maintaining the circuits full for sensitizing activation of the servo-piston 55 for the purpose described.

Accordingly, it is seen that my invention in clutch control provides driver supervised operation of a motor vehicle wtih automatic clutch control, without sacrificing the important two-phase engaging action of such clutch for smooth starts with positive lock-up for normal highway driving.

The mechanical interlocking arrangement for the main valve piston VP prevents "shuttle operation" of the clutch FC when the accelerator is released and re-depressed during such normal driving of the motor vehicle, and produces hydraulic engagement of the clutch FC as a function of engine operation, that is, its speed and therefore torque output, with the partial re-engaging phase being reinstated automatically upon positioning the shift-lever SL in "N" position.

The novel thrust-transmitting connection YC and included detector switch DS interposed in the piston-rod 63 of the clutch-servo CS, provides the special and important advantage of controlling initial clutch-plate contact automatically with a simple yet positive mechanism to prevent overloading the engine when starting the car. The detector switch monitors such initial clutch-plate contact to the solenoid S$^a$ to operate the main valve piston VP to the position of FIGURE 9 to arrest further oil pressure actuation of the clutch-servo CS, and thereby establishing the clutch plates in partial (slipping) engagement as shown in FIGURE 18.

The modified control valve land shown in FIGURE 25 produces a retarding (slowing) action to the clutch plates as they enter slipping-contact phase of engagement to prevent over-engagement of the clutch FC with possible stalling of the engine. Where the modified control land 456 is employed in the main control valve CV, uninterrupted depressing of the accelerator pedal AP is required of the driver to progressively increase engine speed therefore torque output, to bring the clutch plates into firm lock-up torque-transmitting relationship as shown in FIGURE 19, which if not done, there is the possibility of undue slipping which would result if the accelerator pedal AP were only slightly depressed above idle speed control and the driver dwelled in such position while the metering slots 455 were insufficiently exposed to accommodate adequate oil flow to activate the clutch-servo CS to impart uninterrupted pressure on the clutch throw-out lever 56 to progressively close the clutch FC to start and drive the vehicle. Such exposure of the slots 455 being a function of lowering the vacuum within the intake-manifold and modulating the vacuum in chamber 144 to push the control land 456 for corresponding increase of exposure of said slots 455.

During normal high speed operation of the vehicle, and it should be desired to effect a shifting operation by the shift-lever SL as in the case of utilizing engine-compression braking on down-grades, or a shift into a lower speed drive for power and/or acceleration as in passing another vehicle, this down-shifting change of the active speed drive in the gearbox GB can be effected by simply releasing the accelerator pedal AP to idle the engine, and concurrently or subsequently moving the shift-lever to the desired new speed setting. Such movement of the shift-lever actuates the switch SS in the manner above described, to complete the electric circuit 223 thus energizing the solenoid S$^b$ to retract its armature 205 and connected interlock pin 195 to the position of FIGURE 4 which also cancels action of spring 210 against the check-valve head 193 of check-valve CK$^b$ and thereby reinstates first stage operation thereof to control minimal residual pressure at approximately 2 p.s.i. Retraction of the interlock pin 195 releases the main valve piston VP to return to normal position of FIGURE 4 by cooperation of its springs 106, 121 made possible by high vacuum in the modulating chamber 144 disengaging (retracting) the plunger 128 from the right valve element 101, such reinstatement of first stage operation of the check-valve CK$^b$ releases the servo oil pressure to return in cooperation with the restrictive slot 181 in the lubrication control valve LV, to the suction line 470 or directly to the oil sump by means of a separate drainage line (see FIGURE 31), via the apertured plug 191 in the check-valve CK$^a$ and lower horizontal chamber 165 in the valve body 92 which communicates with said suction line or optionally a separate drainage conduit. This release of the servo oil pressure upon initial movement of the shift-lever toward its selected active gear position, enables the clutch FC to disengage rapidly under influence of spring 64 to interrupt torque on the active gear in the gearbox GB so that the movable elements of the gearbox are released for movement to activate the newly selected gear. Upon the selected gear being activated, and the shift-lever correspondingly positioned to open the switch SS as shown in FIGURES 18, 19, second stage operation of the check-valve CK$^b$ is reactivated to combine with first stage operation and thereby restores servo-actuation to re-engage the clutch FC for the vehicle to operate in the newly selected drive of the gearbox GB, upon depressing the accelerator pedal AP to lower the vacuum in the vacuum-modulating chamber 144 for the diaphragm 131 thereof to push the valve piston VP under influence of the power-spring 143, into relative positions shown in FIGURE 19 so that the pump LP can actuate the clutch-servo CS directly to re-engage the clutch FC for resumption of normal vehicular operation according to the speed desired.

After the selected gear has been rendered active, the clutch FC is not freed to "dump" into re-engaged condition with attendant lurching of the car and discomfort to its passengers, but is maintained under control of driver-supervision through the agency of vacuum-control over movement of the valve piston VP to positions of FIGURE 19 wherein the clutch FC becomes locked-up.

When the shift-lever SL is moved to the selected new gear drive position, immediate initial re-engagement ensues under control of second and first stages of the check-valve CK$^b$ being effective, but since servo oil pressure cannot be raised above the control value of approximately 8 p.s.i. establishable as a function of the two-stage operation of said check-valve CK$^b$, such pressure is insufficient to bring about firm lock-up of the clutch plates as is understood, notwithstanding the control land 151 is disposed in normal position as shown in FIGURE 4. Therefore, the driver after completing the selected shifting operation which conditions the check-valve CK$^b$ to induce partial (slipping) re-engagement of the clutch plates automatically, he must further depress the accelerator pedal AP to lower the vacuum efficiency in the intake-manifold for the vacuum-modulated unit VD to be effective to push the main valve piston VP to relatively selective positions as shown in FIGURE 19 to induce firm engagement of the clutch FC by the clutch-servo CS as a function of increasing servo oil pressure by increasing engine speed therefore torque output thereof. Upon the valve piston VP being repositioned in FIGURE 19 operating status, the interlock pin 195 is again effective to block return of the valve piston to normal relative condition with respect to its two elements 100, 101 as shown in FIGURE 4 until solenoid S$^b$ is again re-energized notwithstanding the modulating diaphragm 131 is reciprocated under influence of varying degrees of pressure differential opposed by reaction from the power-spring 143, as a result of raising and lowering the vacuum in response to reciprocation of the accelerator pedal AP therefore throttle-plate TP in the carburetor CR, during normal operation of the motor vehicle on the highway.

The present invention is primarily adapted for use with hydraulically-engageable friction clutches of the type under consideration, however, it may be operatively associated with other conventional types such as those which utilize spring-pressure to effect engagement thereof upon controlled release of associated power-disengaging means. Therefore, I desire to make it manifestly clear that my novel clutch control mechanism may be readily adapted to either type of clutch operation, that is, hydraulic or spring-engageable.

Interaction of the control components shown in FIGURES 17 and 38 produces a novel and patentable arrangement and features of construction and operation of the cooperating elements comprising said components and more efficient cooperation of such elements during the critical stage of detecting initial clutch-plate contact to enable the driver to predictably control the final engaging movements of the clutch plates into firm engagement for maximum torque-transmitting efficiency.

Further considering the operational behavior of the yieldable thrust-transmitting device (connection) YC and included clutch-plate contact detector switch DS, and resulting advantages provided, it is desired to point out that closure of this switch is a function of relative movement within the servo piston-rod 63, such movement being accommodated by yielding of the star-shaped spring 257 in said device. Upon closure of switch DS, circuit 118 is completed through the already closed interrupter switch IS to the grounded terminal 116 of the solenoid S$^a$ which moves the valve piston VP leftward as a unit to the position of FIGURES 9, 18 to interrupt servo-actuation of the clutch members in partially (slipping) engagement. Firm engagement of the clutch members to drive the vehicle is provided by further servo-actuation of the clutch members in response to the vacuum-modulated diaphragm unit VD which is spring loaded and "reads" engine vacuum in terms of torque output of the engine. High vacuum production within the intake-manifold translated into torque corresponds to low torque output, but as engine speeds upon from idling speed after the clutch members have been established in partial (slipping) engagement as shown in FIGURE 18 by operation of the device YC and included detector switch DS to take up the backlash in the drive line, vacuum goes down which enables the spring-action in the modulating diaphragm unit to apply its pressure on the right valve element 101 to move the same relatively to the left valve element 100 to the position of FIGURES 10, 19 in the same direction as the valve piston VP was initially operated as a unit by the solenoid S$^a$ to the position of FIGURES 9, 18 in response to closing the detector switch DS. This relative positioning of the valve elements 100, 101 as shown in FIGURES 10, 19, directs increasing engine oil pressure against the servo-piston 55 to firmly engage the clutch members under driver-supervision in accordance with the depressive position of the accelerator pedal AP and the rate of movement toward such position.

Upon pressure in the interrupter switch IS reaching about 8–10 p.s.i., this switch opens to interrupt the included electric circuit 118 despite the detector switch DS remaining closed under servo-actuation thrust. Solenoid S$^b$ is now de-energized, and since the interrupter switch IS responds to change in pressure on the engine oil in such manner that when the engine speeds up pressure increase ensues and when it slows down, pressure decreases, therefore, the interrupter switch IS function as a "speed-sensitive device" to establish initial range of vehicular speed in which the detector switch DS is effective to control the clutch-servo CS to limit its initial actuation to that of establishing the clutch members 16, DA in slipping engagement insufficient to transfer torque to the road wheels to cause the motor vehicle to "creep" with its brakes "off" or only lightly applied.

Since actuation of the detector switch DS to closed position is dependent on the degree of partial engagement of the clutch FC as defined by the thrust-force of the clutch-servo CS transmittable by the star-shaped spring 257 in the device YC, this novel means of detecting such partial engagement functions uniformly under all conditions of clutch and vehicle operations, and especially provides the long sought need for a simplified engaging-control for clutches which would compensate automatically for wear on the clutch facings as well as other factors adversely affecting smooth clutch engaging-action. Irrespective of the amount of wear on the clutch facings even to exposure of a metallic portion of the driven discs, the detector switch DS will uniformly function to either arrest of retard the friction driving and driven members in partial "slipping" engagement sufficient to at least take up the backlash in the drive line, thus serving as a preconditioning operation for accelerator follow through to firmly engage the clutch members for normal driving of the vehicle as is understood.

It is further important to note in connection with the operation of the control land 151 in the main control valve CV, that the relative relationship between the left side of this control land and cooperating fluid channel 158 determines the rate of producing "slipping" engagement for activation of the detector switch DS to closed position, that is to say, a slower or faster rate of clutch member relative movement toward "slipping" relation is selectively available in accordance with the established restriction of oil flow through channel 158 into the clutch-servo CS under joint influence of the two springs in the check-valve CK$^b$. And, similarly, when the control land 151 approaches the position of FIGURE 10, the relative relationship between the right side of this control land and exposure of the fluid channel 157 to communicate with channel 158 determines the rate of fluid flow into the conduit 88 therefore relative movement of the clutch members into firm engagement. Since communication between channels 157, 158 is under driver-supervision through accelerator control of the vacuum-modulated diaphragm unit VD, it follows that rapid depressing of the accelerator pedal AP would produce a corresponding rate of increase in the exposure of the channel 157 to channel 158 therefore a more rapid closure of the clutch members to lock-up condition would result.

In connection with check-valves CK$^a$ and CK$^b$ there is differential flow capacity through these two check-valves due to the slot 181 being more restrictive than port 167 controlled by the check-valve CK$^b$. This difference in flow control enables second stage operation of check-valve CK$^b$ to augment servo oil pressure in the servo-working chamber 82 to move the servo-piston 55 to effect partial slipping-engagement of the clutch FC. Upon activation of second stage flow control in response to de-energization of solenoid S$^b$, pressure in the chamber 171 is increased which reacts on the minimum pressure lubrication valve LV to unseat it therefore isolate slot 181 from said last-named chamber so that servo oil pressure attains substantially 8 p.s.i. sufficient to overcome spring 64 and thereby bringing the clutch plates into slipping contact as shown in FIGURE 18, the degree of slipping contact being defined by the thrust-transmitting capacity of the star-shaped spring 257 while yielding within the connection YC, with operation of said connection being effective to enable closing of the detector switch DS thus energizing solenoid S$^a$ to move the control land 151 to the position of FIGURES 9, 18 wherein the clutch FC is halted in such slipping condition.

It is further desired to point out in connection with the clutch halting function of the main embodiment of the present invention to establish the clutch FC in partial (slipping) engagement, that if the driver presses through without interruption on the accelerator pedal AP, in starting the vehicle, that the halting function of the main control valve assembly CV is automatically converted into a retarding function to only slow the rate of relative clutch plate movement upon initial contact thereof, that is to say, such uninterrupted depressing of the accelerator pedal merges partial engagement with final firm engagement unnoticed by the driver, but should he dwell on the accelerator pedal after initially depressing it, then the halting function automatically ensues to prevent overloading the engine with consequent possible stalling, whereupon slowing of the engine due to lack of throttle for the load to be moved or the road condition present, signals the driver to provide more throttle so that the laboring engine can increase speed and torque output to start the vehicle without decreasing speed therefore loss of needed output torque.

Therefore, the present automatic clutch provides for the first time a simplified and positive means for establishing the clutch members in partial engagement by the interposition of said novel detector switch DS in operative association with said novel thrust-transmitting device YC, so that wear in the clutch-actuating mechanism or clutch facings will no longer contribute to erratic engaging-action since the detector switch DS depends for its operation on a predetermined thrust exerted by the clutch-servo CS on the clutch members for uniform control over the relative slipping positions of the clutch members irrespective of wear and other factors adversely affecting smooth operation of the clutch assembly as a whole.

Periodical adjustments, therefore, are not required, it being one of the main objectives of this clutch development to produce an automatic clutch responsive to engine operation and shift-lever movement which does not require frequent adjustments to maintain optimum operating efficiency. Since partial engagement is a function of a predetermined amount of thrust applied by the servo-piston 55, it is contemplated that the only servicing that should ever be required would be the replacement of the driven disc DA when its facings become worn too thin for efficient transmission of drive torque. Such limited servicing should occur only every 25,000 to 30,000 miles (two to three years of normal driving) depending, of course, on the driving conditions to which the car has been subjected and the mode of driver operation.

The foregoing description is believed to set forth clearly the achieving of the various stated objectives of my invention, and to describe the advantageous results to be derived therefrom.

Considering the terminology used in the foregoing description and in the appended claims, the identifying expressions and/or terms employed are intended to convey meanings which include the range of reasonable equivalents in the patent sense. For example, the expressions "friction engaging device," "clutch," "friction clutch," "coupling," "clutch members," "clutch plates," "pressure plate," "primary disc assembly," "drive and driven members," are intended to designate a friction-type clutch or coupling serving to transmit torque from a source of torque production to a variable change-speed drive, or modifications thereof adapted to serve the same purpose. The terms "fore," "aft," "forward," "rear," "top," "bottom," "end," "left," "right," and other directional words or characters except those referring to vehicular motion or oil flow in the various oil circuits, are intended to have only relative connotation for convenience in describing the structure as displayed on the drawing, and are not intended to be interpreted as requiring any particular orientation with respect to environmental structure in which the present invention may be associated for its novel advantages to be realized to advance the art. In the broader patent sense, the aforementioned solenoids S$^a$ and S$^b$, clutch-servo CS and vacuum-modulated diaphragm unit VD may each be termed an energizable actuator with included means for energizing the same, and the yieldable thrust-transmitting connection YC and included detector switch DS may be referred to as comprising a pair of normally spaced abutment-engaging elements (end wall 241 and extension 254, respectively) in series with the aforesaid normally preloaded interposed thrust-transmitting spring 257, the invention contemplating that the switch DS may be incorporated in said connection to produce a unitary assembly therewith and wherein the preloaded setting of said thrust-transmitting spring would be capable of transmitting the required thrust from the clutch-servo CS to operate the clutch FC into slipping engagement, before yielding to accommodate operation of the switch DS to complete the circuit to the solenoid S$^a$ whereby movement of the control valve piston VP to its FIGURE 18 position is effected to interrupt flow of pressurized oil to the clutch-servo, thus enabling the latter to stabilize said clutch FC in slipping engagement.

The preferred embodiment and two modifications of the invention herein disclosed are believed well calculated to fulfill the objects above stated, however, it should be appreciated that I do not wish such to be limited to the exact construction and/or arrangement of parts shown, since it is evident that modifications, variations and substitutions may be resorted to without departing from the proper scope or fair meaning of the subjoined claims.

Having thus described my invention, I claim:

1. In control mechanism for a clutch having a plurality of frictionally-engageable elements for transmitting torque when engaged from an internal-combustion engine driving connected thereto and controllable by an accelerator, pre-energized spring means for disengaging the clutch and actuatable hydraulic means for engaging the same, the improvement which comprises: means for controlling actuation of the hydraulic means to effect engagement of said clutch elements including valve means having a composite valve element sequentially movable from normal position of pressure flow control wherein said hydraulic means are effective to partially engage said clutch elements, to a pressure flow interrupting position of control wherein actuation of said hydraulic means is suspended to establish said partial engagement of said clutch elements, and to a plurality of pressure flow controlling positions wherein said hydraulic means are effective to firmly engage said clutch elements; and clutch contact-detecting means operable upon transmitting a predetermined initial thrust from said hydraulic means to establish said clutch elements in partial (slipping) engagement, for controlling in part movement of said valve element from normal position to such flow interrupting position of control, said contact-detecting means comprising a pair of normally spaced abutment-engaging elements in series with an interposed normally preloaded spring, an electric circuit including energizing means therefor, an energizable solenoid interposed in said circuit to effect said movement of said valve element when energized, and a switch operable to complete said circuit in response to additional thrust exerted by said hydraulic means effective to close the space between said abutment-engaging elements and modulate said spring accordingly thus establishing said clutch elements in partial engagement.

2. In control mechanism for the elements comprising a friction clutch, means including a hydraulic servomotor operable to re-engage the clutch in opposition to spring-disengaging means therefor, the improvement which comprises: means for controlling said servomotor to control the rate of reengagement of the clutch comprising a valve element having a normal position effectual for initial engagement of said clutch, manual means movable from normal to an operating position of control to activate said servomotor to partially engage said clutch, an energizable actuator for moving the valve element to a controlling position, and energizing means for said actuator including a control device arranged to be operated in response to a predetermined thrust produced by servo-actuation of the clutch into initial engagement; and personally-controlled means for additionally moving the valve element after first being placed in its said controlling position by said actuator whereby the rate of final engagement of said clutch can be varied at will.

3. In control mechanism for the elements comprising a friction clutch, means including a hydraulic servomotor operable to re-engage the clutch in opposition to spring-disengaging means therefor, the improvement which comprises: means for controlling said servomotor to control the rate of re-engagement of said clutch comprising a valve element having a normal position effectual for initial engagement of said clutch, manual means movable from normal to an operating position of control to activate said servomotor to partially engage said clutch, an electric circuit including energizing means therefor to energize said solenoid, and a control device operably connected between said servomotor and said friction clutch and which is arranged for operation in response to a predetermined thrust produced by servo-actuation of the clutch elements into initial engagement, and personally-controlled means for additionally moving said valve element to a different controlling position after first being placed in its first-named controlling position by said solenoid whereby the rate of final engagement of said clutch elements can be varied at will.

4. In a vehicular drive system including a torque producing internal-combustion engine controllable by an accelerator mechanism actuatable from a predetermined position through a range of engine-accelerating movements, a change-speed transmission receiving drive-torque from the engine, movable torque-transmitting clutch elements interposed in the drive line between the engine and transmission for engagement with one another to transfer said drive-torque to said transmission, power means for moving said clutch elements, control means for said power means, an energizable actuator for controlling in part said control means, an electric control circuit for energizing said actuator and including a source of electrical energy, the improvement which comprises: yieldable thrust-transmitting means having a pair of normally spaced abutment-engaging elements operatively interconnecting said power means with said clutch elements, respectively, to move the latter, and including a switch device interposed in said control circuit in series with said actuator and operable to closed position in synchronism with said yielding of said thrust means to complete said circuit in response to limited relative thrust-transmiting movement provided by said normally spaced abutment-engaging elements, to thereby energize said actuator to control said control means to suspend energization of said power means upon the latter moving the clutch elements into said initial slipping engagement defined by said relative thrust-movement, and thereby arresting movement of said clutch elements in slipping engagement relationship; and means operable in response to accelerator operation in an engine-accelerating direction for overriding said suspended operation of the power means for reactivating said latter means to effect movement of said clutch elements into final firm engagement.

5. In a vehicular drive system including a torque producing internal-combustion engine controllable by an accelerator mechanism actuatable from a predetermined position through a range of engine-accelerating movements, a change-speed transmission adapted to receive drive-torque from the engine, movable torque-transmitting clutch elements interposed in the drive line between said engine and transmission for engagement with one another to transfer said drive-torque to said transmission, power means for moving said clutch elements, control means for said power means, an energizable actuator for controlling in part said control means, an electric control circuit for energizing said actuator including a source of electrical energy, the improvement which comprises: yieldable thrust-transmitting means having a pair of normally spaced abutment-engaging elements operatively interconnecting said power means with said clutch elements, respectively, to move the latter, and including a switch device interposed in said control circuit in series with said actuator, and operable to closed position in synchronism with the yielding of said thrust means to complete said circuit in response to limited relative thrust-transmitting movement provided by said normally spaced abutment-engaging elements, to thereby energize said actuator to control said control means to slow the rate of energization of said power means, upon said latter means moving the clutch elements into initial slipping engagement defined by said relative thrust-movement for retarding the rate of movement of said clutch elements through slipping engagement relationship; and means operable in response to accelerator operation in an engine-accelerating direction to override said slowed rate of energization of said power means for reactivating said latter means to effect movement of said clutch elements into final firm engagement.

6. In an automotive vehicle provided with a change-speed transmission and a manual speed-selector member therefor, an accelerator, an internal-combustion engine for producing drive-torque and a carburetor for controlling in part operation of said engine, said carburetor including an accelerator-operated throttle-valve operative in part to control the degree of gaseous pressure within the intake-manifold of the engine and to control the speed of the engine therefore its torque output, a friction clutch having a plurality of engageable elements with at least one of said elements drivingly connected to said engine for transmitting drive-torque to a different clutch element connected to said transmission when said elements are engaged, an energizable power device provided with a movable power element adapted to engage said clutch elements by means of thrust applied to a connected push-rod, control means for controlling operative energization of said power device, and means for energizing said power device to effect engagement of said clutch elements in opposition to spring means adapted to disengage them, the improvement which comprises: pre-energized yieldable thrust-transmitting means interposed in said push-rod for interconnecting said power element with said different clutch element, respectively, and including a clutch element contact detector device operable in synchronism with limited relative operation of said thrust means comprising at least a pair of normally spaced solid members defining such limited relative movement therebetween, and further including a preloaded spring connected in series between said solid members, said spring being of such preloaded thrust-transmitting capacity that additional energization thereof during first stage operation of limited relative movement between said solid members, is effective to transmit thrust from said power device to partially engage said clutch elements, said first stage operation being effective operate said detector device to control said control means to modulate energization of said power device and thereby regulate said clutch elements through partially engaging relationship; and energizable overriding means operable in response to change in vacuum efficiency within said intake-manifold as a function of the extent of throttle opening during engine operation, for activating second stage operation of said thrust means wherein thrust is directly transmitted from the power device to said clutch elements to firmly engage them as a function of engagement of said solid members resulting from completion of first stage operation.

7. In an automotive power plant, the combination of an internal-combustion engine; a friction clutch having driving and driven members; an output shaft for receiving a drive-torque from said engine when said clutch members are engaged; a hydraulic servomotor having a reciprocable power element for controlling said clutch members; an engine-driven oil pump operatively contained in a housing open at one end and fixed on an exterior portion of said engine, said pump being adapted to pressure lubricate the working parts of the engine and supply pressurized oil to actuate said power element of said servomotor as a function of engine-speed; control valve means including a valve body processed interiorily with a plurality of chambers and interconnecting passages, and a movable element therein for selectively controlling certain of said chambers to control actuation of said power element, said valve body being adapted to close the open end of said pump housing and thereby produces a unitary assembly therewith; a suction line between the oil sump in the engine crankcase and intake side of said pump; and a pressure-working line leading from the output side of said pump to one of the chambers in said valve body.

8. In an automotive power plant, the combination of an internal-combustion engine having an oil sump in its crankcase; a change-speed transmission having a manual speed-selector member; an accelerator mechanism for regulating the speed of the engine therefore its torque output; a friction clutch having driving and driven members for transmitting drive-torque from said engine to said transmission, when engaged; a hydraulic servomotor having an actuatable power element for controlling said clutch members; an engine-driven oil pump operatively contained in a housing open at one end and fixed on an exterior portion of said engine, said pump being adapted to pressure lubricate the working parts of the engine and supply pressurized oil to actuate the power element of said servomotor as a function of engine-speed; control valve means including a valve body processed interiorily with a plurality of chambers and interconnecting passages, and an element selectively movable unidirectionally therein relatively to certain of said chambers from normal position of presssure control to two different pressure-controlling positions to control actuation of said power element, said valve body being adapted to close the open end of said pump housing and thereby produces a unitary assembly therewith; a suction line between the oil sump in the engine crankcase and intake side of said pump; a pressure-working line leading from the output side of said pump to one of said chambers in said valve body; a pair of energizable actuators for selectively acting on said valve element to move the same unidirectionally from normal position to its two said oil pressure-controlling positions; means responsive to said manual member for controlling one of said actuators; means responsive to accelerator operation for controlling the other of said actuators; and energizing means for said actuators.

9. In an automotive power plant, the combination of an internal-combustion engine having a cylinder block and oil sump in its crankcase; a friction clutch having engageable driving and driven members; an output shaft for receiving drive-torque from said engine when said clutch members are engaged; a hydraulic servomotor having a reciprocable power element for controlling said clutch members; an engine-driven oil pump operatively contained in a housing open at one end and fixed on an exterior portion of said cylinder block, said pump being adapted to pressure lubricate the working parts of the engine; another engine-driven servo-actuating pump operatively contained in a housing separate from the oil pump housing, and having one end open, said servo-actuating pump being adapted to utilize the lubricating oil contained in the oil sump of the engine crankcase serving as a common source of oil supply for both pumps; control valve means including a valve body processed interiorily with a plurality of chambers and interconnecting passages, and an element selectively movable unidirectional therein for selectively controlling certain of said chambers to control actuation of said servomotor; means for separating said pump housings to isolate the operation of said pumps, thus serving to close the open end of said oil pump housing; a common shaft geared to a rotatable element of said engine for operating both pumps simultaneously; an output and intake port on opposite sides, respectively, of said servo-actuating pump; a suction line between the oil sump in the engine crankcase and intake side of said servo-actuating pump; an oil pressure-working line leading from the output side of said servo-actuating pump to one of said chambers in said valve body; spring-loaded relief valve means associated with said pressure-working line for controlling maximum pressure producible by said servo-actuating pump; and a plurality of fasteners projecting through aligned holes in the valve body, servo-actuating pump housing, separating means and oil pump housing in that order, into engagement with complementally threaded holes in said cylinder block to produce a unitary assembly of both pumps.

10. In an automotive power plant, the combination of an internal-combustion engine having a cylinder block and an oil sump in its crankcase; a change-speed transmission having a manual speed-selector member; an accelerator mechanism for regulating the speed of the engine therefore its torque output; a friction clutch having engageable driving and driven members; an output shaft receiving drive-torque from said engine when said clutch members are engaged; a hydraulic servomotor having a reciprocable power element for controlling said clutch members; and an engine-driven oil pump operatively contained in a housing open at one end and fixed on an exterior portion of said cylinder block, said pump being adapted to pressure lubricate the working parts of the engine; another engine-driven servo-actuating pump operatively contained in a housing separate from the oil pump housing, and having one end open, said servo-actuating pump being adapted to utilize the lubricating oil contained in the oil sump of the engine crankcase serving as a common source of oil supply for both pumps; control valve means including a valve body processed interiorily with a plurality of chambers and interconnecting passages, and an element selectively movable unidirectionally therein relatively to certain of said chambers, from normal position of pressure control to two different pressure-controlling positions, to control actuation of said servomotor; means separating said pump housings to isolate the operation of said pumps, thus serving to close the open end of said oil pump housing; a common drive shaft geared to a rotatable element of said engine for operating both pumps simultaneously; an output and intake port on opposite sides, respectively, of said servo-actuating pump; a suction line between the oil sump in the engine crankcase and intake side of said servo-actuating pump; an oil pressure-working line leading from the output side of said servo-actuating pump to one of the certain chambers in said valve body; spring-loaded relief valve means associated with said pressure-working line for controlling maximum pressure producible by said servo-actuating pump; and a plurality of fasteners projecting through aligned holes in the valve body, servo-actuating pump housing, separating means and oil pump housing in that order, into engagement with complementally threaded holes in said engine block to produce a unitary assembly of both pumps; a pair of energizable actuators for selectively acting on said valve element to move the same unidirectionally from normal position to its two oil-pressure controlling positions; means responsive to said manual member for controlling one of said actuators; means responsive to acceleration of the engine for controlling the other of said actuators; and energizing means for said actuators.

11. In control mechanism for a friction clutch having spring-disengageable driving and driven members engageable to transmit drive-torque from a torque producing engine, a power unit having an actuatable power element energizable by an included source of power, to effect engagement of said clutch members in opposition to spring-disengagement thereof, control means including a control element movable from normal position to first and second controlling positions for controlling energization of said power element, a manually-controlled element movable from normal position to operating position to induce energization of said power element to effect partial engagement of said clutch members while said first-named control element occupies normal position, a thrust-transmitting yieldable connection having a pair of normally spaced relatively movable solid elements connected to said power element and clutch members, respectively, and a pre-energized spring reacting between said solid elements for transmitting initial thrust produced by said power element when energized, and including a clutch member contact-detecting device operatable in response to yielding of said spring to modulate energization of said power element through partial engaging relation of said clutch members by inducing movement of said first-named control element to first controlling position without interrupting the operating position of said manually-controlled element, and thereby pre-conditioning firm engagement of said members in response to additional thrust exerted by said power element and transmitted "straight-through" said connection upon completion of said yielding of said spring defined by engagement of said solid elements.

12. In control means for friction clutches characterized by driving and driven members movable engageable for co-rotation in full drive-torque transmitting relation, and separable to interrupt transmission of driving torque from an associated prime mover responsive to an actuatable throttle control to vary torque production of said prime mover, means biasing said clutch members to separate, energizable power means operable in opposition to said biasing means, to engage said clutch members, and means for energizing said power means, the improvement which comprises: control means including an element movable unidirectionally from normal position to a plurality of operating positions; a pair of energizable actuators for selectively moving said element to its plurality of operating positions to control energization of said power means to effect engagement of said clutch members; means controlled by actuation of said throttle control for energizing one of said actuators; a personally-operable member; means controlled by said personal member for energizing said other actuator; and a detector device operable automatically in response to relative operation of said power means with respect to said clutch members, after said personal member has been operated, for detecting clutch member contact and thereby modulate energization of said power means during transition from partial to full engagement of said clutch members; and a thrust-transmitting yieldable connection operative to provide limited relative operation aforesaid between said power means and clutch members in response to initial energization of said power means.

13. Control means constructed in accordance with claim 12 in which said modulation of the energization of said power means is effective to arrest clutch member movement in partial (slipping) engagement.

14. Control means constructed in accordance with claim 12 in which said modulation of the energization of said power means is effective to retard the rate of clutch member movement from partial to firm engagement.

15. In a transmission, a drive member, a driven member, mechanism for providing a plurality of power trains between said members and including a friction engageable device for completing the power trains when engaged, a casing having a power chamber therein, a pump driven by said drive member for supplying pressurized fluid through an outlet duct to said power chamber, and a fluid sump, said pump having an inlet duct connected to said fluid sump: primary control means characterized by a movable element having a control portion selectively cooperable with the fluid outlet communicating with said power chamber, to distribute pressurized fluid to said power chamber to accommodate disengagement and initial engagement of said engageable device, and to interrupt such pressure distribution to stabilize said engageable device in initial engaging control; means for applying engaging force to the engageable device substantially in accordance with the effectiveness of the fluid pressure in said power chamber; secondary control means including a port between said fluid outlet and said fluid sump; a control element for said port; two-stage biasing means operatively associated with said control element; a power element energizable to override one of said operating stages of said biasing means without interrupting the effectiveness of the other operating stage, to establish the fluid pressure entering said power chamber at a minimal value ineffective to engage said engageable device; energizing means for said power element; and manually-controlled mechnism operatively associated with said secondary control means and with said power train mechanism to control energization of said power element whereby said other operating stage of said biasing means is effective on said control element to release the engaging force on said engageable device prior to actuation of said power train mechanism for changing one of said power trains to another.

16. In a transmission, a drive member, a driven member, mechanism for providing a plurality of power trains between said members and including a friction engageable device for completing the power trains when engaged, a casing having a power chamber therein, a pump driven by said drive member for supplying pressurized fluid through an outlet duct to said power chamber, and a fluid sump, said pump having an inlet duct connected to said fluid sump: primary control means characterized by a movable element having a control portion selectively cooperable with a fluid outlet communicating with said power chamber, to distribute pressurized fluid to said power chamber to accommodate disengagement and initial engagement of said engageable device, and to interrupt such pressure distribution to stabilize said engageable device in initial engaging control; means for applying engaging force to the engageable device substantially in accordance with the effectiveness of the fluid pressure in said power chamber; secondary control means including a port between said fluid outlet and said fluid sump;

a control element for said port; two-stage biasing means operatively associated with said control element; a power element energizable to override one of said operating stages of said biasing means without interrupting the effectiveness of the other operating stage to maintain the fluid pressure entering said power chamber at a minimal value ineffective to engage said engageable device during deactivation of said power train mechanism, said power element when de-energized enabling joint effectiveness of said two-stage operation of said biasing means to augment the minimal value of the fluid pressure entering said power chamber sufficiently to effect initial engagement of said engageable device upon activation of a power train; energizing means for said power element; and manually-controlled means operatively associated with said secondary control means and with said power train mechanism for controlling said energizing means and for actuating said power train mechanism to deactivate and activate a power train.

17. In a power supply system including an internal-combustion engine with a fuel intake-manifold, a drive member driven by said engine, a driven member, mechanism for providing a plurality of power trains between said members and including a friction engageable device for completing said power trains when engaged, a casing having a power chamber therein, means for supplying pressurized fluid through an outlet duct to said power chamber and having a fluid inlet duct connected to a fluid sump, a servo-mechanism operatively connected to said power chamber for applying engaging force to the engageable device substantially in accordance with the effectiveness of the fluid pressure in said power chamber: a control device for said servo-mechanism, and which is characterized by a body provided with a pair of chambers in series with an interposed working surface defining a main bore, a fluid inlet in said body between one of said chambers and said supply means, a fluid outlet in said body between the other of said pair of chambers and said power chamber, an element movable in said bore from normal position, a working surface on said element selectively cooperable with said working surface in said body to connect said pair of chambers for distribution of pressurized fluid to said power chamber to accommodate disengagement and initial engagement of said engageable device when said movable element is in normal position, and to disconnect said pair of chambers to interrupt such pressure distribution and thereby stabilize said servo-mechanism and connected engageable device in initial engagement when said movable element is in a second position, and biasing means for moving said movable element toward normal position; a detector device operatively interconnecting said servo-mechanism with said engageable device, said detector device including yieldable force-transmitting mechanism normally effective to transmit a predetermined thrust force from said servo-mechanism to initially engage said engageable device, an actuator energizable to effect movement of said movable element to second position in opposition to said biasing means to disconnect said pair of chambers to interrupt said pressure distribution to said power chamber in response to said servo-mechanism applying said predetermined thrust force to said engageable device; another biasing means effective to override said first-named biasing means and thereby move said movable element relatively to said actuator to a third position wherein pressurized fluid flow into said power chamber is re-established to operate said servo-mechanism to correspondingly inch said engageable device into firm engagement, said other biasing means including a surface portion operatively associated therewith, and means for applying the vacuum of said engine intake-manifold against said surface portion for controlling said other biasing means substantially in accordance with the changes in vacuum in said intake-manifold; manually-controlled means operatively connected to said power train mechanism whereby limited relative movement of said last-named means is provided to control said movable element to release the engaging force of said servo-mechanism on said engageable device prior to actuation of said power train mechanism to effect a change from one of said power trains to another, said last-named means including a control element operatively disposed in said inlet duct between said one chamber and said fluid sump, to vary the effectiveness of said pressurized fluid force in said power chamber to accommodate disengagement and initial engagement of said engageable device upon subjecting said surface portion to high vacuum to release said movable element for movement to normal position; and means for effecting disengagement of said engageable device automatically.

18. In a power supply system including an internal-combustion engine with an intake-manifold and a friction engageable device to provide for transmission of torque from the engine to a driven member, mechanism for controlling engagement of the engageable device and accommodating its disengagement comprising means for supplying pressurized fluid to said mechanism, a casing having a controllable power chamber of receiving said pressurized fluid; control means having a control element movable between low pressure control position and high pressure control range to an interposed pressure interrupting position in series with said low pressure position and high pressure range; a servo-mechanism operatively connected to said power chamber for applying engaging force to said engageable device substantially in accordance with the effectiveness of the fluid pressure supplied by said supply means to said power chamber when said control element is in high pressure range; a yieldable force-transmitting device operatively disposed between said servo-mechanism and said engageable device to transmit a predetermined thrust force from said servo-mechansim to initially engage said engageable device in accordance with the thrust-transmitting capability of said yieldable device prior to maximum yielding of the latter; another control element actuatable from normal to operating position in synchronism with said yielding operation of said yieldable device; an actuator effective to move said first-defined control element from low pressure position to pressure interrupting position to stabilize said servo-mechanism and connected engageable device initial engagement in response to actuation of said other control element to operating position; spring means including a normally preloaded spring operatively associated with said first-defined control element for biasing the same toward low pressure position wherein disengagement and initial engagement of said engageable device are selectively provided; a flexible power-diaphragm operatively associated with said first-defined control element; a one-way mechanical connection between said power-diaphragm and said first-defined control element; a power-spring operatively energizable by said power-diaphragm, and effective through said one-way connection to override said spring means for moving said first-defined control element from pressure interrupting position to high pressure range; means continuously venting one side of said power-diaphragm to atmospheric pressure on the opposite of said power-spring; means for continuously applying the vacuum from the intake-manifold of said engine to the other side of said power-diaphragm on the same side as said power-spring to operatively energize the latter and enable said spring means to bias said first-defined control element to low pressure position, said power-spring being releasable to move said first-defined control element from pressure interrupting position for movement in said high pressure range to enable said servo-mechanism to correspondingly inch said engageable device into firm engagement in accordance with the progressively lowering of the vacuum efficiency in said intake-manifold effective to create a correspondingly diminishing pressure differential across said powerdiagraphm for movement of said first-defined control element in said high pressure range in opposition to said spring means.

19. Mechanism for controlling engagement and accommodating disengagement of a friction engaging device arranged to provide for transmission of torque between a drive member and a driven member when engaged, comprising means for supplying pressurized fluid, a casing having a controllable power chamber for receiving such pressurized fluid at different pressures, control means for distributing said pressurized fluid to said power chamber and including a control valve shiftable automatically from a low pressure flow control position to a pressure flow interrupting position for controlling partial engagement of said friction device, said low pressure position providing for automatic disengagement of said friction device, means for automatically shifting said control valve to pressure interrupting position, a manually-controlled element having first and second stages of control, said first stage being effective to modulate said low pressure flow to said power chamber to a minimal value ineffective to maintain said friction device engaged for automatic disengagement thereof, and means for disengaging said friction device automatically upon modulating the effectiveness of said low pressure flow to said power chamber to such minimal value.

20. Mechanism for controlling engagement of a friction engaging device arranged to provide for transmission of torque between a drive member and a driven member when engaged, comprising means for supplying pressure fluid, a casing having a controllable power chamber for receiving such pressurized fluid at different pressures, control means for distributing said pressurized fluid to said power chamber and including a control valve shiftable automatically from a low pressure flow control position to a pressure flow interrupting position for controlling partial engagement of said friction device, said low pressure position providing for automatic disengagement and partial engagement of said friction device, means for disengaging said friction device automatically, means for applying engaging force to the friction device to partially engage the latter device, and a manually-controlled element effective in cooperation with said control valve in low pressure position to intensify said low pressure flow to said power chamber to effect such partial engagement of said friction device.

21. Mechanism for controlling engagement of a friction engaging device arranged to provide for transmission of torque between a drive member and a driven member when engaged, comprising means for supplying pressurized fluid, a casing having a controllable power chamber for receiving such pressurized fluid at different pressures, control means for regulating distribution of said pressurized fluid to said power chamber and including a control valve shiftable automatically from a low pressure flow control position to a pressure flow interrupting position, said interrupting position providing for stabilization of said friction device in partial engagement, means for automatically shifting said control valve to pressure interrupting position and including a partial engagement sensing device operable in response to a predetermined pressure effective in said power chamber to partially engage said friction device, and a manually-controlled element effective in cooperation with said control valve in low pressure position to intensify said low pressure flow to said power chamber to effect partial engagement of said friction device prior to said sensing device becoming operative.

22. Mechanism for controlling engagement of a friction engaging device arranged to provide for transmission of torque between a drive member and a driven member when engaged, comprising means for supplying pressurized fluid, a casing having a controllable power chamber for receiving such pressurized fluid to effect engagement of said friction device, control means for regulating the pressure in said power chamber and including a control valve shiftable automatically from low pressure flow control position to a pressure flow interrupting position for controlling partial engagement of said friction device, and shiftable at will under manual control through a high pressure flow control range, and means for applying engaging force to the friction device substantially in accordance with the effectiveness of the fluid pressure in said power chamber in response to shifting said control valve under the aforesaid manual control through said high pressure range, to effect corresponding inching of said friction device into firm engagement.

23. In a vehicle including a friction engageable device to provide for transmission of torque between a driven member and a drive member drivingly connected to an internal-combustion engine having an intake-manifold in which vacuum efficiency varies in accordance with an associated throttle control for regulating engine speed between idling and maximum acceleration, comprising control valve means having a body, a bore in said body provided with an input duct, a return duct, and an output duct; a valve piston including a valve-controlling portion and a fluid-retaining portion coaxially interconnected and slidable in said bore from normal to first and second positions of control relatively to said ducts to control incursion and excursion of fluid into and from, respectively, said output duct, said valve portion being characterized by first and second control lands and a fluid-retaining land spaced one from another to define a pair of annular fluid chambers therebetween and which are selectively communicable with said ducts; pre-energized resilient means coaxially interconnecting said valve portion with said fluid-retaining portion and which define limited relative movement of the former with respect to the latter; an energizable actuator for controlling movement of said valve and fluid-retaining portions as a unit to first position; servo-mechanism operatively connected to said output duct and to said engageable device to engage the same; a yieldable thrust-transmitting device operatively effective between said servo-mechanism and said engageable device to transmit a predetermined thrust force from said servo-mechanism to said engageable device to initially engage the latter while said valve piston occupies normal position, said actuator being energizable in response to said limited yielding operation of said thrust device to effect movement of said valve piston to first position; another energizable actuator effective when de-energized to induce energization of said servo-mechanism to initially engage said engageable device by augmenting resistance to fluid flow through said return duct; manual means effective to selectively control energization and de-energization of said other actuator; an interrupter device associated with said input duct for de-energizing said first-defined actuator upon a predetermined pressure effective in said input duct; a vacuum servo having a power member subject to vacuum on one side and to atmospheric pressure on the other side to create a pressure differential effective to move said power member in one direction; a one-way mechanical connection effective between said valve portion and said power member in its other direction of movement to move said valve portion to second position relatively to said fluid-retaining portion in accordance with the vacuum efficiency in said intake-manifold; an energizable power-spring operatively controlled by said power member when moved in its said one direction to effect maximum energization of said power-spring when said power member is subject to high vacuum as a function engine idling speed, said power spring being effective in its other direction of movement to controllably release said power-spring as vaccum is lowered in said intake-manifold as a function of engine acceleration, to effect movement of the aforesaid valve portion relative to said fluid-retaining portion; biasing means for moving said valve piston toward normal position; means for blocking return of said valve portion under influence of said biasing means to first position upon the latter being moved to second position;

means for energizing said actuators; and a source of pressure fluid connected to said input duct.

24. In a vehicle including a friction engageable device to provide for transmission of torque between a driven member and a drive member drivingly connected to an internal-combustion engine having an intake-manifold and a throttle control therefor, an energizable servo-mechanism for effecting engagement of said engageable device: control means for said servo-mechanism and including a valve element formed with a valve portion and a fluid-retaining portion movable as a unit from normal position to first control position, and movable relatively through a range of control positions, said normal position providing disengagement and re-engagement of said engageable device, said first control position being effective to interrupt pressure flow to engage said engageable device, and said range control position enabling progressively increasing pressure flow distribution to said servo-mechanism, to firmly engage said engageable device; an energizable actuator for moving said valve element as a unit from normal to first control position; means including a pair of abutment-engaging members in series with an interposed pre-energized resilient element for interconnecting said servo-mechanism with said engageable device to initially engage the latter, said last-defined means providing limited relative thrust-transmitting movement of said servo-mechanism with respect to said engageable device to define the thrust requirement to effect such initial engagement of the latter; means effective in synchronism with said relative thrust movement of said last-defined means for controlling energization of said actuator; and means responsive to variations in vacuum efficiency within said intake-manifold as a function of throttle control, for moving said valve portion relatively to said fluid-retaining portion upon said portions being moved as a unit to first control position and thereby augmenting energization of said servo-mechanism to firmly engage said engageable device as a function of progressively increasing pressure flow to said servo-mechanism graduated in accordance with the effectiveness of said range control positions.

25. In a power supply system including an engine with a lubrication system having a fluid sump, a friction engageable device effective when engaged to transmit torque from the engine to a driven member, and mechanism for controlling engagement and disengagement of the engageable device, comprising means for supplying pressurized fluid to said mechanism and to said lubrication system: a casing having a power control chamber for receiving said pressurized fluid to effect engagement of said engageable device; a control device for distributing said pressurized fluid to said power chamber and for interrupting such pressure distribution thereto; a lubrication valve movable to closed and open positions between said supply means and said power chamber, said closed position being effective to prevent fluid from entering said power chamber until the pressure of the fluid supplied to said lubrication system has reached a predetermined value; a valve opening incorporated in said lubrication valve between said power chamber and said fluid sump, said valve opening normally communicating with said power chamber when the lubrication valve is closed to accommodate disengagement of said engageable device; a check-valve element movably cooperable with said valve opening to open and close the same; a normally preloaded spring adapted to react on said check-valve element to releasably close said valve opening to establish the fluid pressure in said power chamber at a minimal value ineffective to engage said engageable device while said lubrication valve is closed, said lubrication valve being movable to open position in response to fluid supplied to said lubrication system exceeding said predetermined value whereby said valve opening is isolated from said power chamber thus rendering said check-valve element ineffective to maintain said pressure in said power chamber at said minimal value; means for applying engaging force to the engageable device substantially in accordance with the effectiveness of the pressure in said power chamber; and means for controlling said control device.

26. In a power supply system including an internal-combustion engine with an intake-manifold and a lubrication system having a fluid sump, a friction engageable device effective when engaged to transmit torque from the engine to a driven member, and fluid actuatable mechanism for controlling engagement and accommodating disengagement of the engageable device comprising means for supplying pressurized fluid to said mechanism and to said lubrication system, means for controlling the pressure of said pressurized fluid and including a casing having a power control chamber for receiving said pressurized fluid to effect engagement of said engageable device; a control device for distributing said pressurized fluid to said power chamber and for interrupting such pressure distribution thereto; a lubrication valve movable to closed and open positions between said supply means and said power chamber, said closed position being effective to prevent fluid from entering said power chamber until pressure of the fluid supplied to said lubrication system has reached a predetermined value; a valve opening incorporated in said lubrication valve between said power chamber and said fluid sump, said valve opening normally communicating with said power chamber when the lubrication valve is closed to accommodate disengagement of said engageable device; a check-valve element movably cooperable with said valve opening to open and close the same; a normally preloaded spring adapted to react on said check-valve element to releasably close said valve opening and thereby establishing the fluid pressure in said power chamber at a minimal value ineffective to engage said engageable device while said lubrication valve is closed, said lubrication valve being movable to open position in response to fluid supplied to said lubrication system exceeding said predetermined value whereby said valve opening is isolated from said power chamber thus rendering said check-valve element ineffective to maintain said pressure in said power chamber at said minimal value; a power element movable in said casing in response to pressure energization of said power chamber for applying engaging force to said engageable device substantially in accordance with the effectiveness of the fluid pressure in said power chamber; biasing means operatively incorporated in said control device for urging the same toward open position wherein said pressurized fluid is distributed to said power chamber to effect initial engagement of said engageable device; means for applying vacuum from the intake-manifold of said engine to a portion of said control device for urging the latter toward another open position in opposition to said biasing means wherein firm engagement of said engageable device can be effected by said power chamber; operator-controlled means for controlling said vacuum-applying means for rendering said other position of said control device effective for controlling firm engagement of said engageable device by said power chamber; and manually-controlled means effective at will to interrupt pressure distribution to said power chamber by said control device for accommodating automatic disengagement of said engageable device.

27. In an internal-combustion engine operatively connected to a clutch comprising frictionally-engageable driving and driven members for transmitting drive-torque when engaged to a power take-off shaft, a hydraulic clutch-servo for controlling said clutch, an engine cylinder block incorporating an oil gallery for distribution of lubricating oil under pressure to the working parts of said engine, a source of lubricating oil contained in a sump of the crankcase of said engine, an engine-driven pump for supplying pressurized lubricating oil from said sump to said oil gallery, a spring-loaded pressure relief valve operatively associated with said oil gallery for establishing maximum oil pressure therein, the improvement which comprises: spring-loaded valve means normally closed for establishing minimal engine lubrication requirements in said oil gallery when the engine is operating at relatively low to idling speeds before any oil is diverted for actuating said clutch-servo, opening of said valve means being effected by increasing the pressure on said lubricating oil above such minimal lubricating requirements to control said clutch-servo to engage said clutch members in accordance with engine speed; a spring-loaded check-valve having a movable element acted on by said spring load, and which is incorporated in said valve means for controlling "bleed-off" of lubricating oil from said clutch-servo to said fluid sump when said valve means are substantially closed to accommodate disengagement of said clutch members; spring-actuated means for effecting disengagement of said clutch members; a control valve operatively associated wtih said pump for controlling such actuating oil diverted to said clutch-servo, comprising a multiple ported valve body and a duct interconnecting one of said ports with said clutch-servo, a housing integral with an exterior portion of said engine cylinder block for the working parts of said pump, a pair of ports in said valve body adapted to serve as intake and outlet ports, respectively, for said pump, and means for utilizing said valve body as the cover for the working parts in said pump housing to produce a unitary assembly thereof.

28. In control mechanism for a frictionally-engageable rotatable clutch for a vehicle and which is characterized by energizable means for controlling normal disengagement and re-engagement thereof and wherein normal disengagement is effective when said clutch and vehicle are at rest, the improvement which comprises: an energizable actuator provided with a work-performing element; means for rendering said work element ineffective to re-engage said clutch during said normal engaging and disengaging clutch operations under control of said energizable means notwithstanding said actuator is energized; means enabling said work element to be effective to re-engage said clutch automatically upon de-energization of said actuator while said clutch and vehicle are at rest notwithstanding said energizable means for disengaging said clutch have effected normal disengagement thereof; means for energizing said actuator; and means for overriding the effectiveness of said work element.

29. In control mechanism for a friction clutch having driving and driven members relatively rotatable when disengaged and co-rotatable when engaged, said clutch being adapted for vehicle use, and power means for effecting normal engagement of said clutch members and pre-energized spring means for effecting normal disengagement of said clutch members, said clutch members being normally disengaged when the latter and said vehicle are at rest, the improvement which comprises: another power means including a source of power therefor; a power-spring energizable by said last-defined power means for effecting automatic re-engagement of said clutch members upon the latter and said vehicle coming to rest notwithstanding said spring means have effected normal disengagement thereof; means effective to hold said power-spring energized during rotation of said driving member without interfering with the aforesaid normal clutch operations under influence of said first-defined power means and said spring means, respectively; means for automatically disabling said last-defined power means to release said power-spring to effect re-engagement of said clutch members upon the latter and said vehicle coming to rest; and means for overriding the effectiveness of said power-spring in cooperation with said spring means.

30. In control mechanism for a friction clutch having a driving and driven member relatively rotatable when disengaged and co-rotatable when engaged, said clutch being adapted for vehicle use, and an energizable hydraulic clutch-servo for effecting normal engagement of said members and pre-energized spring means for effecting normal disengagement of said members, said clutch being normally disengaged when the latter and said vehicle are at rest, the improvement which comprises: power means including a source of power therefor; a power-spring energizable by said power means for effecting automatic re-engagement of said clutch members upon said clutch and said vehicle coming to rest notwithstanding said spring means have effected disengagement of said clutch members; means effective to hold said power-spring energized during rotation of said driving member without interfering with the aforesaid normal clutch operations under influence of said clutch-servo and said spring means, respectively; means for automatically disabling said power means to release said power-spring to effect re-engagement of said clutch members upon said clutch and said vehicle coming to rest; and means for overriding the effectiveness of said power-spring in cooperation with said spring means.

31. In control mechanism for a friction clutch having a driving member and a driven member relatively rotatable when disengaged and co-rotatable when engaged, said clutch being adapted for vehicle use, and an energizable hydraulic clutch-servo having a reciprocative power element for effecting normal engagement of said clutch members and spring means for effecting normal disengagement of said clutch members, said clutch being normally disengaged when the latter and said vehicle are at rest, the improvement which comprises: power means having a reciprocative axially-bored power element having a depression, and which is normally retracted out of engagement with said servo power element; an elongated extension projecting coaxially from said servo power element in telescopic engagement with said power means element; a power-spring energizable in response to retraction of said power means element; mechanical interlocking mechanism including a plurality of elements radially movable with respect to the axis of said power means element to an interlocking position in partial engagement with said depression formed in the axial bore of said power means element, in response to relative movement of said servo power element with respect to said power means element in fully retracted position, and thereby holding the latter power element in fully retracted position and the power-spring at maximum energization; means for automatically disabling said power means element upon said spring means effecting clutch disengagement, to release said power-spring to effect re-engagement of said clutch members when the latter and said vehicle are at rest; and means for overriding power-spring re-engagement of said clutch members and thereby enabling disengagement of the latter in cooperation with said spring means to restore normal disengagement of the former to the latter means.

32. In control mechanism for a friction clutch having a driving member and a driven member relatively rotatable when disengaged and co-rotatable when engaged, said clutch being adapted for vehicle use, and an energizable hydraulic clutch-servo for effecting normal engagement of said clutch members and spring means for effecting normal disengagment of said clutch members, said clutch being normally disengaged when the latter and said vehicle are at rest, the improvement which comprises: a cylindrically-chambered casing having opposite open ends and an intermediate integral partition wall having an annularly walled central opening dividing the interior of said casing into a pair of opposing fluid chambers, one on each side of said partition wall; a servo-piston reciprocable in one of said chambers and dividing the same into a constant pressure and a pressure-working chamber to produce said clutch-servo; a detachable cover having a central aperture for the open end of said one chamber; another detachable cover having a centrally formed concavity with an end wall for the open end of the other chamber; a piston-rod connected to said servo-piston for unitary reciprocation therewith, and which projects to the exterior of said first-named cover through the aperture therein for connection to clutch operating mechanism whereby hydraulic pressure introduced via conduit means into said working chamber is effective to normally engage said clutch members; means for producing said hydraulic pressure; means connecting said spring means to said clutch operating mechanism for said clutch members upon disabling said clutch-servo; a movable power-member reciprocable in said other chamber and dividing the same into a constant pressure chamber and a variable pressure-working chamber; an annular liner fast in said annularly walled opening; a tubular walled work-performing element fast at one end to the central portion of said power-member to move as a unit therewith, and the other end operably projecting through said liner into coaxial engagement with said servo-piston to produce therewith a one-way connection whereby said servo-piston and power-member are movable as a unit in a clutch-engaging direction and relatively when said servo-piston is operating said clutch members to effect normal engagement and disengagement thereof; an elongated cylindrical extension projecting coaxially from said piston-rod in telescopic engagement with said tubular work element; an elongated annular groove formed on an intermediate portion of said extension by diminishing the normal diameter thereof, and which defines an annular camming shoulder at one end thereof; a plurality of radial holes through the wall of said tubular work element for reception of a like-number of radially movable interlocking elements, respectively, normally flush with the outer cylindrical surface of said work element and which are normally disposed in engagement with the reduced portion on said extension; an internal annular interlocking groove indented in the inner cylindrical surface of said liner, and which normally lies in circular alignment with said interlocking elements; an angular camming surface defining the terminating end of the inner cylindrical surface of said liner confronting said power-member; an energizable power-spring nested in said concavity in said other detachable cover to react between the end wall of said concavity and said power-member, said power-spring being operable to its fully energized condition in response to retraction of said power-member under influence of a pressure differential effective to overcome said power-spring and thus retract said work element to its normal position wherein said interlocking elements are disposed out of engagement with said interlocking groove in said liner, protractive movement of said servo-piston therefore said extension to engage said clutch members, being effective to engage said camming shoulder with said interlocking elements and thereby force them radially outwardly into interlocking groove to lock said power-member and connected work element and the power-spring in their respective fully retracted positions wherein the latter is fully energized, thus accommodating normal clutch engaging and disengaging operations under influence of said clutch-servo and spring means, respectively; means effective to produce a pressure differential across said power-member while said clutch driving member is rotating to effect the aforesaid retraction of said power-member and connected work element, to fully energize said power-spring, said last-defined means being effective when disabled to release said power-member under influence of said power-spring to effect corresponding movements of said servo-piston to re-engage said clutch members in opposition to said spring means upon said clutch members and vehicle coming to rest, wherein said interlocking elements are disposed in their radially inward positions against said reduced portion on said extension flush with the outer cylindrical surface on said tubular work element to thereby release said tubular work element and power-member for protractive movement as a unit under influence of said power-spring to operate said servo-piston and connected clutch operating mechanism to effect re-engagement of said clutch members; and manually-operatable mechanism connected to said clutch operating mechanism for overriding said power-spring clutch re-engagement when said clutch and vehicle are at rest to disengage said clutch members in cooperation with said spring means to restore normal disengagement of the former to the latter means.

33. A control mechanism for a friction clutch constructed in accordance with claim 32 in which said other fluid chamber and power-member produce a pressure differential operated motor including conduit means between said variable working-chamber thereof and a source of vacuum production to create a pressure differential effective to move said power-member in a retractile direction to energize said power-spring.

34. In combination with an automotive vehicle friction clutch comprising a driving member and a driven member; a throttle adapted to vary vacuum conditions in the engine inlet-manifold in response to an operatable accelerator; pre-energized spring means for effecting normal disengagement of said clutch members; energizable power means having a reciprocative power element adapted to effect normal engagement of said clutch members in opposition to said spring means; energizing means for said power means; a vacuum motor having a reciprocative power element coaxially engageable with said power means element; a power-spring operatively associated with said motor power element, said power-spring being energizable in response to retracting said motor power element; conduit means continuously communicating vacuum conditions in said inlet-manifold to said vacuum motor whereby high vacuum resulting in said inlet-manifold from idle position of said throttle is effective to fully retract the motor power element to fully energize said power-spring; mechanical interlocking means operably incorporated between said power elements to hold said power-spring fully energized notwithstanding lowering vacuum in said inlet-manifold as a result of engine-accelerating position of said throttle, said lower vacuum being effective to release said power-spring when said power means are operative to normally engage said clutch members, operation of said throttle in an engine-accelerating direction being effective to reduce vacuum efficiency in said inlet-manifold thus releasing said motor power element to enable said power-spring to actuate both power elements to re-engage said clutch members upon said spring means effecting disengagement thereof while the engine and vehicle are stopped; and manually-operatable mechanism acting on both of said power elements to override re-engagement of said clutch members by said released power-spring and thereby enabling disengagement of said clutch members by said spring means to release the engine for starting.

35. In combination with an automotive vehicle friction clutch comprising a driving member and a driven member: an internal-combustion engine connected to drive said driving member; a throttle adapted to control said engine in response to operating an accelerator between idling and accelerating speed positions of engine control; pre-energized spring means for effecting normal disengagement of said clutch members; energizable power means having a reciprocative power element adapted to operatively engage said clutch members in opposition to said spring means; energizing means for said power means; another energizable power means having a reciprocative power element coaxially engageable with said first-defined power element; a power-spring operatively associated with said other power element; means responsive to accelerator operation of said throttle for varying the degree of energization effective in said other power means; mechanical interlocking means including an element operatively incorporated between said power elements, said interlocking element being operative to hold said other power element in fully retracted position wherein maximum energization of said power-spring is effective, in response to maximum energization of said other power means as a function of idle position of engine control of said throttle, said interlocking means being further effective to accommodate reciprocative movements of said first-defined power element to disengage and re-engage said clutch members under influence of said spring means and said first-defined power means, respectively, without releasing said power-spring from its fully energized position aforesaid, disengagement of said clutch members by said spring means while said members and vehicle are at rest being effective to release said interlocking element to free said other power element for movement and thereby operating said first-defined power element to re-engage said clutch members in opposition to said spring means; and manually-operatable mechanism adapted to jointly act on both of said power elements to override said power-spring to enable said spring means to effect disengagement of said clutch members automatically.

36. In combination with an automotive vehicle friction clutch having a driving member and a driven member: an internal-combustion engine drivingly connected to said driving member; a selective gear train operatively connected to said driven member; pre-energized spring means adapted to disengage said clutch members; power means characterized by a pair of isolated power chambers arranged in tandem; a power element reciprocative in each of said chambers in coaxial relationship; an associated power spring; means for energizing one of said power elements to effect operative engagement of said clutch members; means for energizing the other of said pair of power elements and said associated power-spring, to effect re-engagement of said clutch members while said engine and vehicle are stopped upon said spring means effecting normal disengagement thereof; means operatively effective between said power elements for locking said other power element and said associated power-spring in fully energized position in response to operative energization of said one power element to effect normal engagement of said clutch members, said last-defined means being operative to release said other power element and associated power-spring to effect said re-engagement of said clutch members notwithstanding said gear train is effective to prohibit starting the engine, when said one power element is in fully retracted position under influence of said spring means; and means operative to overcome said power-spring and thereby releasing said spring means to effect disengagement of said clutch member to release said engine for starting without disturbing said effectiveness of said gear train.

37. In control mechanism for a vehicular clutch having a plurality of frictionally-engageable elements for transmitting drive-torque when engaged, from an internal-combustion engine to an associated manually-shiftable gearbox characterized by neutral and a plurality of selective gear drive positions, said engine being controllable by an accelerator operatable between idle and wide-open throttle positions, pre-energized spring means for effecting normal disengagement of said clutch elements and hydraulic means for effecting normal engagement of said clutch elements, and a source of hydraulic pressure for energizing said hydraulic means, the improvement which comprises: means for controlling said hydraulic means to engage said clutch elements including valve means having a composite valve element movable from normal position of pressure flow control wherein said spring means are effective to disengage said clutch elements with said gearbox in neutral position; clutch contact-detecting means operable in response to initial thrust exerted by said hydraulic means upon shifting said gearbox to an active drive position, for inducing movement of said valve element to a different position of pressure flow control to arrest said hydraulic means therefore said clutch elements in partial (slipping) engagement, said detecting means comprising an electric circuit including energizable means for moving said valve element, and a switch operatable to closed position in response to such thrust exerted by said hydraulic means to arrest said clutch elements in partially engaged relation; an energizable power-spring for re-engaging said clutch elements upon said spring means disengaging the same when said engine and vehicle are stopped; an energizable actuator for effecting maximum energization of said power-spring, said actuator being at maximum energization therefore said power-spring when said accelerator is in idle position of engine control; interlocking means operatively incorporated between said hydraulic means and said actuator for holding said power-spring at maximum energization notwithstanding said accelerator is operating toward wide-open throttle position of engine control which is effective to release said power-spring, said last-defined means being operable to hold said power-spring in response to initial effectiveness of said hydraulic means to engage said clutch elements, and to release said power-spring to effect re-engagement of said clutch elements upon said spring means fully disengaging the former when said engine and vehicle are stopped to enable leaving the gearbox "in-gear" so that compression-power braking of the engine can be utilized to stabilize the vehicle as parked; and manually-operatable mechanism associated with said clutch come said power-spring and thereby disengage said clutch elements to release said engine for starting notwithstand-elements for cooperating with said spring means to overing said gearbox is "in-gear."

38. The combination of a servo-controlled friction clutch having engageable driving and driven members for transmitting drive torque when engaged from an associated torque-producing engine, an engine-driven oil pump for pressure lubricating the working parts of the engine, and a spring-loaded pressure relief valve for establishing maximum lubricating pressure, with a separate engine-driven pump adapted for pressure activation of servo-control of said clutch members; a control valve for receiving pressurized oil from said separate pump and distributing the same for controlling said servo-control; another spring-loaded pressure relief valve for establishing maximum activating pressure producible by said separate pump; a housing for the working parts of said first-defined pump, said housing being open at one end; another housing for the working parts of said separate pump, said last-defined housing being open at one end and closed at the other; a separator member for closing both of the confronting open ends of said housings; means for fastening said housings and separator member in an oiltight stacked assembly; a common drive shaft for driving both pumps simultaneously from a rotating part of said engine; and a common source of oil supply for both pumps.

39. In a clutch having frictionally-engageable members in operative association with a source of drive-torque, means for engaging said members for transmission of said drive-torque, and means for disengaging said members to interrupt transmission of said drive-torque, the improvement which comprises; thrust-transmitting mechanism operatively interconnecting said engaging means with said clutch members, and comprising a pair of normally spaced abutment-engaging elements and a normally preloaded spring operatively effective between said elements to normally space the latter, said elements being movable relatively into abutting relationship as a function of said spring yielding under thrust exerted by said engaging means; control means for said engaging means; and a control device operable between two operating positions of control in synchronism with said normal and abutting relationships, respectively, of said elements, for controlling said control means to interrupt the thrust being exerted on said clutch members by said engaging means upon movement of said elements into abutting relationship, in response to operation of said control device to a corresponding operating position and thereby establishing said clutch members in partially engaged relation.

40. In a control valve mechanism adapted for controlling clutch servo-mechanism actuation operatively associated with an internal-combustion engine having an oil gallery and an intake-manifold, comprising a valve body provided with a walled bore terminating at one end in a walled counterbore, and a pair of spaced annular fluid channels indented in the wall of said first-defined bore with one of said channels communicating with a fluid output duct and the other channel communicating with a fluid input chamber connected by a ported valve seat through the wall of said fluid chamber to a fluid return duct, said first-defined bore also communicating with one of a pair of overlapping fluid return chambers separated by a wall provided with a port therethrough to interconnect said return chambers; a spool-type valve piston movable in said first-defined bore from normal position of fluid control wherein said fluid channels are interconnected, to a first and a second position of fluid control for isolating said fluid channels and for reconnecting the same, respectively, said valve piston comprising a valve portion and a fluid-retaining portion coaxially interconnected for movement in said bores with said valve portion having first and second control lands, and a fluid-retaining land in spaced relationship with respect to one another, said first control land being adapted to selectively connect and isolate said fluid channels when said valve portion occupies normal and first positions, respectively, of fluid control, said second control land being characterized by a camming face portion on one side and a locking face portion on the other side; an annular outstanding flange defining that end of said fluid-retaining land remote from said second control land, and which is adapted to move in said counterbore; a first normally preloaded spring operatively positioned in said counterbore to react between said outstanding flange and an internal annular shoulder defining the juncture of said bores, to bias said valve portion toward normal position of fluid control; an internal annular groove indented in the wall of said counterbore adjacent the open end thereof; an abutment element received by said groove for engagement by said valve portion to define the normal position thereof wherein said fluid channels are connected; a blind axial bore in said fluid-retaining land; a hollow formed in said fluid-retaining portion; a mechanical connection including a yieldable element between confronting portions on said valve and fluid-retaining portions, respectively, for biasing the latter toward normal coaxial relationship, said connection providing limited relative movement of said valve portion with respect to said fluid-retaining portion upon unitary movement thereof in normal coaxial relationship to first control position; an energizable actuator having a power-member connected to said fluid-retaining portion to move the same and said connected valve portion as a unit to first control position to isolate said pair of fluid channels; a two-stage check-valve having a movable element adapted to cooperate with that end of said port exposed to the other of said return chambers to selectively establish a minimal non-activating pressure and a limited activating pressure effective in said output duct in said valve body when said valve portion is in normal position of fluid control; a second normally preloaded spring reacting between a portion of said valve body and said check-valve element to establish said minimal non-activating pressure; another energizable actuator having a power element normally spaced from said check-valve element when said last-defined actuator is energized to enable first stage operation thereof to be effective under influence of said second spring; a third normally preloaded spring adapted to react between said last-defined power element and a fixed portion associated with said last-defined actuator to bias said last-defined power element into engagement with said check-valve element for cooperation with said third spring to enable second stage operation to be effective under joint influence of said second and third springs and thereby rendering said limited activating pressure effective upon de-energization of said last-defined actuator; an axially bored stem integral with said check-valve element; an interlocking pin connected to said check-valve element for unitary movement therewith, and which projects through said axial bore, said return chambers and a radial bore through the wall of said first-defined bore, the free end portion of said interlocking pin normally extending under influence of said third spring into the path of said camming face portion on said second control land whereby the aforesaid relative movement of said valve portion with respect to said fluid-retaining portion to second fluid controlling position is effected by which said fluid channels are connected upon first being isolated in response to unitary movement of said valve and fluid-retaining portions to first fluid controlling position, the aforesaid relative movement between said valve and fluid-retaining portions enabling said interlocking pin to be engaged by said camming face portion to force said pin against the bias of said third spring out of the path of said second control land, whereupon completion of the aforesaid relative movement frees said interlocking pin to be biased by said third spring into the path of the aforesaid locking portion on said second control land to block return movement of said valve portion to normal position under influence of said first spring; a vacuum servo unit having a flexible power member movable to effect the aforesaid relative movement of said valve portion with respect to said fluid-retaining portion in opposition to said first spring and yieldable element; means for continuously communicating the vacuum pressure generated in said intake-manifold to one side of said flexible member; means for connecting the other side of said flexible member to atmospheric pressure; and a power-spring energizable by said flexible member when subject to high vacuum to disengage a thrust-transmitting portion of said flexible member from said fluid-retaining land, and thereby establishing normal spacing therebetween, said flexible member being operative to release said power-spring to engage said valve portion to move the same relatively to said fluid-retaining portion as a function of lowering the vacuum efficiency in said intake-manifold in response to opening the engine throttle to increase engine speed above idling speed, and thereby rendering the second position of fluid control effective.

41. A control valve mechanism constructed in accordance with claim 40 including a minimum pressure lubrication control valve movably positioned in another bore in said valve body, one end of said last-defined bore being closed and the other end communicating with said fluid input chamber, said lubrication valve comprising a cup-like valve piston provided with a hollow opening at one end and closed at the other; a valve head terminating said closed end and cooperable with the aforementioned ported valve seat; a fourth normally preloaded spring operatively disposed between the closed end of said last-defined bore and valve piston to yieldably control movement of fluid from said input duct into said fluid input chamber, and thereby establishing a minimal pressure on the fluid in the aforesaid oil gallery of the engine to adequately lubricate the working parts thereof before activating fluid is diverted through said output duct to said servo-mechanism; and a single-stage check-valve element under spring load operatively embodied in the hollow of said valve piston to interconnect said input fluid chamber with the last-defined hollow for controlling a "bleed-off" opening formed in said valve piston to normally interconnect said input fluid chamber with the hollow in said valve piston upon the aforesaid valve head being seated on said ported valve seat to enable excess fluid in said servo-mechanism to pass through said valve opening past said single-stage check-valve element into a drainage passage via the aforesaid aperture in said closure plug notwithstanding said valve portion is in interlocked second position of fluid control.

42. In a control valve mechanism for controlling engagement of a friction engageable device to provide for transmission of torque between a driven member and a drive member drivingly connected to an internal-combustion engine having an intake-manifold: control means having an element movable sequentially from normal position to blocking position through a range of positions for producing a variable orifice to provide progressively increasing pressure flow distribution, said normal position providing disengagement and initial re-engagement of said engageable device, said blocking position being effective to stabilize said engageable device in initial engagement, and said range positions enabling firm engagement of said engageable device; servo-mechanism for engaging said engageable device including a source of fluid pressure variable in accordance with engine speed as a function of corresponding changes in the vacuum produced in said intake-manifold upon the engageable device becoming initially engaged; a movable member characterized by one side being sensitive to vacuum and the other side vented to atmospheric pressure to create a pressure differential effective to move said movable member to control movement of said valve element through said range positions in accordance with the vacuum in said engine intake-manifold; biasing means energizable for moving said movable member and valve element as a unit to render said range positions effective in response to reducing said pressure differential as vacuum is lowered in said intake-manifold; means for biasing said valve element toward normal position independently of movement of said movable member to energize said first-defined biasing means; and means for disengaging said engageable device automatically upon return of said valve element to normal position.

43. In control valve mechanism for controlling servo-mechanism engagement of a friction engageable device to provide for transmission of torque between a driven member and a drive member drivingly connected to an internal-combustion engine having an intake-manifold in which vacuum efficiency varies in accordance with engine speed regulated by the degree of throttle opening, comprising a valve body provided with a bore communicating with the exterior of said body via a pressure input passage, a return flow passage and a pressure output passage; a valve piston shiftable in said bore from normal position wherein disengagement and initial engagement of said engageable device are provided, to a pressure flow blocking position wherein initial engagement of said engageable device is stabilized, and through a range of positions for correspondingly increasing an orifice flow control to firmly engage said engageable device in accordance with lowering of vacuum efficiency as engine speed is increased, said valve piston being characterized by a pair of fluid-retaining lands terminating opposite end portions thereof in longitudinally spaced relationship to one another, and a control land interposed in said longitudinal space defining a pair of annular fluid chambers, one on each side thereof, with one of said fluid chambers communicating with said pressure input passage and said return flow passage, and the other fluid chamber normally interconnecting said pressure input and output passages when said control land is in normal position interconnecting said fluid chambers; control means operatively associated with said return flow passage for establishing two-stages of flow restriction selectively effective to accommodate disengagement and initial engagement, respectively, of said engageable device when said control land is in normal position interconnecting said fluid chambers; manual means for selectively controlling said control means; means for moving said valve piston to blocking position to disconnect said fluid chambers including a force-transmitting device connecting said servo-mechanism and engageable device, and which is operable to transmit the required thrust force from said servo-mechanism to initially engage said engageable device, whereby said engageable device is stabilized in initial engagement; a vacuum servo having a movable power-member subject to vacuum on one side and to atmospheric pressure on the other side to create a pressure differential effective to move said power-member in a retractive direction; an energizable power-spring operatively associated with said power-member for maximum energization upon said power-member being fully retracted under influence of high vacuum in said intake-manifold as a function of idling engine speed, said power-member being releasable under influence of said power-spring in a protractive direction to move said valve piston from blocking position through said range of positions wherein pressure input and output passages are connected via said other fluid chamber, in accordance with the effectiveness of said pressure differential on said power-member incrementally reduced as vacuum efficiency is lowered in the intake-manifold according to increasing engine speed.

44. In a vehicle including hydraulic servo-mechanism engagement of a friction engageable device to provide for transmission of torque between a driven member and a drive member drivingly connected to an internal-combustion engine having an intake-manifold in which vacuum efficiency varies in accordance with the degree of throttle opening for regulating engine speed, and an engine-driven pump including a source of fluid for supplying pressurized fluid to said servo-mechanism, comprising control valve means for said servo-mechanism having a valve body provided with a bore communicating with the exterior of said body via a pressure input passage communicating with said pump, a return flow passage to said fluid source and a pressure output passage communicating with said servo-mechanism; a valve piston sequentially shiftable in said bore from normal position to a pressure flow blocking position and through a range of pressure flow increasing positions; manually-controlled means operatively associated with said return passage for selectively varying pressure flow into said pressure output passage when said valve piston is in normal position; means operable automatically upon said servo-mechanism applying a predetermined thrust force to said engageable device to initially engage the same when said valve piston is in normal position, for shifting said valve piston from normal position to blocking position to stabilize such initial engagement; and means for applying gradual reduction of vacuum efficiency in said intake-manifold to said valve piston to shift the same from blocking position through said range of pressure flow increasing positions in co-operation with said pump as engine speed increases, to progressively augment pressure flow into said pressure output passage to firmly engage said engageable device.

45. In a vehicle including hydraulic servo-mechanism engagement of a friction engageable device to provide for transmission of torque between a driven member and a drive member drivingly connected to an internal-combustion engine having an intake-manifold in which vacuum efficiency varies in accordance with the degree of throttle opening for regulating engine speed, and an engine-driven pump including a source of fluid for supplying pressurized fluid to said servo-mechanism, comprising control valve means for said servo-mechanism having a valve body provided with a bore communicating with the exterior of said body via a pressure input passage communicating with said pump, a return flow passage to said fluid source and a pressure output passage communicating with said servo-mechanism; a valve piston sequentially shiftable in said bore from normal position to a pressure flow restricting position and through a range of pressure flow increasing positions; manually-controlled means operatively associated with said return passage for selectively varying pressure flow into said pressure output passage when said valve piston is in normal position; means operable automatically upon said servo-mechanism applying a predetermined thrust force to said engageable device to initially engage the same when said valve piston is in normal position, for shifting said valve piston from normal position to restricting position to retard such initial engagement; and means for applying gradual reduction of vacuum efficiency in said intake-manifold to said valve piston to shift the same from restricting position through said range of pressure flow increasing positions in cooperation with said pump as engine speed increases, to progressively augment pressure flow into said pressure output passage to firmly engage said engageable device.

46. In a vehicle including hydraulic servo-mechanism engagement of a friction engageable device to provide for transmission of torque between a driven member and a drive member drivingly connected to an internal-combustion engine having an intake-manifold in which vacuum efficiency varies in accordance with the degree of throttle opening for regulating engine speed, and an engine-driven pump including a source of fluid for supplying pressurized fluid to said servo-mechanism, comprising control valve means for said servo-mechanism having a valve body provided with a bore communicating with the exterior of said body via a pressure input passage communicating with said pump, a return flow passage to said fluid source and a pressure output passage communicating with said servo-mechanism; a valve piston sequentially shiftable in said bore from normal position to a pressure flow blocking position and to a high pressure flow position; manually-controlled means operatively associated with said return passage for selectively varying pressure flow into said output passage when said valve piston is in normal position; means operable automatically upon said servo-mechanism applying a predetermined thrust force to said engageable device to initially engage the same when said valve piston is in normal position, for shifting said valve piston from normal position to blocking position to stabilize such initial engagement; and means for applying gradual reduction of vacuum efficiency in said intake-manifold to said valve piston to shift the same from blocking position to high pressure flow position to enable said pump to progressively augment pressure flow into said pressure output passage as engine speed increases to firmly engage said engageable device.

47. In a vehicle including hydraulic servo-mechanism engagement of a friction engageable device to provide for transmission of torque between a driven member and a drive member drivingly connected to an internal-combustion engine having an intake-manifold in which vacuum efficiency varies in accordance with the degree of throttle opening for regulating engine speed, and an engine-driven pump including a source of fluid for supplying pressurized fluid to said servo-mechanism, comprising control valve means for said servo-mechanism having a valve body provided with a bore communicating with the exterior of said body via a pressure input passage communicating with said pump, a return flow passage to said fluid source and a pressure output passage communicating with said servo-mechanism; a valve piston sequentially shiftable in said bore from normal position to a pressure flow restricting position and to a high pressure flow position; manually-controlled means operatively associated with said return passage for selectively varying pressure flow into said output passage when said valve piston is in normal position; means operable automatically upon said servo-mechanism applying a predetermined thrust force to said engageable device to initially engage the same when said valve piston is in normal position, for shifting said valve piston from normal position to restricting position to retard such initial engagement; and means for applying gradual reduction of vacuum efficiency in said intake-manifold to said valve piston to shift the same from restricting position to high pressure flow position to enable said pump to progressively augment pressure flow into said pressure output passage as engine speed increases to firmly engage said engageable device.

48. In a transmission, a drive member, a driven member, mechanism for providing a plurality of power trains between said members and including a friction engaging device for completing the power trains, power means for controlling engagement of said friction device and including a source of power controllable in part by a control device having a normal position wherein partial engagement of said friction device and disengagement thereof are selectively accommodated, and manually-controlled mechanism operatively associated with said control device and with said power train mechanism for selectively changing between said power trains, said manually-controlled mechanism including an electrical actuator adapted for augmenting the power force above a minimal non-activating value accommodating disengagement of said friction device, to said power means to effect partial engagement of said friction device, and further including normally open switch means connected to said actuator whereby initial movement of the manually-controlled mechanism is effected to close said switch means to energize said actuator and thereby establishing said minimal power force in said power means for disengagement of said friction device before actuation of said power train mechanism for changing from one of said power trains to another, and means effective to open said switch means automatically to break the circuit to said actuator upon completion of the selected power train change.

49. In a power supply system including an internal-combustion engine with an intake-manifold, a transmission comprising a drive member drivingly connected to said engine, a driven member, mechanism for providing a plurality of power trains between said members and including a friction engaging device for completing said power trains, power control means for controlling engagement of said friction device including a control device having a normal position wherein partial engagement of said friction device and disengagement thereof are selectively provided, and a range of power-applying positions for firm engagement of said friction device, biasing means including means applying the pressure from said intake-manifold of said engine to a portion of said control device to urge said portion toward and through said power-applying positions with graduated force as manifold pressure is reduced whereby said friction device is progressively firmly engaged, and manually-controlled mechanism operatively associated with said control device and with said power train mechanism for selectively changing between said power trains, said manually-controlled mechanism including an electrical actuator adapted for augmenting the power force above a minimal non-activating value accommodating disengagement of said friction device, to said power control means to effect partial engagement of said friction device, and further including normally open switch means connected to said actuator whereby initial movement of the manually-controlled means is effective to close said switch means to energize said actuator to establish said minimal power force in said power control means for disengagement of said friction device before actuation of said power train mechanism for changing from one of said power trains to another, and means effective to open said switch means automatically to break the circuit to said actuator upon completion of the selected power train change.

50. In a vehicle including hydraulic servo-mechanism engagement of a friction engageable device to provide for transmission of torque between a driven member and a drive member drivingly connected to an internal-combustion combustion engine having an intake-manifold with an associated throttle control for accelerating said engine from idling speed to full speed: control means having an element movable sequentially from normal position to blocking position and through a range of increasing open positions graduated to apply progressively increasing pressure in said servo-mechanism, said normal position providing disengagement and initial engagement of said engageable device, said blocking position being effective to stabilize said engageable device in initial engagement, and said range of open positions enabling firm engagement of said engageable device; a source of fluid pressure variable in accordance with the vacuum in the engine intake-manifold for controlling said servo-mechanism upon the latter initially engaging said engageable device, to effect firm engagement of said engageable device; a vacuum servo having a power member subject to vacuum on one side and to atmospheric pressure on the other side to create a pressure differential effective to move said power member in one direction; a one-way mechanical connection between a portion of said power member and said control element to effect said sequential movements of the latter; an energizable power-spring operatively controlled by said power member when energized in said one direction to effect maximum energization of said power-spring when said power member is subject to high vacuum as a function of idling engine speed; an energizable actuator for moving said control element from normal to blocking position without disturbing said maximum energization of said power spring; biasing means for moving said control element to normal position upon maximum energization of said power-spring; means effective for blocking return of said control element to normal position upon the latter being positioned for movement in said range of open positions; another energizable actuator effective when de-energized for rendering said blocking means effective, said power member being effective to control release of said power-spring to effect said graduated movements of said control element in accordance with accelerating engine speed with resultant lowering of vacuum efficiency in said intake-manifold and corresponding reductions in the pressure differential effective on said power member; means for energizing said actuators; and manual means for selectively controlling energization and de-energization of said other actuator.

51. Mechanism for controlling engagement of a friction engaging device having frictionally-engageable drive and driven members arranged to provide for transmission of torque therebetween, comprising means operable for applying engaging force to said friction members; control means having cooperating control portions relatively operable between normal and first positions for controlling said force applying means including a detector device operable from normal to first position for sensing initial contact of said friction members; a pair of normally spaced relatively movable abutment-engaging elements incorporated in said detector device and connected to portions of said force applying means and said friction device, respectively; and a normally preloaded spring operably incorporated between said abutment elements to establish normal spacing thereof whereby initial operation of said force applying means is effective through said spring in normal status with said detector device in their respective normal positions to establish said friction members in initial slipping engagement whereupon additional operation of said force applying means is effective to overcome said spring for relative movement of said abutment elements into engaging relationship accompanied by operation of said detector device to said first position to induce operation of said control means to first position and to modulate said slipping engagement whereby the effectiveness of said force applying means is limited to that of controlling said friction members in such modulated slipping engagement.

52. Mechanism for controlling engagement of a friction engaging device having frictionally-engageable drive and driven members arranged to provide for transmission of torque therebetween, comprising means operable for applying engaging force to said friction members; control means having cooperating control portions relatively operable between normal and first positions for controlling said force applying means including a force-transmitting device operable from normal to first position of force transmission for sensing initial contact of said friction members, said transmitting device having a pair of normally spaced relatively movable abutment-engaging elements connected to portions of said friction device and said force applying means, respectively, and a normally preloaded spring interposed in series with said abutment elements for establishing normal spacing thereof; and a control device operable between normal and first positions of control in synchronism with said transmitting device for controlling said control means whereby initial operation of said force applying means is effective through said spring in normal status with the transmitting and control devices and control means in their respective normal positions, for establishing said friction members in initial slipping engagement whereupon additional operation of said force applying means is effective to overcome said spring for relative movement of said abutment elements into engaging relationship accompanied by operation of said transmitting and control devices to their respective first positions, to induce operation of said control means to first position and to modulate said slipping engagement whereby the effectiveness of said force applying means is limited to that of controlling said friction members in such modulated slipping engagement.

53. Mechanism for controlling engagement of a friction engaging device having frictionally-engageable drive and driven members arranged to provide for transmission of torque therebetween, comprising thrust means operable for applying engaging force to said friction members; control means having cooperating control portions relatively operable between normal and first positions for controlling said thrust means including a thrust-transmitting device operable from normal to first position of thrust transmission for sensing initial contact of said friction members, said thrust device having a pair of normally spaced relatively movable abutment-engaging elements connected to portions of said friction device and said thrust means, respectively, and a normally preloaded spring interposed in series with said abutment elements for establishing normal spacing thereof; and a control device operable from normal to first position of control in synchronism with said thrust device for controlling said control means to control operation of said thrust means whereby initial thrust of said thrust means is effective through said spring in normal status with said thrust and control devices and said control means, in their respective normal positions, for establishing said friction members in initial slipping engagement whereupon additional thrust of said thrust means is effective to overcome said spring for relative movement of said abutment elements into engaging relationship accompanied by operation of said thrust and control devices to induce operation of said control means to their respective first positions, and to modulate said slipping engagement whereby the effectiveness of said thrust means is limited to that of controlling said friction members in such modulated slipping engagement.

54. Mechanism for controlling engagement of a friction engaging device having frictionally-engageable drive and driven members arranged to provide for transmission of torque therebetween, comprising thrust means operable for applying engaging force to said friction members; control means having cooperating control portions relatively operable between normal and first positions for controlling said thrust means including a thrust-transmitting device operable from normal to first position of thrust transmission, said thrust device having a pair of normally spaced relatively movable abutment-engaging elements connected to portions of said friction device and said thrust means, respectively, and a normally preloaded spring interposed in series with said abutment elements for establishing normal spacing thereof; a switch device operable between open and closed positions of control in synchronism with said thrust device for sensing initial contact of said friction members for controlling said control means to control operation of said thrust means whereby initial thrust of said thrust means is effective through said spring in normal status with said thrust device and control means in their respective normal positions and the switch device in open position for establishing said friction members in initial slipping engagement whereupon additional thrust of said thrust means is effective to overcome said spring for relative movement of said abutment elements into engaging relationship accompanied by operation of said thrust device to first position and the switch device to closed position to induce operation of said control means to first position and to modulate said slipping engagement whereby the effectiveness of said thrust means is limited to that of controlling said friction members in such modulated slipping engagement; an electric circuit including energizing means therefor and a switch operable to complete in part said circuit; and an electric solenoid in said circuit for controlling operation of said control means to first position upon closure of said switch device to complete said circuit.

55. Mechanism for controlling engagement of a friction engaging device having frictionally-engageable drive and driven members arranged to provide for transmission of torque therebetween, comprising means operable for applying engaging force to said friction members; a detector device operable from normal to first position for sensing initial contact of said friction members; a pair of normally spaced relatively movable abutment-engaging elements incorporated in said detector device and connected to portions of said force applying means and said friction device, respectively; a normally preloaded spring operably incorporated between said abutment elements for establishing normal spacing thereof whereby initial operation of said force applying means is effective through said spring in normal status with said detector device is normal position to establish said friction members in initial slipping engagement whereupon additional operation of said force applying means is effective to overcome said spring for relative movement of said abutment elements into engaging relationship accompanied by operation of said detector device to first position and to modulate said slipping engagement; control means having a control element movable from normal to first position of control for controlling said force applying means including an energizable actuator actuatable when energized to move said control element from normal position to first position upon said detector device operating in first position and thereby limiting the effectiveness of said force applying means to that of controlling said friction members in such modulated slipping engagement; and energizing means for said actuator.

56. Mechanism for controlling engagement of a friction engaging device having frictionally-engageable drive and driven members arranged to provide for transmission of torque therebetween, comprising thrust means operable for applying engaging force to said friction members; a detector device operable from normal to first position for sensing initial contact of said friction members; a pair of normally spaced relatively movable abutment-engaging elements incorporated in said detector device and connected to portions of said thrust means and said friction device, respectively; a normally preloaded spring operably incorporated between said abutment elements for establishing normal spacing thereof whereby initial thrust of said thrust means is effective through said spring in normal status with said detector device in normal position to establish said friction members in initial slipping engagement whereupon additional thrust of said thrust means is effective to overcome said spring for relative movement of said abutment elements into engaging relationship accompanied by operation of said detector device to first position and to modulate said slipping engagement; control means having a control element movable from normal position to first position of control for controlling said thrust means including an energizable actuator actuatable when energized to move said control element from normal to first position upon said detector device operating in first position and thereby limiting the effectiveness of said thrust means to that of controlling said friction members in such modulated slipping engagement; and energizing means for said actuator.

57. Mechanism for controlling engagement of a friction engaging device having frictionally-engageable drive and driven members arranged to provide for transmission of torque therebetween, comprising means operable for applying engaging force to said friction members; a detector switch device operable from open to closed position for sensing initial contact of said friction members; a pair of normally spaced relatively movable abutment-engaging elements incorporated in said switch device and connected to portions of said force applying means and said friction device, respectively; a normally preloaded spring operably incorporated between said abutment elements for establishing normal spacing thereof whereby initial operation of said force applying means is effective through said spring in normal status with said switch device open to establish said friction members in initial slipping engagement whereupon additional operation of said force applying means is effective to overcome said spring for relative movement of said abutment elements into engaging relationship accompanied by operation of said switch device to closed position and to modulate said slipping engagement; control means having a control element movable from normal to first position of control for controlling said force applying means; and electric circuit including energizing means therefor and an interposed switch operable for completing in part said circuit; and an electric solenoid having a winding interposed in series in said circuit and an armature movable thereby when energized to move said control element from normal to first position in response to closure of said switch device under said additional operation of said force applying means to complete said circuit, and thereby limiting the effectiveness of said force applying means to that of controlling said friction members in such modulated slipping engagement.

58. Mechanism for controlling engagement of a friction engaging device having frictionally-engageable drive and driven members arranged to provide for transmission of torque therebetween, and means operable for supplying pressurized fluid, comprising means operable for applying engaging force to said friction members; hydraulic servo-mechanism having fluid connections with said pressure supplying means and operable to control said force applying means; a detector switch device operable from open to closed position for sensing initial contact of said friction members; a pair of normally spaced relatively movable abutment-engaging elements incorporated in said switch device and connected to portions of said friction device and said servo-mechanism, respectively; a normally preloaded spring operably incorporated between said abutment elements for establishing normal spacing thereof whereby initial operation of said servo-mechanism is effective through said spring in normal status with said switch device in open position to establish said friction members in initial slipping engagement whereupon additional operation of said servo-mechanism is effective to overcome said spring for relative movement of said abutment elements into engaging relationship accompanied by operation of said switch device to closed position and to modulate said slipping engagement; control valve means having a control element movable from normal to first position of control for controlling said servo-mechanism; an energizable electric circuit including energizing means therefor and an interposed switch operable for completing in part said circuit; and an electric solenoid having a winding interposed in series in said circuit and an armature movable thereby when energized to move said control element from said normal to first position in response to closure of said switch device under said additional operation of said servo-mechanism to complete said circuit, and thereby limiting the effectiveness of said servo-mechanism means to that of controlling said friction members in such modulated slipping engagement.

59. Mechanism for controlling engagement and disengagement of a friction engaging device arranged to provide for transmission of torque between a driven member and a drive member which is driven by an internal-combustion engine having a fuel intake-manifold and a throttle control therefor, comprising means operable for applying engaging force to said friction device members; a detector device operable from normal to operating position for sensing initial contact of said friction device members; a pair of normally spaced relatively movable abutment-engaging elements incorporated in said detector device and connected to portions of said friction device and said force applying means, respectively; a normally preloaded spring operably incorporated between said abutment elements for establishing normal spacing thereof whereby initial operation of said force applying means is effective through said spring in normal status with said detector device in normal position to establish said friction device members in initial slipping engagement whereupon additional operation of said force applying means is effective to overcome said spring for relative movement of said abutment elements into engaging relationship accompanied by operation of said detector device to operating position and to modulate said slipping engagement; control means having a control element movable from normal position accommodating automatic disengagement of said friction device members, to first engaging-control position and through a range of closely generated engaging-control positions for controlling said forces applying means; an energizable actuator for moving said control element from normal to first position in response to said detector device operated to operating position and thereby limiting the effectiveness of said force applying means to that of controlling said friction device members in such modulated slipping engagement; energizing means for said actuator; and a servo-actuator vacuum connected to said intake-manifold for moving said control elements through said range of engaging-control positions and thereby enabling said controlling means to control said force applying means graduated in accordance with the vacuum in the intake-manifold to effect corresponding engagement of said friction device members for co-rotation without interrupting energization of said first-defined actuator.

60. Mechanism for controlling engagement and disengagement of a friction engaging device arranged to provide for transmission of torque between a driven member and a drive member which is driven by an internal-combustion engine having a fuel intake-manifold and a throttle control therefor, comprising thrust means operable for applying engaging force to said friction device members; a detector device operable from normal to operating position for sensing initial contact of said friction device members; a pair of normally spaced relatively movable abutment-engaging elements incorporated in said detector device and connected to portions of said thrust means and said friction device, respectively; a normally preloaded spring operably incorporated between said abutment elements for establishing normal spacing thereof whereby initial operation of said thrust means is effective through said spring in normal status with said detector device in normal position to establish said friction device members in initial slipping engagement whereupon additional operation of said thrust means is effective to overcome said spring for relative movement of said abutment elements into engaging relationship accompanied by operation of said detector device to operating position and to modulate said slipping engagement; control means having a control element movable from normal position accommodating automatic disengagement of said friction device members, to a first engaging-control position and through a range of closely generated engaging-control positions for controlling said thrust means; and energizable actuator actuatable when energized for moving said control element from normal to first position in response to said detector device operated to operating position and thereby limiting the effectiveness of said thrust means to that of controlling said friction device members in such modulated slipping engagement; energizing means for said actuator; and a servo-actuator vacuum connected to said intake-manifold for moving said control element through said range of engaging-control positions and thereby enabling said control means to control said thrust means graduated in accordance with the vacuum in the intake-manifold to effect corresponding engagement of said friction device members for co-rotation without interrupting energization of said first-defined actuator.

61. Mechanism for controlling engagement and disengagement of a friction engaging device arranged to provide for transmission of torque between a driven member and a drive member which is driven by an internal-combustion engine having a fuel intake-manifold and a throttle control therefor, comprising thrust means operable for applying engaging force to said friction device members; a detector switch device operable from open to closed position for sensing initial contact of said friction device members; a pair of normally spaced relatively movable abutment-engaging elements incorporated in said switch device and connected to portions of said thrust means and said friction device, respectively; a normally preloaded spring operably incorporated between said abutment elements for establishing normal spacing thereof whereby initial operation of said thrust means is effective through said spring in normal status with said switch device open to establish said friction device members in initial slipping engagement whereupon additional operation of said thrust means is effective to overcome said spring for relative movement of said abutment elements into engaging relationship accompanied by operation of said switch device to closed position and to modulate said slipping engagement; control means having a control element movable from normal position accommodating automatic disengagement of said friction device members, to a first engaging-control position and through a range of closely generated engaging-control positions for controlling said thrust means; an energizable actuator actuatable when energized for moving said control element from normal to first position in response to said switch device operated to closed position and thereby limiting the effectiveness of said thrust means to that of controlling said friction device members in such modulated slipping engagement; energizing means for said actuator; and a servo-actuator vacuum connected to said intake-manifold for moving said control element through said range of engaging-control positions and thereby enabling said control means to control said thrust means graduated in accordance with the vacuum in the intake-manifold to effect corresponding engagement of said friction device members for co-rotation without interrupting energization of said first-defined actuator.

62. In a control for a frictionally-engageable clutch characterized by spring disengagement and power-engagement, and power means including a source of power for effecting power-engagement, the improvement which comprises: control means including an element movable unidirectionally from normal position wherein spring-disengagement of the clutch is accommodated, to a pair of engaging-control positions providing different degrees of power-engagement of the clutch by said power means; a pair of energizable actuators adapted to control movement of said control element to selectively render said two engaging-control positions effective; a personally-operable member; a detector device including a yieldable relatively operating connection having a pair of normally spaced solid elements operatively incorporated between portions of said clutch and said power means, respectively, for controlling energization of one of said actuators upon yielding of said connection to modulate power-engagement of the clutch automatically through the transitory phase of partial clutch engagement, in response to initial operation of said personal member; another personally-operable member for overriding the engaging-control position effected by said one actuator, and for controlling the other actuator to move said control element to its other engaging-control position enabling power-engagement of said clutch for co-rotation by said power means; and a third energizable actuator responsive to said first-defined personal member operated as aforesaid for conditioning said one actuator to control said power means to effect said partial clutch engagement.

References Cited by the Examiner
UNITED STATES PATENTS

| | | | |
|---|---|---|---|
| 2,086,576 | 7/1937 | Price et al. | 192—.075 |
| 2,105,625 | 1/1938 | Wichtendahl | 129—85 |
| 2,181,743 | 11/1939 | Sanford | 192—.075 |
| 2,192,018 | 2/1940 | Sanford | 192—109 X |
| 2,722,296 | 11/1955 | Stoeckicht | 192—.075 |
| 2,893,526 | 7/1959 | Smirl | 192—3.5 |
| 2,975,875 | 3/1961 | Edelblut | 192—3.5 |
| 2,983,346 | 5/1961 | Weymann | 192—.076 |
| 3,117,661 | 1/1964 | Waclawek | 192—111 |

FOREIGN PATENTS 714,382    11/1941    Germany.

References Cited by the Applicant
UNITED STATES PATENTS

| | | |
|---|---|---|
| 2,597,840 | 5/1952 | Randol. |
| 2,624,432 | 1/1953 | Randol. |
| 2,739,679 | 3/1956 | Randol. |

DAVID J. WILLIAMOWSKY, *Primary Examiner.*

UNITED STATES PATENT OFFICE
CERTIFICATE OF CORRECTION

Patent No. 3,245,502                                  April 12, 1966

Glenn T. Randol

It is hereby certified that error appears in the above numbered patent requiring correction and that the said Letters Patent should read as corrected below.

In the drawings, Sheet 7, Fig. 17 and Sheet 15, Fig. 38, for "TR", each occurrence, read -- TP --; column 3, line 5, for "automatic" read -- auxiliary --; line 6, after "tive" insert -- automatically --; line 31, for "monifold" read -- manifold --; column 6, line 29, for "transmit" read -- transmitting --; column 11, line 43, for "to", second occurrence, read -- of --; column 13, line 52, for "psring" read -- spring --; column 14, line 12, after "number" insert -- of holes --; column 15, line 13, for "compressed" read -- (compressed) --; line 56, for "compressing" read -- (compressing) --; line 61, for "move" read -- moving --; column 16, line 16, after "and" insert -- then --; column 18, line 19, for "conrtol" read -- control --; column 19, line 24, for "engagemnet" read -- engagement --; column 22, line 30, for "275" read -- 257 --; line 74, after "yielding" insert a comma; column 24, line 15, for "disopsed" read -- disposed --; column 27, line 1, for "272" read -- 372 --; line 33, for "74" read -- 374 --; line 57, after "automatic" insert -- clutch --; line 74, for "automatic" read -- auxiliary --; column 28, line 10, for "cluth" read -- clutch --; line 18, for "form" read -- forms --; line 41, after "pressure" strike out -- / --; line 45, for "cenral" read -- central --; line 73, for "389" read -- 399 --; column 30, line 69, for "ensure" read -- ensue --; same line 69, after "influence" insert -- of --; column 31, line 15, for "include" read -- included --; column 32, line 16, for "229" read -- 301 --; line 54, before "embodiment" insert -- main --; column 35, line 23, for "the", first occurrence, read -- to --; column 38, line 19, for "prevaliing" read -- prevailing --; column 39, line 32, for "2" read -- 8 --; column 43, line 66, for "partially" read -- partial --; line 74, for "upon" read -- up --; column 44, line 26, for "function" read -- functions --; column 46, lines 63 and 64, for "driving" read -- drivingly --; line 73, for "is" read -- are --; column 47, line 10, after "electric" insert -- an energizable solenoid for moving the valve element to a controlling position, --; column 49, line 13, after "effective" insert -- to --; lines 44 and 71, for "produces", each occurrence, read -- producing --; column 51, line 58, for "movable" read -- movably --; column 57, lines 1 and 2, for "pressure" read -- pressurized --; column 59, line 40, strike out "for disengaging said clutch"; line 41, for "thereof" read -- of said clutch --; column 61, line 41, for 3,245,502
(2)

"retract" read -- retracting --; line 47, for "force" read -- forcing --; line 48, after "into" insert -- said --; column 62, line 24, after "element" insert -- under a pressure differential created by vacuum-atmospheric conditions thereagainst --; line 25, after "to" insert -- one side of --; same line 25, after, "said" strike out "vacuum"; line 26, for "motor" read -- motor power element --; same line 26, for "resulting" read -- provided --; line 32, after "ing" insert -- of --; line 33, after "throttle" strike out ", said lower vacuum"; line 34, after "said", first occurrence, insert -- motor power element therefore said --; line 36, for "operation of said throttle in an engine-accel-" read -- such lowering --; line 37, strike out "erating direction being effective to reduce"; line 38, for "thus releasing" read -- releases --; column 63, line 7, after "movement" insert -- under said power-spring --; line 42, for "member" read -- members --; column 64, line 19, after "clutch" insert -- elements for cooperating with said spring means to over- --; line 20, for "disengage" read -- disengaging --; line 22, strike out "elements for cooperating with said spring means to over-"; column 70, line 49, for "connected" read -- interposed in a circuit connection --; column 71, line 51, after "device" insert -- and control means --; column 74, line 26, and column 76, line 1, for "and", each occurrence, read -- an --.

Signed and sealed this 17th day of June 1969.

(SEAL)
Attest:

EDWARD M. FLETCHER, JR.
Attesting Officer

WILLIAM E. SCHUYLER, JR.
Commissioner of Patents